US012659028B2

(12) United States Patent
Maram et al.

(10) Patent No.: US 12,659,028 B2
(45) Date of Patent: Jun. 16, 2026

(54) SYSTEM AND METHOD FOR AUTOMATIC TUNING OF AN OPTICAL TRANSCEIVER IN AN OPTICAL NETWORK

(71) Applicant: FONEX DATA SYSTEMS INC., Saint Laurent (CA)

(72) Inventors: Reza Maram, Montréal (CA); Jean-Simon Corbeil, Verdun (CA); Pasquale Ricciardi, Beaconsfield (CA); Ali Bayat, Sainte-Catherine (CA)

(73) Assignee: FONEX DATA SYSTEMS INC., Saint Laurent (CA)

( * ) Notice: Subject to any disclaimer, the term of this patent is extended or adjusted under 35 U.S.C. 154(b) by 263 days.

(21) Appl. No.: 18/699,178

(22) PCT Filed: Sep. 29, 2022

(86) PCT No.: PCT/CA2022/051450
§ 371 (c)(1),
(2) Date: Apr. 5, 2024

(87) PCT Pub. No.: WO2023/056548
PCT Pub. Date: Apr. 13, 2023

(65) Prior Publication Data
US 2025/0240093 A1      Jul. 24, 2025

Related U.S. Application Data

(60) Provisional application No. 63/262,195, filed on Oct. 7, 2021.

(51) Int. Cl.
*H04B 10/077* (2013.01)
*H04B 10/40* (2013.01)

(52) U.S. Cl.
CPC ......... *H04B 10/0779* (2013.01); *H04B 10/40* (2013.01)

(58) Field of Classification Search
None
See application file for complete search history.

(56) References Cited

U.S. PATENT DOCUMENTS 7,630,642 B2 * 12/2009 Tamai .................. H04B 10/506
398/76
8,253,353 B2 * 8/2012 Baggen .................. H05B 47/18
315/308

(Continued)

OTHER PUBLICATIONS

International Search Report Received in PCT Application No. PCT/CA2022/051450, mailed Nov. 30, 2022 (2 pages).

*Primary Examiner* — Jai M Lee
(74) *Attorney, Agent, or Firm* — Bookoff McAndrews, PLLC

(57) ABSTRACT

Methods for automatically tuning optical transceivers is provided. In an embodiment a method includes sampling a received signal within an optical network to generate a sampled signal containing a first tuning message transmitted from an optical transceiver; for each of a plurality of signal pattern waveforms, performing a dot product operation of the sampled signal with the signal pattern waveform; and determining, based on the results of the dot product operations, a matching signal pattern waveform, being a given one of the signal pattern waveforms matching the sampled signal. Corresponding systems for automatically tuning optical transceivers are also provided.

20 Claims, 41 Drawing Sheets

(56)                    References Cited

U.S. PATENT DOCUMENTS

| | | | | |
|---|---|---|---|---|
| 8,897,120 | B2 * | 11/2014 | Stadelmeier | ........ H04L 27/2602 |
| | | | | 370/203 |
| 9,236,950 | B2 * | 1/2016 | Froc | ........................ H04B 10/60 |
| 9,768,867 | B2 * | 9/2017 | Baggen | .............. H04L 25/4904 |
| 10,250,292 | B2 * | 4/2019 | Graceffo | .............. H04B 10/505 |
| 10,623,225 | B2 | 4/2020 | Cao et al. | |
| 10,721,011 | B2 | 7/2020 | DeAndrea | |
| 10,880,138 | B2 * | 12/2020 | Stanciu | ................ H04B 1/7183 |
| 12,107,709 | B1 * | 10/2024 | Drullinger | .......... H04L 25/4902 |
| 12,278,885 | B2 * | 4/2025 | Livneh | .................. H04L 7/0008 |

* cited by examiner

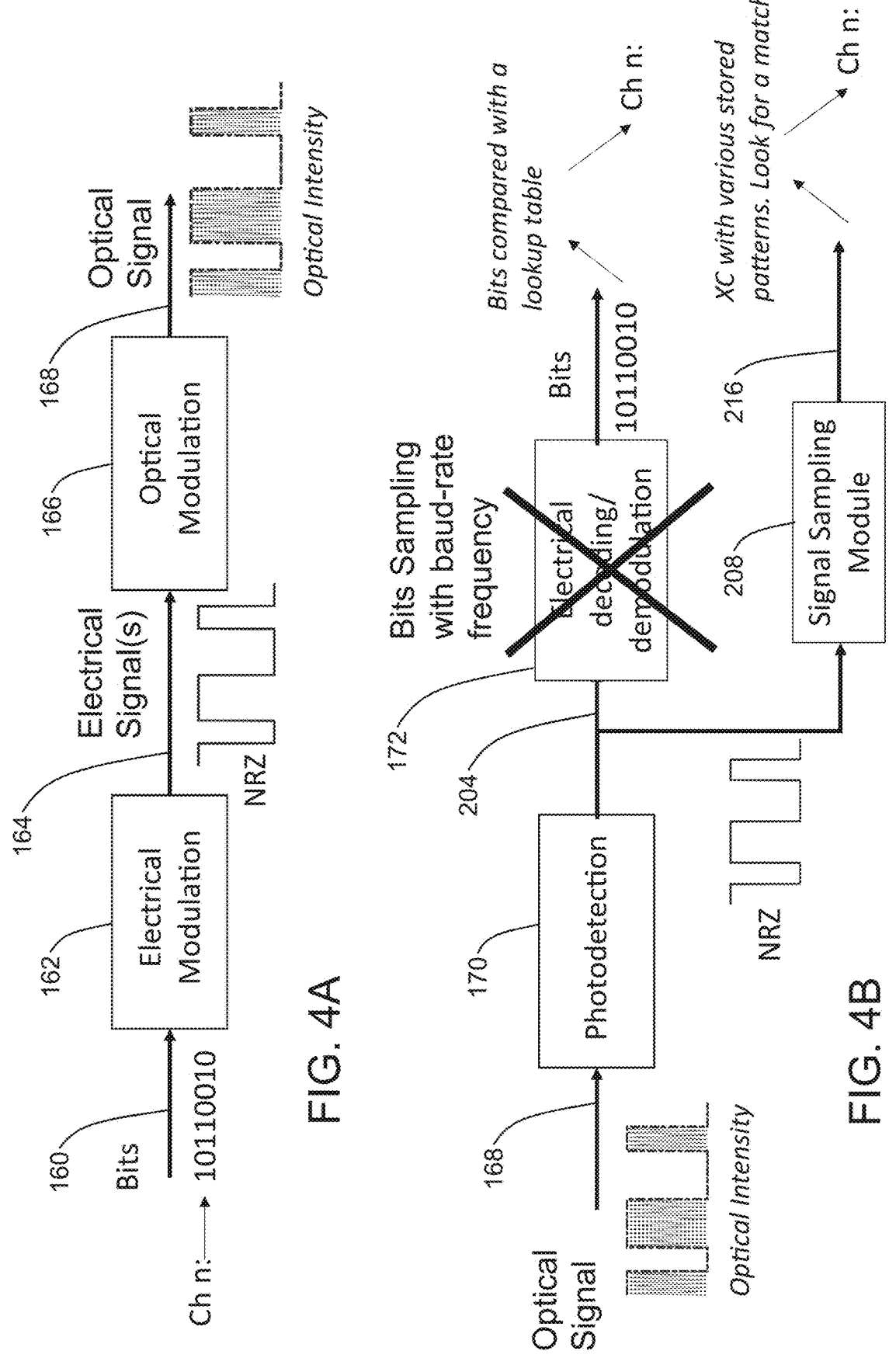

...

| Command token | Vendor A | Vendor B |
|---|---|---|
| Autotune | PA1(t) | PB1(t) |
| Force Reset | PA2(t) | PB2(t) |
| Channel Lock | PA3(t) | PB3(t) |
| Set TX to | PA4(t) | PB4(t) |
| Channel value = null | PAm(t) | PBm(t) |
| Channel value = 1 | $PA_{m+1}(t)$ | $PB_{m+1}(t)$ |
| ... | ... | ... |
| Channel value = X | $PA_{m+X}(t)$ | $PB_{m+X}(t)$ |

FIG. 6

SYSTEM AND METHOD FOR AUTOMATIC TUNING OF AN OPTICAL TRANSCEIVER IN AN OPTICAL NETWORK

CROSS-REFERENCE TO RELATED APPLICATION(S)

This is a National Stage Application under 35 U.S.C. § 371 of International Application No. PCT/CA2022/051450, filed Sep. 29, 2022, which claims priority to U.S. Patent Application No. 63/262, 195, filed on Oct. 7, 2021.

TECHNICAL FIELD

The present disclosure generally relates to operation of optical networks, and more particularly to methods and devices for automatically tuning an optical transceiver in an optical network.

BACKGROUND

To support increasing demand for communications bandwidth, operators are continuously updating and/or expanding network infrastructure. Optical networks are used as part of the network infrastructure and have the advantage of providing high bandwidth.

Wavelength divisional multiplexing (WDM) is a form of optical communication in which a number of optical signals having different wavelengths are transmitted over a single optical fiber. FIG. 1 illustrates a generalized (prior art) WDM network 1. A first set of optical transceivers 8 are connected to a first passive splitter/combiner device 16, which typically takes the form of a passive multiplexer/demultiplexer or an arrayed waveguide. The first passive splitter/combiner 16 connects the first optical transceivers 8 to a first end of a feeder cable 24, combines signals each transmitted at a unique wavelength from first optical transceivers 8 into a single transmitted combined signal for transmission over the feeder cable 24, and splits a single received combined signal received over the feeder cable 24 into its component individual signals, each individual signal being received by a respective one of the first optical transceivers 8. The first set of optical transceivers 8 can represent transceivers located on the OLT/server/access provider side of the optical network. A second set of optical transceivers 32 are connected to a second passive splitter/combiner device 40, which typically also takes the form of a passive multiplexer/demultiplexer or an arrayed waveguide. The second set of optical transceivers 32 can represent transceivers located on the ONU/subscriber/client side of the optical network. The passive splitter/combiner 40 is connected to a second end of the feeder cable 24 to transmit and receive single combined signals from the first passive splitter/combiner device 16. The second passive splitter/combiner 40 connects the second optical transceivers 32 to the feeder cable 24, combines signals transmitted from the second optical transceivers 32 into a single transmitted combined signal for transmission to the first passive splitter combiner device 16 over the feeder cable 24 and splits a single combined signal received from the passive splitter/combiner device 16 into its component individual signals, each signal being received by a respective one of the second optical transceivers 32.

Each transceiver of the first set 8 is paired with a counterpart transceiver of the second set 32. Paired first and second transceivers 8 and 32 must be appropriately selected or tuned to operate at the correct communication wavelengths (also often called communication channels). Each transceiver operating at the given communication wavelengths must further be connected into the appropriate port for that wavelength in the respective passive combiner/splitter (16, 40). The requirements of correctly selecting or tuning the transceivers 8, 32 and connecting to the correct port of the passive combiner/splitter 16, 40 add to installation costs, especially when connections are initially incorrectly made, and troubleshooting is required.

Various techniques have been disclosed to enable automatic tuning of wavelength tunable transceivers connected within an optical network, such as ones disclosed in US2019/0052392; US2018/0351683 and US2016/0301496 and ones commercialized by Finisar™, Infinera™ and ADVA™.

SUMMARY

According to one aspect, there is provided a method for automatically tuning of a first optical transceiver. The method includes sampling a received signal within an optical network to generate a sampled signal, the sampled signal containing a first tuning message transmitted from the first optical transceiver; for each of a plurality of signal pattern waveforms, performing a dot product operation of the sampled signal with the signal pattern waveform; and determining, based on the results of the dot product operations, a matching signal pattern waveform, being a given one of the signal pattern waveforms matching the sampled signal.

According to another aspect, there is provided an automatic tuning system implemented on an optical network device. The system includes a signal sampling module configured for sampling a received signal within the optical network to generate a sampled signal, the sampled signal containing a first tuning message transmitted from an optical transceiver of the optical network; a storage device storing a plurality of signal patterns; a signal generator module configured for generating a corresponding signal pattern waveform for each of the stored signal patterns; and a dot product module. The dot product module is configured for each of the plurality of signal pattern waveforms generated by the signal generator module, performing a dot product operation of the sampled signal with the corresponding signal pattern waveform and determining, based on the results of the dot product operations, a matching signal pattern waveform being a given one of the signal pattern waveforms matching the sampled signal.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIG. 4A illustrates a schematic diagram of the signal processing steps for a transmission-side encoding/modulating of a tuning message applying the digital encoding/ modulation-based tuning protocol according to one example embodiment;

FIG. 4B illustrates a schematic diagram of the signal processing steps on the receiver side for treating a received optical signal containing a tuning message that was encoded/ modulated according to the digital encoding/modulation-based tuning protocol according to one example embodiment;

FIG. 6 illustrates a table showing tuning message and/or tuning message components stored in pattern database of the automatic tuning system according to one example embodiment;

Figure 1:
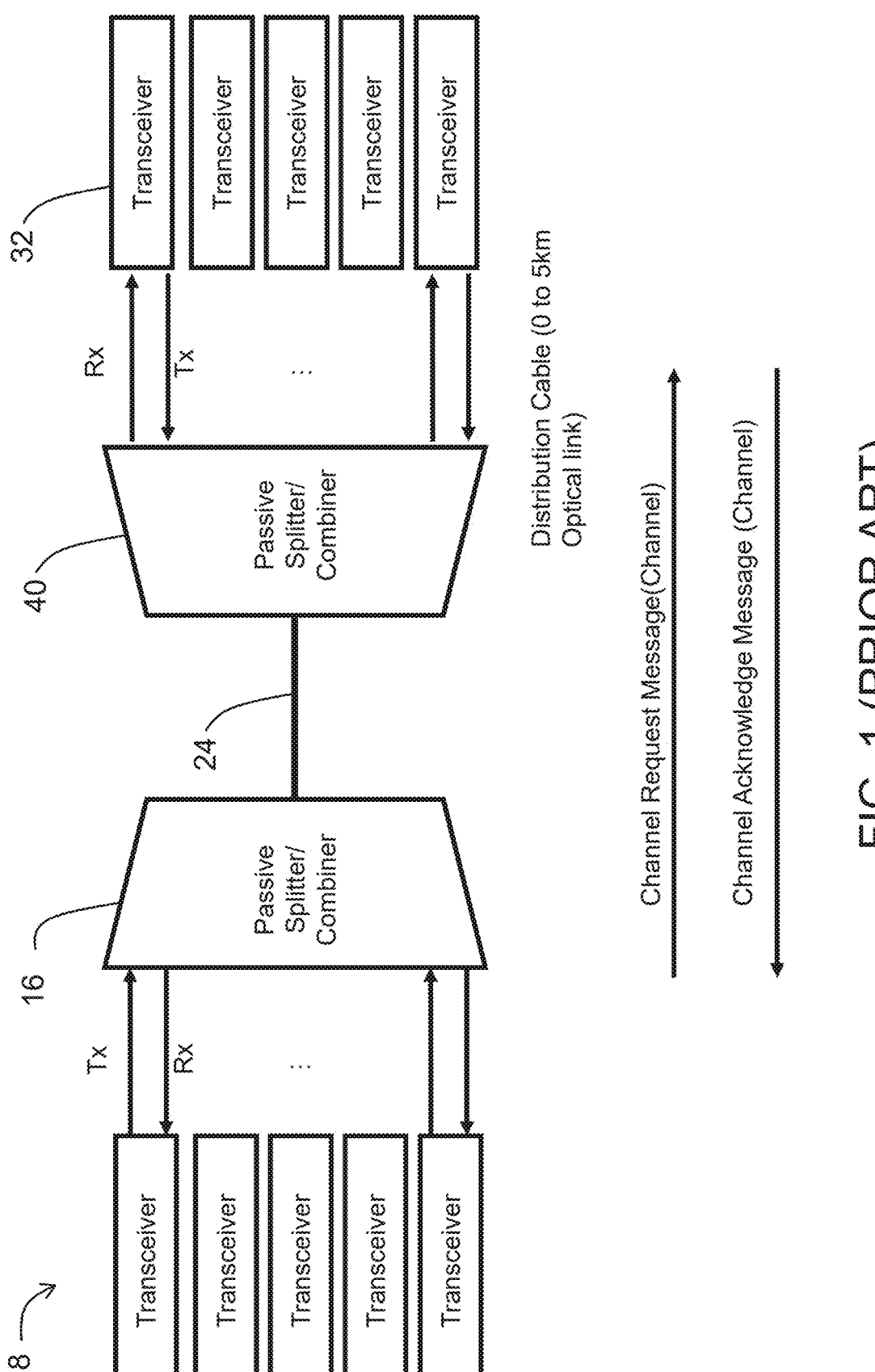
FIG. 1 illustrates a schematic diagram of a generalized (prior art) optical network.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art, that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

Broadly described, various embodiments herein provide automatic tuning of optical transceivers.

Optical transceivers include a broad range of standard device types, which may typically in the form of a pluggable transceivers, for example MSA pluggable transceivers; small form-factor pluggable (SFP), SFP+, SFP28, XFP, Quad SFP+ (QSFP+), QSFP28, QSFP56, C form-factor pluggable types (e.g. CFP, CFP2, CFP4), etc., and proprietary "smart" SFP types with integrated protocol processors, RJ45 Power over Ethernet (POE) devices and dongles, USB devices and dongles, Internet of Things (IoT) telematics devices and sensors, communications, computer and storage system plugin cards such as optical transponders/muxponders/switches, packet switch and router line interface cards, computer server cards and storage plugin devices, wireless transceiver and transponder cards, data acquisition and control equipment cards, audio/video encoder and decoder cards, and mobile transceiver devices, having various functions, configurations, form factors, and network, host, management and physical interfaces. The terms "optical transceiver" and "pluggable transceiver" are used herein to interchangeably to refer to the same element.

"Data communication" herein refers to the communication typically carried out between two network devices over the optical network during normal operation. For example, when two pluggable transceivers connected over a common channel/wavelength are both correctly tuned, they can carry out the high bandwidth data communication that the optical network is intended for. Typically, the data communication involves the transmission and receiving of large amounts of data, such as in the form of documents, audio and video. More particularly, data communication as used herein does not refer to the exchange of tuning messages for automatic tuning of network devices.

"Tuning" herein refers to programming or configuring a given optical transceiver so that it is operable to communicate at a specific channel set within the optical network to which it is connected. For example, dense wavelength division multiplexing (DWDM) uses a number of wavelength/channels in the range of approximately 1530 nm to approximately 1565 nm, each channel corresponding to a spacing within the range (ex: spacings of 25 GHz, 50 GHz or 100 GHz, or FlexGrid spacing). The previous example pertains to a C-Band application, but it will be understood that example embodiments described herein are also applicable to O-band, L-Band, or other suitable bands. When tuned, the optical transceiver communicates at the specific channel set, which channel set can include one wavelength/channel or can include a wavelength/channel pair. The terms "wavelength" and "channel" are used interchangeably herein when referring to tuning. The channel set includes an uplink path and a downlink path relative to the optical transceiver. The uplink path and a downlink path can have a same wavelength/channel (and hence the channel set includes one wavelength/channel) in a dual fiber connection, wherein the uplink path is implemented over a first physical fibre and the downlink path is implemented over a second separate physical fibre. The channel set includes a wavelength/channel pair in a single fibre connection, wherein the uplink path is implemented using a first wavelength/channel of the pair over a given physical fibre and the downlink path is implemented using a second different wavelength/channel of the pair over the same physical fibre. "Automatic tuning", or variants thereof, refer to tuning actions being applied to the optical transceiver while the transceiver is already connected within the optical network. In particular, the optical transceiver does not need to be correctly tuned to the specific channel set (such as by a human operator using a tuning peripheral device) prior to the transceiver being connected to that port. The "automatic tuning" can be performed automatically by the exchange of tuning messages between various devices on the optical network substantially without human intervention. No step of manual selection by a human operator of the channel set, such as via a user interface of a tuning device, is required as part of the "automatic tuning". Successful automatic tuning causes the transceiver to be configured to operate at the correct channel set correspond-
ing to channel set of the port of the passive splitter/combiner
to which it is connected.

At the core, automatic tuning of an optical transceiver
while being connected to the optical network involves an
exchange of tuning messages between the optical transceiver
(ex: near-end device) and another network-connected device
(ex: far-end device). Tuning information contained in the
messages, which may be defined in informational fields of
the tuning message, is used to confirm successful handshak-
ing between the (near-end) optical transceiver and the (far-
end) other device, which allows the (near-end) optical
transceiver to tune itself to the channel set that provided for
the successful communication. A tuning protocol defines the
types of tuning messages (i.e. the tuning information to be
contained in the messages) and the order in which the types
of tuning messages are to be exchanged between devices
that allows for confirming a successful communication. The
tuning protocol can also define the format (ex: waveform
shape and duration, encoding, and/or modulation) of the
signals representing the tuning messages.

In a basic exchange, a first optical transceiver (ex: near-
end device) will intermittently send a series of messages of
the request type, which are also known as "Hello" messages.
Since the (near-end) optical transceiver is not tuned and does
not know which uplink channel of channel set it is to operate
on, the (near-end) optical transceiver cycles through the
known available wavelength/channels and sends the request
message at every available wavelength/channel. Each
request message further contains tuning information defin-
ing the wavelength/channel on which the given request
message is sent. For example, the request message can have
the format "Hello, this is channel $<i>$".

A given request message (ex: sent from a near-end device)
is intended to be received by the other (ex: far end device)
network-connected device. It will be appreciated that where
the request message is sent on the correct wavelength/
channel, being the uplink channel on which both the (ex:
near-end) optical transceiver and the (ex: far-end) other
network device are connected to, the given request message
will be received by the (ex: far-end) other network device.
Even where the (ex: far-end) other network device is not
tuned, and it is in a state of listening for request messages,
the receiving of the request message containing an identifier
of the channel of the request message allows the other (ex:
far-end) network device to recognize which channel that
device is connected to. Upon receiving the request message,
the (ex: far-end) other network device responds by sending
an acknowledge message. The acknowledge message con-
tains a type identifier (identifying the message as being of
the acknowledge type), a "Sent by" field that identifies the
channel used by the (ex: far-end) other network device to
send the acknowledge message (which corresponds to the
downlink channel of the channel set relative to the near-end
optical transceiver), and a "Reply to" field that repeats the
channel (the uplink channel relative to the near-end optical
transceiver) identified in the successfully received request
message (ex: the successful channel "$<i>$"). The (ex: far-
end) other network device may also cycle through the
available channels and send an acknowledge message over
each available channel. For example, if the successful chan-
nel "$<i>$" over which the request message was successfully
received has the value "X", then the acknowledge type
message can have the form "Acknowledge. This is Channel
$<j>$, Reply to channel X", where $<j>$ is the current channel at which the (ex: far-end) other network device transmits the
acknowledge message when cycling through the available
channels.

The initial (ex: near-end) optical transceiver will listen for
the acknowledge messages responding to its request mes-
sages. Upon receiving the acknowledge message from the
(ex: far-end) other network device, it can confirm that a
successful communication was achieved. It can then tunes
itself to transmit using the successful channel "$<i>$" on
which it sent its request message (i.e. the uplink wavelength/
channel set) and to receive using successful channel "$<j>$"
on which it received the acknowledge message from the (ex:
far-end) other network device (i.e. the downlink wavelength/
channel of the channel set).

The (ex: near-end) initial optical transceiver may send its
own acknowledge message in the form of "Acknowledge,
this is Channel X, reply to Channel Y", where "X" equals
"$<i>$" of the successful request message and "Y" equals
"$<j>$" of the first acknowledge message transmitted from the
(ex: far-end) other network device. Upon receiving this
second acknowledge message, the (ex: far-end) other net-
work device can also tune itself to the successful channel set
defined in the acknowledge message (its uplink and down-
link channels will be the vice versa of the uplink and
downlink channels of the initial, near-end optical trans-
ceiver).

According to various example embodiments, additional
tuning messages may be exchanged, for example, to increase
robustness in the exchange of tuning messages for tuning,
but the above presented example provides a baseline of
tuning messages that can be exchanged for successful auto-
matic tuning.

Different tuning protocols can be used, such as according
to different vendors, make and/or models of optical trans-
ceivers. The formatting of the tuning message protocols can
also vary. For example, the ordering of relevant tuning
information fields (ex: request/acknowledge, receive chan-
nel, transmit channel, etc.) in a tuning message may vary.
Furthermore, the encoding and/or modulating of tuning
messages within a tuning protocol may also vary.

Figure 2:
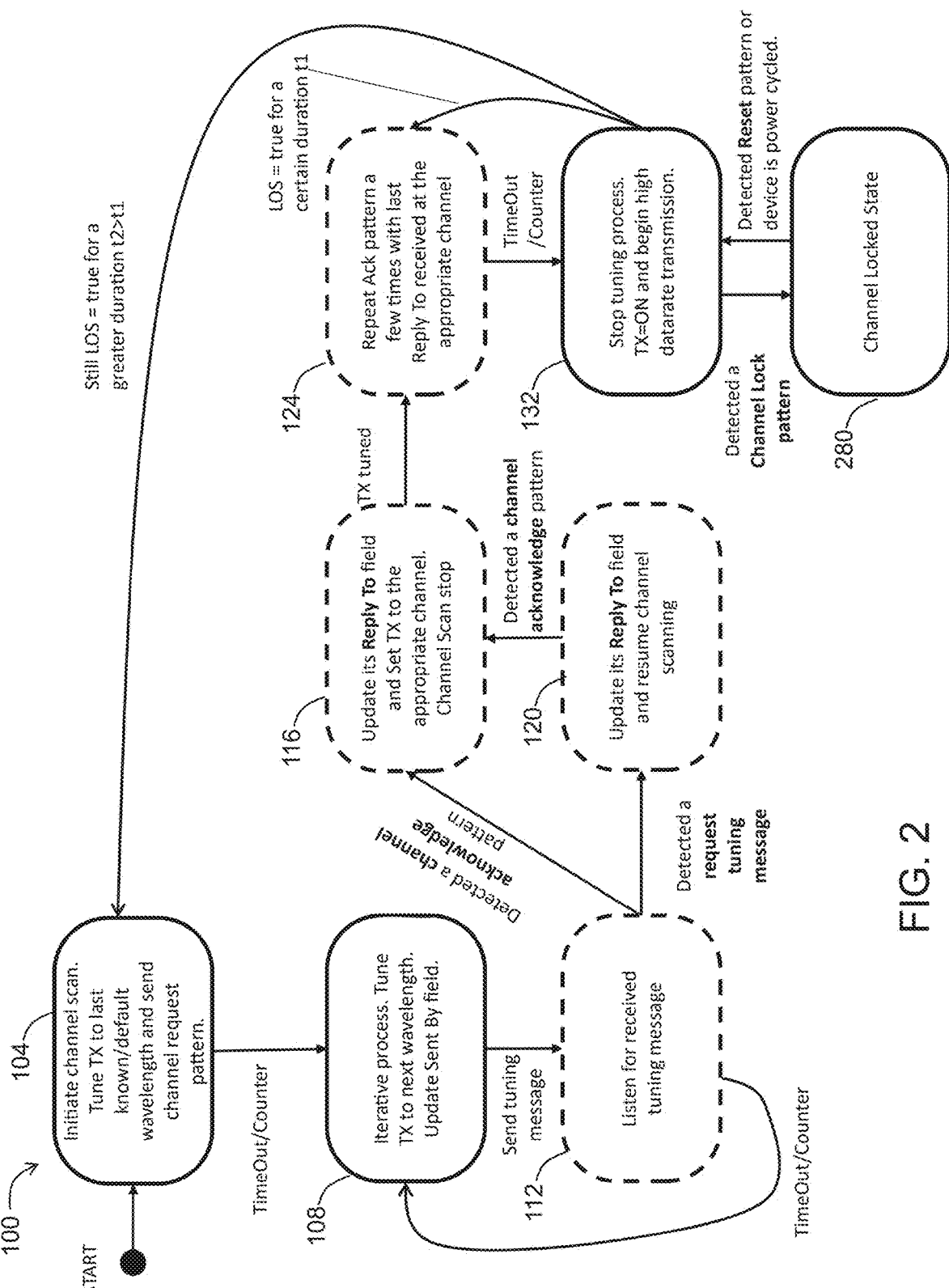
FIG. 2 illustrates a state machine diagram of the various tuning states of a pluggable transceiver in a tuning scheme according to one example embodiment.

Referring now to FIG. 2, therein illustrated is a state
machine diagram 100 showing the various states of an
optical transceiver (denoted as a near-end device for the
purposes of FIG. 2) in a tuning scheme according to one
example embodiment. The (near-end) optical transceiver
enters an initial state 104 in which it initiates steps for data
communication. For example, the (near-end) optical trans-
ceiver enters this step as part of start-up sequence (after
being plugged and powered up, or after being reset) or after
there has been a loss of service for an extended duration of
time that requires re-tuning the (near-end) transceiver. In the
initial state 104, the (near-end) optical transceiver transmits
a tuning message of the request type at the wavelength/
channel set at which it was last successfully tuned to. It then
listens for acknowledge tuning messages to confirm that it
should remain tuned to that last successfully used channel
set.

If there is a timeout at state 104 (i.e. the tuning sequence
for the last successfully used channel set is not successful),
the (near-end) optical transceiver moves to state 108 to begin
the iterative process of cycling through available uplink
channels/wavelengths and sending a tuning message of the
request type at each of the channels. As can be appreciated,
the timeout can occur when it is determined that tuning to
the last successfully used channel is not successful after a
predetermined timeout period. In some embodiments, to
prevent crosstalk from a plurality of transceivers simultaneously starting/restarting their tuning process, for example after a power down, the predetermined timeout period can be randomized for each transceiver.

At state 108, the (near-end) optical transceiver tunes to the next available channel. Upon sending the tuning message of the request type at that channel, it moves to state 112 to listen to received tuning messages sent from other network devices (denoted as far-end devices for the example of FIG. 2).

If there is a timeout at state 112 (i.e. no tuning message are received), the (near-end) transceiver returns to state 108 to tune to the next available channel/wavelength and send the next tuning message of the request type.

If a tuning message of the acknowledge type is received from state 112, the (near-end) transceiver moves to state 116 and tunes itself to the channel of the "Reply to" field defined in the tuning message of the acknowledge type as its uplink channel, if it has not already been tuned to that channel. It also updates its "Reply to" field to the channel of the "Sent by" field defined in the tuning message of the acknowledge type as its downlink channel. The received acknowledge type message should correspond to a response transmitted by another network device that received the request-type tuning message sent by the transceiver at state 108. Therefore, receiving the acknowledge type tuning message is an indicator that the channel set defined in the acknowledge-type tuning message is an appropriate one and that the transceiver should be tuned to that channel set.

If a tuning message of the request type is received from state 112, the transceiver moves to state 120 and updates its "Reply to" field to the channel defined in the "Sent by" field of the received tuning message of the request type. The receiving of the tuning message of the request type corresponds to a situation where another (far-end) network device transmitted that tuning message and it was successfully received by the (near-end) transceiver. Accordingly, the (near-end) transceiver enters state 120 to prepare and send tuning messages of the acknowledge type in response to the received tuning message. In state 120, the (near-end) transceiver cycles through its available channels while transmitting the acknowledge message (with the updated "Reply to") at each channel.

Upon receiving a tuning message of the acknowledge-type message, the (near-end) transceiver moves to step 116. The received tuning message should have been transmitted by the (far-end) other network device in response to receiving the earlier acknowledge-type tuning message transmitted by the (near-end) transceiver from state 120. The receiving of the tuning message is an indicator of the successful response by the (far-end) other network device. Accordingly, the (far-end) other transceiver updates its "Reply to" field and tunes itself to the channel indicated in the "Sent by" field of the received acknowledge-type tuning message.

Upon completing the tuning at state 116, the (near-field) transceiver enters a state 124, in which it exchanges one or more additional tuning messages of the acknowledge-type over the channel set it tuned to at state 116 and using the "Reply to" field it set at state 116. This exchange of additional tuning messages can be carried out for robustness.

Upon reaching a time out, or a predetermined count of successful exchanges of acknowledge-type messages, the (near-end) transceiver enters state 132, at which it considers that it is correctly tuned. The tuning process is considered complete and no more tuning messages are exchanged unless a loss of service condition occurs. Accordingly, in state 132, the (near-end) transceiver carries out its typical data communication over the channel set that it tuned itself to in states 116 and 124.

If a first loss of service condition occurs in which no data communication occurs for a first predetermined duration of time, the (near-end) transceiver returns to state 124 to exchange acknowledge-type tuning messages with the (far-end) other network device connected to the common channel set. This exchange reaffirms that the channel set is still available for data communication.

If a second loss of service condition occurs in which no data communication occurs for an extended predetermined duration of time (being greater than the first predetermined duration of time), the (near-end) transceiver returns to state 104 to carry out a new tuning process. In this case, it is considered that the previously used common channel set is no longer available, and a new iteration of the tuning process must be carried out to identify a new channel set for data communication.

Figure 3:
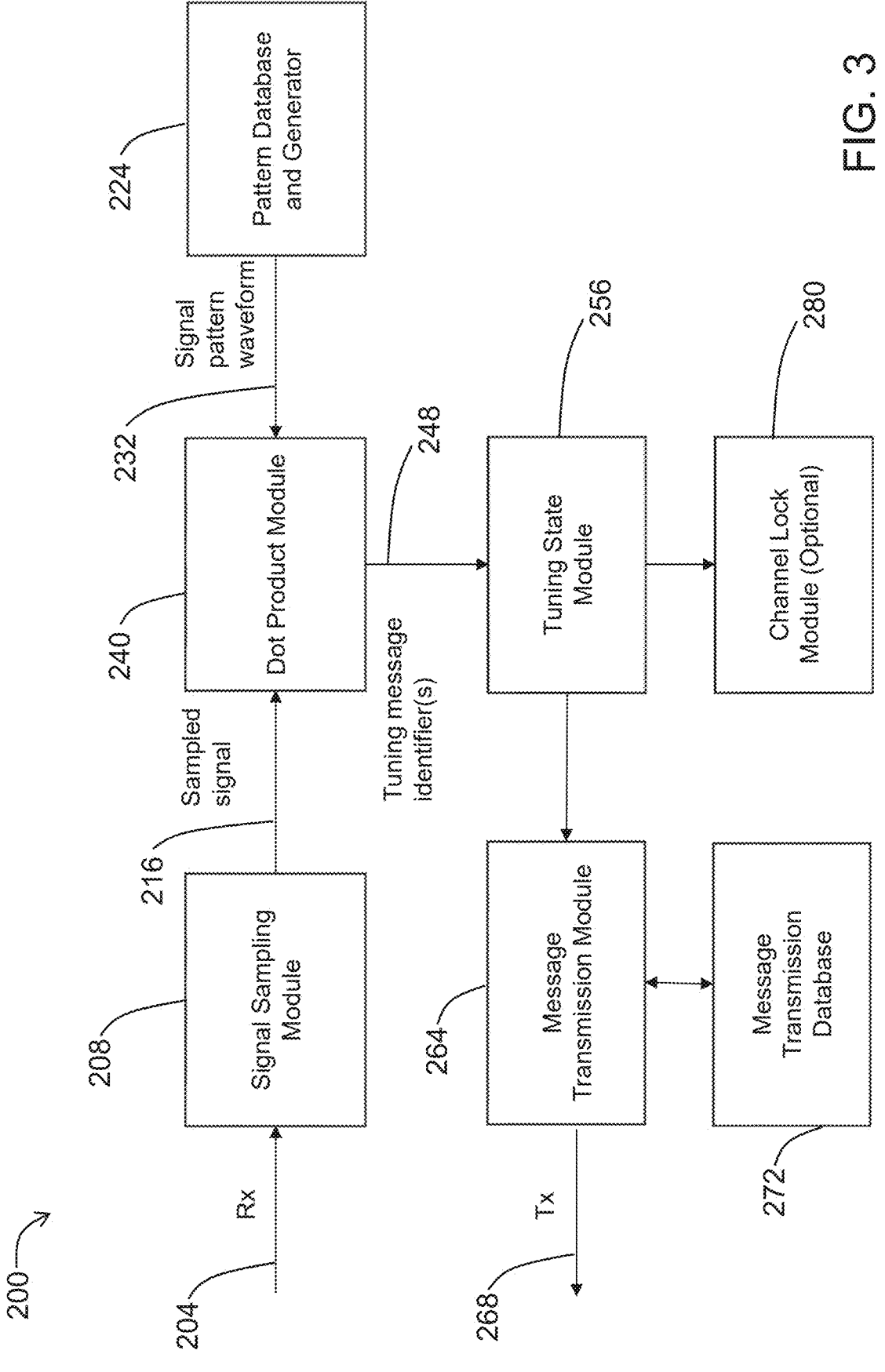
FIG. 3 illustrates a schematic diagram of the operational modules of an automatic tuning system operable for automatically tuning an optical transceiver according to one example embodiment.

Referring now to FIG. 3, therein illustrated is a schematic diagram of the operational modules of an automatic tuning system 200 operable for automatically tuning an optical transceiver connected to the optical network according to one exemplary embodiment. As described herein according to various example embodiments, the system can be embodied in different forms of network devices connectable to the optical network, and is not limited to be implemented within an optical transceiver.

The automatic tuning system 200 includes a signal sampling module 208 that is configured to receive optical signals 204 over an optical network and to sample the received signal 204 to generate a sampled signal 216. The signals transmitted can contain tuning messages transmitted from one or more optical transceivers on the optical network, the tuning messages being messages exchanged according to a predefined protocol for automatic tuning of these transceivers.

The sampling module 208 carries out the sampling on a version of the received optical signals 204 that has been converted into electrical signals, but which version is a representation of the analog characteristics of the received optical signals. It will be appreciated that a given tuning message will have a particular analog waveform within the raw optical signals transmitted over the optical network. The raw optical signals are converted to electrical signals such that the particular analog waveform corresponding to the tuning message is also present within the electrical signals. By sampling these electrical signals converted from optical signals present on the optical network, a portion of the sampled signal captured by the sampling module 208 will correspond to the waveform of the given tuning message. That portion of the sampled signal provides a representation of the given tuning message that is usable for further processing.

It will be appreciated that the sampling of the received signal 204 is carried out by the sampling module 208 while the received signal 204 is in its analog form. More particularly, the analog electrical signal (produced from applying an optical to electrical conversion to the received optical signal 204) is sampled. That is, the sampling is carried out while the tuning message is in a form defined by its analog waveform.

The received signal 204 is still in its analog, non-decoded form when it is sampled by the sampling module 208. As described herein, various tuning protocols (ex: specific to particular vendors/makes/models of pluggable transceivers) use tuning messages have informational fields (ex: defining message type, sent-by channel, reply-to channel) that are defined in data sequences, such as a string of digital characters or bits. The digital data sequences are encoded according to a specific encoding scheme defined according to the tuning protocol prior to being transmitted as tuning message in its raw optical signal form. Typically, a corresponding decoding scheme, which mirrors the applied encoding, is applied to the received tuning message in its raw optical signal form in order to retrieve the data sequence. The data sequence after decoding is then typically used to identify the information contained in the tuning message. In contrast to this typical decoding of the received tuning message to retrieve the data sequence, the sampling module 208 applies sampling directly on the tuning message in its analog form free of (i.e. without) applying the decoding.

Similarly, the received optical signal 204 is still in its analog, non-modulated form when it is sampled by the sampling module 208. As described herein, various tuning protocols (ex: specific to particular makes/models of optical transceivers) use tuning messages in which the initial information fields is modulated prior to being transmitted in its raw optical signal form. Typically, a corresponding de-modulation scheme, which mirrors the applied modulation is applied to the received tuning message in its raw optical form in order to retrieve the informational field. The informational field after de-modulation is then typically used to identify the information contained in the tuning message. In contrast to this typical demodulation of the received tuning message to retrieve the data sequence, the sampling module 208 applies sampling directly on the tuning message signal form free of (i.e. without) applying the demodulating.

The sampling by the sampling module 208 may be applied prior to both decoding and demodulating the tuning message. In other words, the sampling by the sampling module 208 is applied prior to, and free of, any bit recovery being applied to the received signal to recover any bit values of the data sequence encoded or modulated within the received tuning message.

The sampling module 208 generates the sampled signal 216 which is in the form of a series of discrete amplitude values. These values form an envelope that is a representation of the particular analog waveform corresponding to the tuning message. As described elsewhere herein, this particular analog waveform is present in the raw optical signal and is also present in the electrical signal resulting from applying an optical-to-electrical conversion of the optical signal. Where the tuning message is initially encoded and/or modulated to take on its raw optical signal form, the analog waveform of the tuning message when so encoded and/or modulated, and without being decoded and/or demodulated, is captured in the sampled signal 216.

Some tuning protocols use the encoding or the modulating of one or more informational fields of a tuning messages that are initially defined as a digital data sequence. The encoded/modulated signal generated from the digital data sequence is then transmitted within the optical signal. Such tuning protocols are herein referred to as "digital encoding/modulation-based tuning protocols".

Referring now to FIG. 4A, therein illustrated is a schematic diagram of the signal processing steps for a transmission-side encoding/modulating of a tuning message initially defined as a digital data sequence applying the digital encoding/modulation-based tuning protocol according to one example embodiment. The initial digital data sequence 160 (ex: having the value "10110010" to define "Ch n") is received at a receiver-side electrical encoding/modulation module 162. The module 162 encodes/modulates the initial digital data sequence 160 to produce the encoded/modulated electrical signal 164. In the illustrated example, a nonreturn-to-zero (NRZ) encoding/modulating scheme is used to encode/modulate the digital data sequence 160. A further optical modulation (ex: photodiode) 166 is applied to the encoded/modulated electrical signal 164 to produce the optical signal 168 that contains the tuning message and that is to be transmitted over the optical channel. This optical signal 168 is an analog signal.

Referring now to FIG. 4B, therein illustrated is a schematic diagram of the signal processing steps on the receiver side for treating a received optical signal containing a tuning message that was encoded/modulated according to the digital encoding/modulation-based tuning protocol according to one example embodiment. The optical signal 168 containing the tuning message is received. An optical-to-electrical conversion (ex: a photodetection module) 170 is applied to the optical signal 168 to generate the converted analog signal 204. In the illustrated example, since an NRZ encoding/modulating scheme was applied on the receiver side, the converted (electrical) analog signal 204 is also an NRZ signal. Typically, one would expect to apply a decoding/demodulating step 172 that mirrors the encoding/modulation applied on the transmitter side (ex: by encoding/modulation module 162). However, as described elsewhere herein, the sampling module 208 carries out sampling while the received signal 204 is in its analog form and the sampling is applied free of applying any decoding and/or demodulation or any bit value recovery. The sampling module 208 outputs the sampled signal 216 that has values forming an envelop that is representative of the particular analog waveform corresponding to the tuning message.

According to various example embodiments, the informational fields of the tuning message is represented in the particular envelop of that tuning message. More particularly, the shape of the envelop itself (i.e. amplitude values over time) is the informational field. Each piece of tuning information is associated with a distinct envelop. A given tuning message containing one or more pieces of tuning information (i.e. informational fields) is generated so that the tuning message in its optical signal form has the envelop associated to those pieces of tuning information. More particularly, encoding and/or modulation is applied at the transmitter-end so that the resulting analog optical signal has the particular envelop that forms the informational fields of the tuning message. Accordingly, applying the sampling to the optical signal having the envelop provides a sampled signal that captures this envelop. Tuning protocols that embed the informational fields of the tuning message within the analog waveform of the optical signals are herein referred to as "waveform-based encoding/modulation tuning protocols".

Figures 5A, 5B:
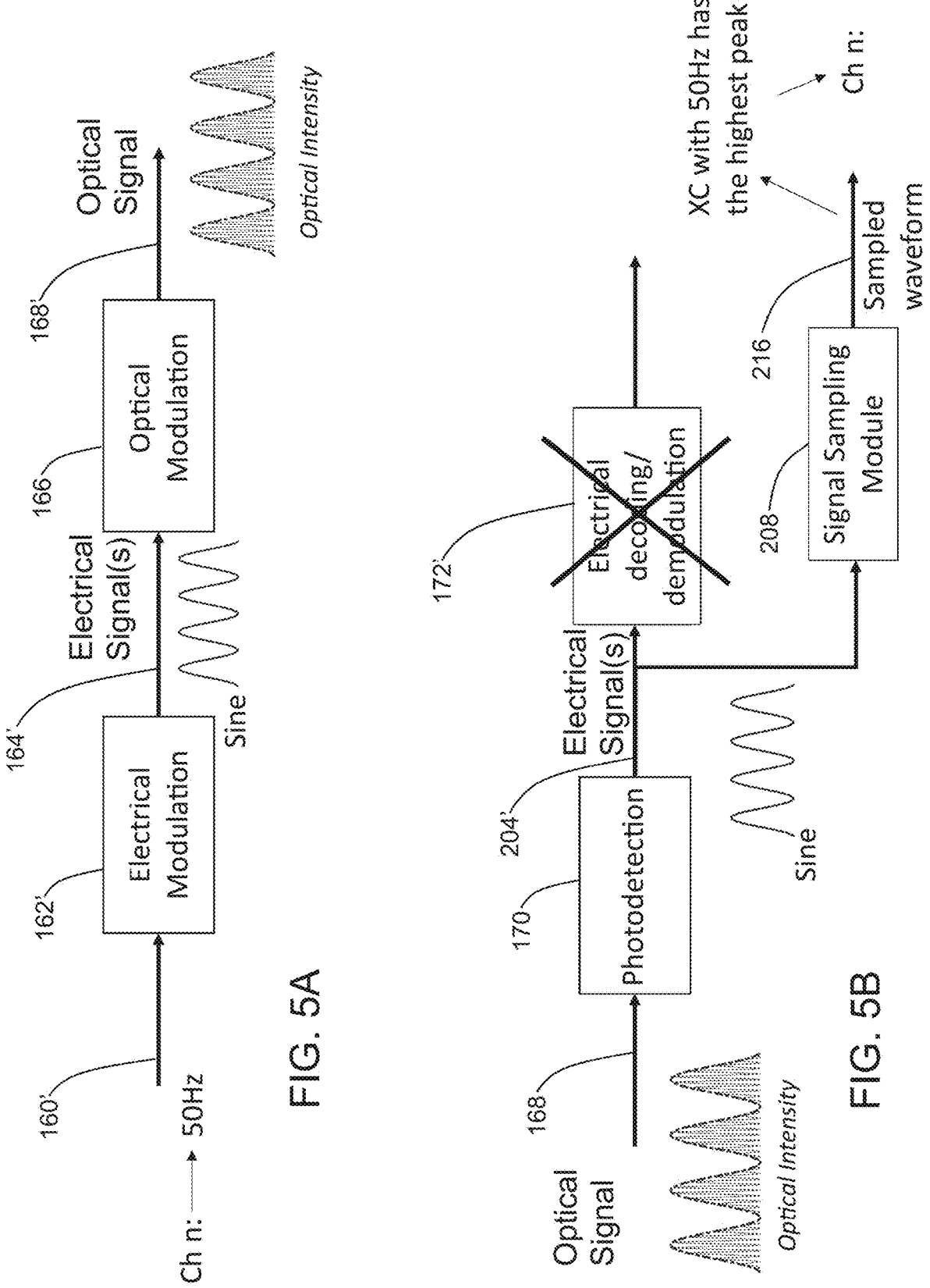
FIG. 5A illustrates a schematic diagram of the signal processing steps for a transmission-side encoding/modulating of a tuning message applying the waveform-based encoding/modulation tuning protocol according to one example embodiment.
FIG. 5B illustrates a schematic diagram of the signal processing steps on the receiver side for treating a received optical signal containing a tuning message that was encoded/ modulated according to the waveform-based encoding/ modulating tuning protocol according to one example embodiment.

Referring now to FIG. 5A, therein illustrated is a schematic diagram of the signal processing steps for a transmission-side encoding/modulating of a tuning message applying the waveform-based encoding/modulation tuning protocol according to one example embodiment. A set of signal parameter(s) 160' (ex: defining a frequency of 50 Hz) is received at a receiver-side electrical encoding/modulation module 162'. The module 162' encodes/modulates in accordance to the signal parameter(s) 160' to produce the encoded/modulated electrical signal 164'. In the illustrated example, a sine wave having the 50 Hz frequency is produced as the signal 164'. A further optical modulation (ex: photodiode) 166 is applied to the encoded/modulated electrical signal 164' to produce the optical signal 168' that has an envelop forming the tuning message and that is to be transmitted over the optical channel. This optical signal 168' is an analog signal.

Referring now to FIG. 5B, therein illustrated is a schematic diagram of the signal processing steps on the receiver side for treating a received optical signal containing a tuning message that was encoded/modulated according to the waveform-based encoding/modulation tuning protocol according to one example embodiment. The optical signal 168' containing the tuning message is received. An optical-to-electrical conversion (ex: a photodetection module) 170 is applied to the optical signal 168' to generate the converted analog signal 204. In the illustrated example, since the encoded/modulated electrical signal 164' is a sine wave, the converted (electrical) analog signal 204' is also a sine wave. Typically, one would expect to apply a decoding/modulating step 172' that mirrors the encoding/modulation applied on the transmitter side (ex: by encoding/modulation module 162). However, as described, elsewhere herein, the sampling module 208 carries out sampling while the received signal 204' is in its analog form and the sampling is applied free of applying any decoding and/or demodulation or any bit value recovery. The sampling module outputs the sampled signal 216 that has values forming an envelop that is representative of the particular analog waveform corresponding to the tuning message.

It will be understood that the sampling of the received signal 204 (to produce the envelope that is a representation of the analog waveform corresponding to the tuning message) is carried out in a manner that is agnostic to the encoding and/or modulation applied at the transmission of the tuning message.

Referring back to FIG. 3, the automatic tuning system 200 includes a tuning signal pattern database and generator 224 that stores a plurality of predetermined tuning signal patterns. Each tuning signal pattern includes a set of pattern parameters that can be used to generate a corresponding signal pattern waveform. The signal pattern waveform can be in the form of a series of discrete amplitude values. A given signal pattern can include pattern parameters in the form of a data sequence, such as a binary string, and an encoding format, and the corresponding signal pattern waveform can be generated by encoding the data sequence according to the encoding format. Another given signal pattern can include pattern parameters in the form of waveform parameters, such as shape and width of a series of pulses, and the signal pattern waveform is generated such that it has these parameters. The tuning signal pattern database and generator 224 is operable to selectively generate and output a signal pattern waveform 232 corresponding to a stored tuning signal pattern. The tuning signal pattern may also be stored as a series of discrete amplitude values, in which case it can be directly outputted as the signal pattern waveform 232.

Each stored tuning signal pattern enables generating a corresponding signal pattern waveform that is a reproduction of the waveform of the raw optical signal of a respective tuning message that can potentially be transmitted on the optical network as part of a tuning protocol. This reproduction can be a normalized reproduction of the raw optical signal. A signal pattern waveform can reproduce a whole tuning message or a component of a tuning message.

Each stored tuning signal pattern is stored in association with a corresponding set of tuning message identifier(s) (which can also be called "Command Token", as illustrated in FIG. 4). For a given tuning signal pattern, its tuning message identifier(s) define the informational field(s) of the tuning message or message component that is reproduced in the signal pattern waveform generated from that tuning signal pattern.

For example, a tuning message of the acknowledge type that is transmitted according to a tuning protocol can include a first component that is a type identifier identifying that the tuning message is of the acknowledge type, a second component corresponding to the "Sent by" field and having a first channel number, and a third component corresponding to the "Reply to" field and having a third channel number. In the optical form, each component has a respective signal waveform and the aggregate in time of the waveforms corresponding to each component forms the whole optical signal waveform for the tuning message of the acknowledge type.

The tuning signal pattern database and generator 224 has a first stored signal pattern that has stored a first set of tuning message identifier(s) indicating the acknowledge type. This first stored signal pattern also has stored a first set of pattern parameters that enables generating a signal pattern waveform reproducing the optical signal waveform of the first component of the tuning message of the acknowledge type. The signal pattern database and generator 224 has a second stored signal pattern that stores a second set of tuning message identifier(s) identifying the first channel number and a second set of pattern parameters that enable generating a signal pattern waveform reproducing the optical signal waveform of the second component of the tuning message. The signal pattern database and generator 224 also has a third stored signal pattern that stores a set of tuning message identifier(s) identifying the second channel number and a third set of pattern parameters that enable generating a signal pattern waveform reproducing the optical signal waveform of the third component of the tuning message.

Referring now to FIG. 6, therein illustrated is a table showing tuning messages and/or tuning message components stored in the database and generator 224 according to one example embodiment. In the exemplary two dimensions representation, the first column ("Command token") is a listing of different tuning message identifiers that may be used. The second column ("Vendor A") stores the corresponding signal pattern (i.e. signal pattern parameters for generating the signal pattern waveform) for the given tuning message identifier for a first vendor/make/model. Similarly, the third column ("Vendor B") stores the corresponding signal pattern for the given tuning message identifier for a second vendor/make/model.

Referring back to FIG. 3, the automatic tuning system 200 includes a dot product module 240 that receives the sampled signal 216 and, in turn, receives each of a plurality of signal pattern waveforms 232 generated by the tuning signal pattern database and generator 224. The dot product module 240 is operable to carry out a dot product operation between i) the sampled signal 216 and ii) a signal pattern waveform 232. For a given sampled signal 216, the dot product operation can be carried out for each of a plurality of signal pattern waveforms 232 received by the dot product operation module 240. As described elsewhere herein, the set of signal patterns selected for generating signal pattern waveforms 232 for a given sampled signal 216 may depend on the current tuning state of the automatic tuning system 200.

Various techniques for aligning in time and/or scaling in time can be applied to the sampled signal 216 and/or signal pattern waveform 232 prior to, or as part of, the dot product operation. Such techniques can include phase shifts, time shifts, circular dot product, zero-padding, etc. The sampled signal 216 and/or the signal pattern waveform 232 can also be scaled in amplitude. This scaling can include normalizing the amplitude values and/or applying a non-linear scaling (ex: taking to an N-th power). The sampled signals 216 can also be filtered.

The dot product operation performed by the dot product module 240 determines a measure of similarity between the sampled signal 216 and each of the stored signal pattern waveforms 232. Various types of dot product operations that determine a measure of similarity is presently contemplated, and can include, but is not limited to, sliding dot product, covariance, convolution, and cross-correlation.

The dot product module 240 is further operable to determine whether the measure of similarity between the sampled signal 216 and the stored signal pattern waveform 232 have a sufficient match. For example, it is determined that there is a sufficient match where the dot product operation produces an output exceeding a predetermined threshold. Where the dot product operation is a sliding dot product, such as a cross-correlation or convolution, it can be determined that there is a sufficient match where a peak of the sliding dot product waveform exceeds a predetermined threshold.

Where it is determined that there is a sufficient match between the sampled signal 216 and the received signal pattern waveform 232, it is further determined that the sampled signal 216 corresponds to a tuning message (or tuning message component) defining the informational fields identified in the set of tuning message identifier(s) stored in association with the signal pattern of the database 224 used to generate the given matching signal pattern waveform 232. In other words, where there is a sufficient match, it can be determined that a tuning message or message component having those information fields has been received by the automatic tuning system 200.

Where the sampled signal 216 and the signal pattern waveform 232 is found by the dot product module 240 to have a sufficient match, the dot product module 240 outputs the tuning message identifier(s) 248 associated to the matching signal pattern waveform 232. Where a plurality of tuning message components are identified, the tuning message identifiers 248 associated to each of the components are outputted by the dot product module 240 (ex: message type ("Command Token"), first ["Sent by"] channel, second ["Reply to"] channel).

The automatic tuning system 200 further includes a tuning state module 256 that is configured to track the present state within the series of tuning steps of a tuning protocol. The tuning state module 256 receives the tuning message identifier(s) 248 output by the dot product module 240 (in response to a sufficient match) and updates the present tuning state based on the tuning message identifier(s) 248.

Where the present state requires the transmission of an outgoing tuning message in response to the tuning message contained and identified in the matching sampled signal 216, the tuning state module 256 outputs a control signal to a message transmission module 264 of the automatic tuning system 200. The control signal defines the informational fields to be included in the outgoing tuning message (message type, "Sent-by" channel, "Reply-to" channel, vendor/make/model).

The automatic tuning system 200 includes a message transmission database 272 that stores a plurality of outgoing tuning messages that can possibly be transmitted within the tuning protocols supported by the automatic tuning system 200. The outgoing tuning message can be stored as a data sequence, such as binary string, and an encoding and/or modulation format (applicable for implementing an encoding/modulating based tuning protocol). The message transmission module 264 can receive the tuning message in this form and encode and/or modulate the data sequence to generate the tuning message in its physical optical form 268 for transmission over the optical network.

Additionally, or alternatively, the outgoing tuning message can be stored as waveform parameters, such as shape and width of a series of pulses (applicable for implementing a waveform-based tuning protocol) and the message transmission module 264 generates the physical optical form 268 of the tuning message having those waveform parameters.

According to various example embodiments in which the automatic tuning system 200 is embodied in a transceiver device and where the present state is one that allows for confirming that the transceiver device can be tuned to a specific transmission wavelength/channel, the tuning state module 256 outputs a locking message to a channel lock module 280 of the transceiver device. In response to receiving the locking message, the channel lock module 280 causes various communication modules (not shown) of the transceiver device to be configured to operate in its data communication mode at the given specific wavelength/channel(s). It will be appreciated that the channel lock module 280 is illustrated as optional in FIG. 3 to indicate that it is only present in some example embodiments. For example, where the automatic tuning system 200 is embodied in a network device that only serves to participate in automatic tuning operations of other transceivers, but does not operate for data communication, then the automatic tuning system 200 may not include the channel lock module 280.

Referring back to FIG. 2, the automatic tuning system 200 is involved in at least the states 112, 116, 120, and 124 of the automatic tuning state machine 100 illustrated therein, these states being identified by hashed outlines. For example, a network device implementing the automatic tuning system 200 does not operate for data communication (ex: network monitor/controller, as described elsewhere herein) and therefore does not need to tune itself. Accordingly, it does not implement state 108 of iteratively transmitting tuning messages of type request type. Instead, it begins operation in state 112 of listening for tuning messages of the request or acknowledge type. The state module 256 of the automatic tuning message then updates its state based on the tuning message identifier associated with the signal pattern waveform matching a sampled signal 216, thereby entering either states 116 or 120. The network device can then enter state 124 to repeat exchanges of messages for robustness. The signal patterns chosen and generated by the signal pattern database and generator 224 for matching against a sample signal 216 can depend on the current state of the system.

In other embodiments in which the network device does carry out data communication (ex: an automatic tuning enable transceiver device), then all of the states of the automatic tuning machine 100 illustrated in FIG. 2 may be implemented, including those (ex: states 112, 116, 120, 124) used by the automatic tuning system 200.

Referring back to FIG. 3, the receiving by the automatic tuning system 200 (denoted as a near-end device for this example) of an example request type message transmitted by an optical transceiver (denoted as a far-end device for this example) that requires automatic tuning illustrates the operation of the various modules of the automatic tuning system 200. The (near-end) automatic tuning system 200 is initially in a first state (ex: state 112) in which it is listening to request type messages sent from a (far-end) optical transceiver. In this state, the sampling module 208 repeatedly samples raw optical signals it receives from its connection to the optical network and generates a plurality of sample signals 216 from the repeated sampling.

For each given sampled signal 216, the dot product module 240 performs the dot product operation between the given sampled signal 240 and each of one or more signal pattern waveforms 232 generated by the tuning signal pattern database and generator 224. Since the automatic tuning system 200 is in a state wherein it is listening for request messages, only signal pattern waveforms 232 associated to tuning messages (or message components) of the request type are generated by the tuning signal pattern database and generator 224 and used in the dot product operation.

For example, only a first part/component of any tuning message is necessary to indicate that it is a tuning message and to identify the type of the message, and the signal pattern waveform(s) 232 for that message component is generated by database and generator 224 and used in the dot product operation in the dot product module 240.

For example, the automatic tuning system 200 can be configured to support only one tuning protocol, and the signal pattern waveform 232 corresponding to tuning message or message component of the request type is generated by database and generator 224 and used in the dot product operation in the dot product module 240.

Alternatively, the automatic tuning system 200 can be configured to support more than one tuning protocol (ex: for multiple make/models of pluggable transceivers that each have their own encoding/modulation based tuning protocol), and the signal pattern waveform 232 corresponding to tuning message or message component of the request type for each tuning protocol is generated by database and generator 224 and used in the dot product operation in the dot product module 240.

Alternatively, or additionally, the automatic tuning system 200 can be configured to support one or more waveform-based encoding/modulation tuning protocols in addition to, or alternatively to, supporting one or more digital encoding/modulation-based tuning protocols.

Most of the time, the sampled signal 216 is a noise-like signal and does not contain a request type tuning message that the (near-end) automatic tuning system 200 is attempting to detect in its first state (state 112). Accordingly, the dot product operation between the sampled signal 216 and each of the one or more signal pattern waveforms 232 corresponding to tuning messages or message components of the request type will not have a sufficiently high measure of similarity to indicate a match. These sample signals 216 are discarded and the sampling and dot product operations are continued to further continue detecting a tuning message of the request type.

Where a given sampled signal 216 contains a tuning message of the request type, the request message will be captured as a discrete sampled representation of the waveform of the raw optical signal of the tuning message of the request type. Accordingly, the dot product operation between the sample signal 216 and each of the one or more signal pattern waveform 232 corresponding to tuning messages or message components of the request type will yield one dot product result that will have a sufficiently high measure of similarity to indicate a match.

Where the match is for a message component (i.e. a portion of the whole tuning message), further signal pattern waveforms 232 corresponding to additional components that is expected to follow the first message component are generated and used in the dot product operation. For example, where the message component identifying the tuning message is of the request type, signal pattern waveforms 232 corresponding to tuning components for each wavelength/channel are generated and used in the dot product operation to identify a matching tuning component indicating the wavelength/channel.

For the matching tuning message identified by the dot product module 240, the tuning message identifier(s) associated to the matching signal pattern waveform(s) (for the whole tuning message or for multiple message components) are outputted in matching identifier(s) 248. In the case of identifying a received tuning message of the request type, the matching identifier(s) 248 may indicate that the matching message is of the request type and the "Sent by" wavelength/channel contained in the message (ex: "Channel <i>". The matching identifier(s) 248 may further indicate the specific tuning protocol (ex: as identified by make and/or model of pluggable transceiver) of the matching tuning message.

The tuning state module 256 receives the tuning message identifier(s) 248 and updates the current state of the automatic tuning system 200 within the tuning protocol according to the tuning message identifier(s) 248. In the case of receiving a tuning message of the request type, the tuning state module 256 updates its state to a second state (ex: state 120) indicating that the request type message has been received and that acknowledgment messages are to be transmitted over available channels.

The tuning state module 256 sends a control signal to message transmission module 264 to send the acknowledge-type message 268.

Where the received request-type tuning message follows a specific tuning protocol, the outgoing reply transmission message 268 should follow the same tuning protocol. Accordingly, the appropriate outgoing acknowledge-type tuning message for the specific tuning protocol is retrieved from the message transmission database 272 and used for generating the acknowledge-type message 268 to be transmitted.

After sending the acknowledge-type messages, the (near-end) automatic tuning system 200 enters a third state (ex: state 116) where it listens to tuning messages of the acknowledge type from a device on the other end of the common channel and being in response to the transmitted acknowledge type messages. The (near-end) automatic tuning system 200 processes received optical signals in the same manner as for tuning messages of the request-type, but is now looking to identify tuning messages of the acknowledge type. Where the dot product module 240 identifies a match of a tuning message of the acknowledge type, the tuning state module 256 can further cause the system 200 to enter a tuned state. Where the (near-end) automatic tuning system 200 is part of a transceiver operable for data communication, the channel lock module 280 is operated to cause the transceiver to be configured (i.e. tuned) for receiving and transmitting data (other than tuning messages) at the receive and transmit channel set identified in the tuning messages.

Figure 7:
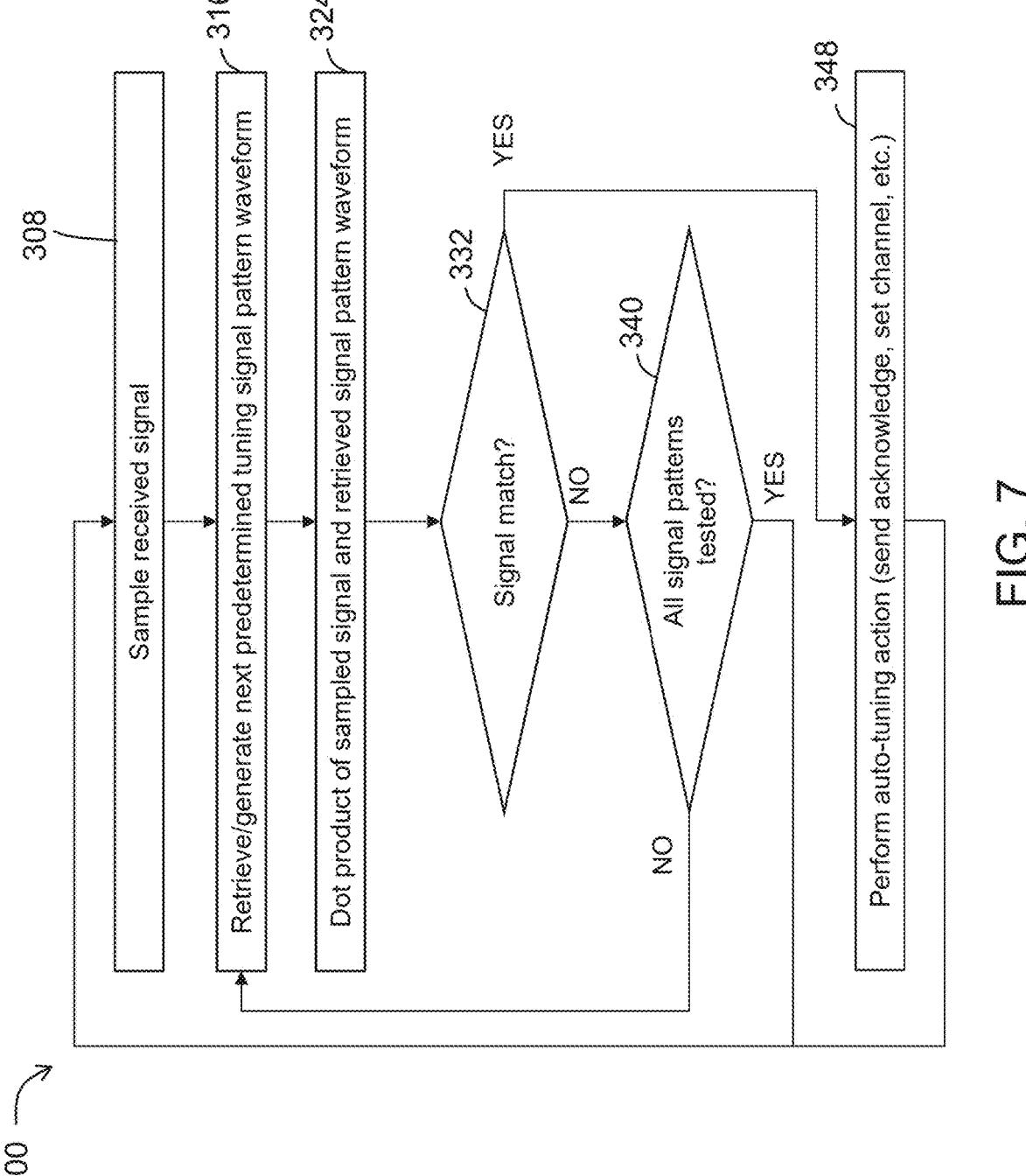
FIG. 7 illustrates a flowchart showing the operational steps of an automatic tuning method according to one example embodiment.

Referring now to FIG. 7, therein illustrated is a flowchart showing the operational steps of an automatic tuning method 300 according to one example embodiment. The automatic tuning method 300 may be carried out at various modules of the automatic tuning system 200.

At step 308, a sampled signal 216 is generated by sampling a segment of the received incoming optical signal 204. The step 308 may be carried out at the sampling module 208.

At step 316, a signal pattern waveform 232 to be tested in a current iteration is generated and retrieved. The signal pattern waveform 232 is generated from one of the stored tuning signal patterns and is a reproduction of a tuning message or a message component that could be received according to the current state of the tuning scheme. The step 316 may be carried out at the tuning signal pattern database and generator 224.

At step 324, a dot product operation is carried out between the sampled signal 216 generated at step 308 and the signal pattern waveform 232 generated at step 316. The dot product operation can be carried out at the dot product module 240.

At step 332, it is determined, based on the result of the dot product operation of step 324, whether the sampled signal 216 and the signal pattern waveform 232 currently being tested represents a sufficient match. As described, a match can be found where the result of the dot product operation, or a peak of the resulting curve from the dot product operation, exceeds a predetermined threshold. The determination of the match can also be carried out at the dot product module 240.

If no match is determined at step 332, the method 300 proceeds to step 340 to determine if there are other signal pattern to be evaluated against the sampled signal 216. If there are other signal patterns ("All signal patterns tested": NO), the method returns to step 316 to generate the signal pattern waveform 232 for the next stored signal pattern to be evaluated. Steps 324 and 332 are then carried out in a next iteration for the next signal pattern to be evaluated.

If there are no other signal patterns to be evaluated at step 340 ("All signal patterns tested": YES), this means that all signal patterns corresponding to tuning messages that could potentially be received for the current tuning state have been evaluated without finding a match for the current sampled signal 216. Accordingly, the method returns to step 308 to sample the received optical signal to generate another sampled signal 216, thereby starting another iteration of method 300.

Returning to step 332, if a match is determined at step 332, the method 300 proceeds to step 348 to carry out the subsequent automatic tuning actions based on the tuning message identifier(s) 248 of matching signal pattern. As described herein, the subsequent automatic tuning actions may include updating the present tuning state of the system 200, transmitting an appropriate outgoing tuning message 268 (ex: acknowledge type message), and optionally setting various communication modules of the network device 400 implementing the system 200 to operate at the channel set defined in the tuning message identifier(s) 248.

The method 300 may further return to step 308 to start another iteration by sampling another sampled signal 216. For example, the next iteration may be carried out to listen for an acknowledge type message (ex: state 120 of FIG. 2). Alternatively, the next iteration may be carried out to listen for other request type tuning message from another automatic tuning message (for embodiments for tuning multiple transceivers from a single automatic tuning system 200).

Figure 8:
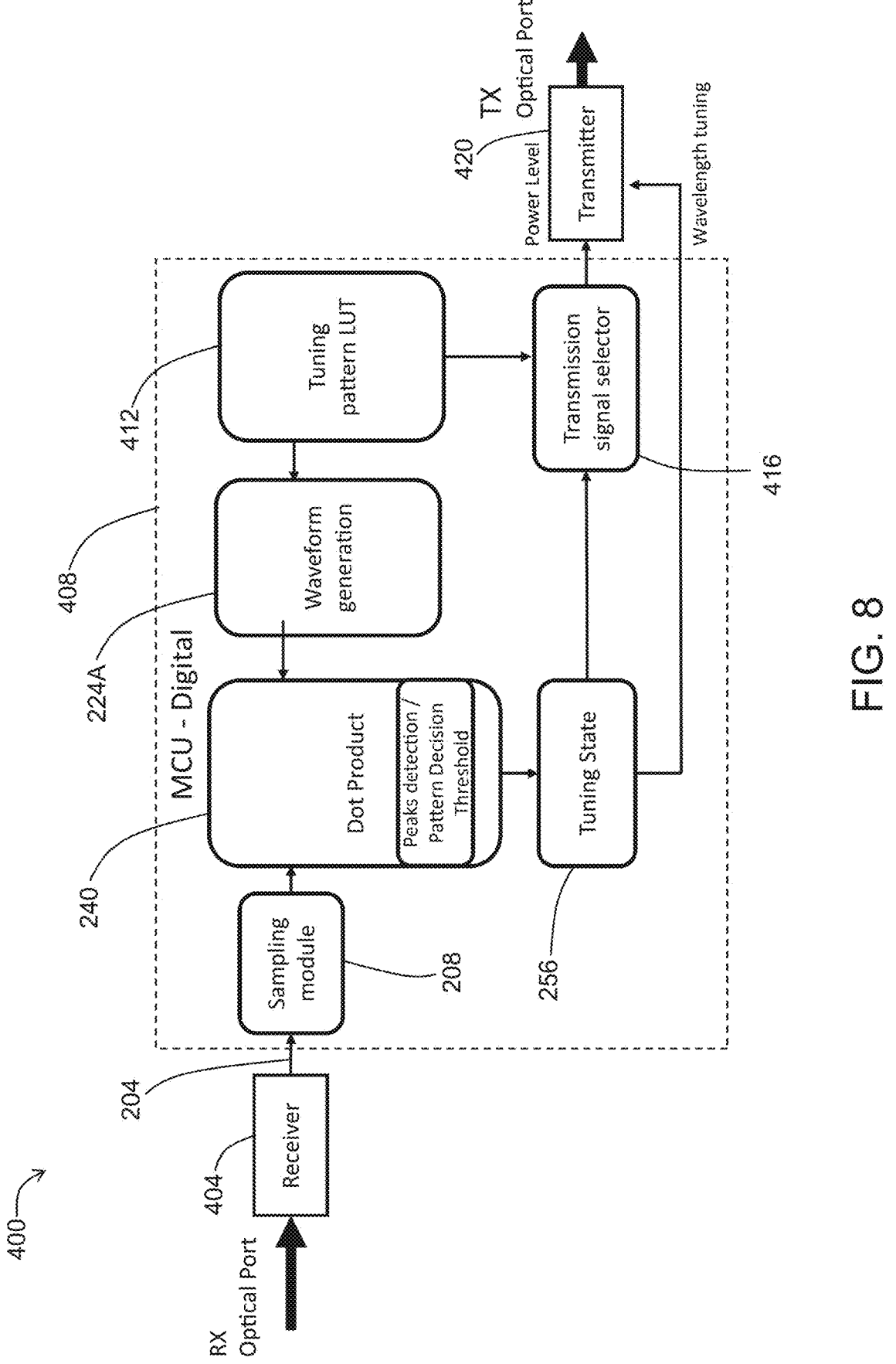
FIG. 8 illustrates a flowchart showing the operational steps of an exemplary automatic tuning system as broken down by hardware and software implementation.

Referring now to FIG. 8, therein illustrated is a schematic diagram of an example embodiment of an automatic tuning system 200 as broken down by hardware and software implementation within a network device 400. The optical signal received at the optical port is treated by hardware receiver components 404 that perform a function of converting the optical signal to the analog electrical signal 204 wherein the signal 204 retains the analog waveform of the received optical signal. The electrical signal 204 can be drawn from signals present within power monitoring functionalities of the receiver components. The power monitoring functionalities may be found as part of the receiving photodiode and/or photocurrent monitor or avalanche photodiode bias control. The hardware receiver components 404 can be existing hardware components typically found on the network device 400 (ex: in the form of a optical transceiver or network controller).

The received signal 204 is sampled by the sampling module 208. As illustrated in FIG. 8, the sampling module 208 is implemented in the micro-controller unit 408 of the network device 400. The sampling module 208 can be an existing module of the network device 400, such as where the network device 400 is provided as a programmable device.

Continuing with FIG. 8, the dot product module 240 (which includes the peak detection/pattern decision threshold module illustrated in FIG. 8), the waveform generator portion 224A of the pattern database and generator 224, and the tuning state module 256 are implemented as software modules within a digital micro-controller unit 408 of the network device 400. Memory available on the digital micro-controller unit 408 can be used to implement the storage of the signal patterns of the pattern database 224 and the message transmission database 272 of the automatic tuning system 200, which is illustrated as a single look up table (LUT) 412 in FIG. 8. It was observed that the quantity of signal patterns that need to be stored to support various tuning messages used in various tuning protocols is sufficiently small such that the memory available on typical programmable network device is sufficient to store all of these signal patterns.

The microcontroller 408 can be an existing microcontroller unit typically found on a network device (ex: optical transceiver or network controller) that is appropriately programmed to implement the software modules of the automatic tuning system 200.

The message transmission module 264 of the automatic tuning system 200 can be partially implemented in software and partially implemented in hardware. A transmission signal selector submodule 416 retrieves, based on a current tuning state, the appropriate tuning message for transmission from the LUT 412. The physical transmitter is implemented within hardware transmission components 420 of network device 400. The hardware transmission components 420 can include a transmitting laser diode. Where an analog waveform is transmitted (ex: for waveform-based encoding/modulation tuning protocols), the hardware transmission components 420 can also include a laser driver/bias control. The hardware transmission components 420 can be existing hardware components typically found on the network device 400 (ex: in the form of a optical transceiver or network controller).

Figure 9:
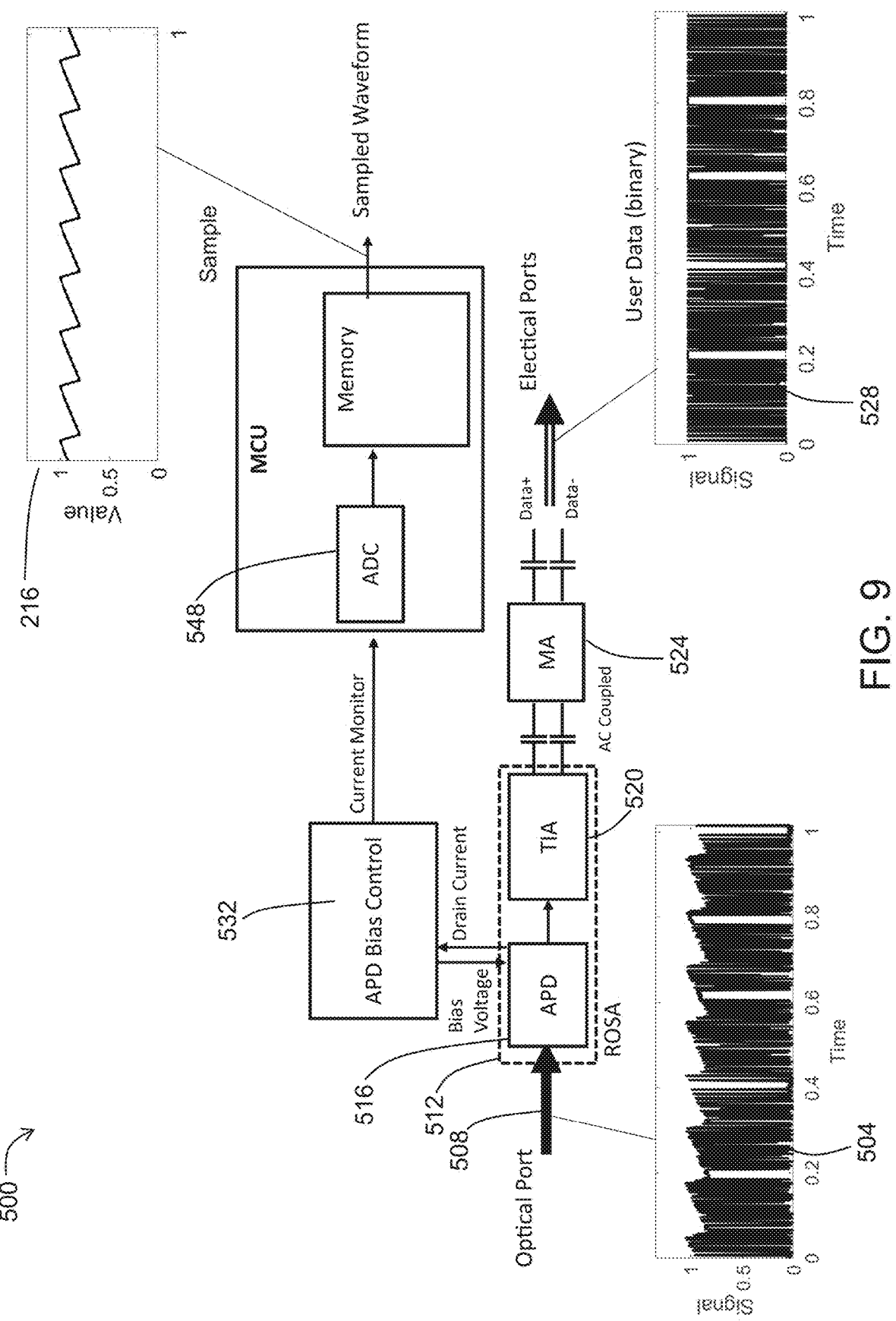
FIG. 9 illustrates a schematic diagram of the receiver hardware components for implementing a signal sampling module according to one example embodiment.

Referring now to FIG. 9, therein illustrated is a schematic diagram of the receiver hardware components 500 of the network device according to one example embodiment. A segment of the raw optical signal 504 present on the optical network is received at a receiving optical port 508 of the receiver hardware components 500 of the network device 400. The raw optical signal 504 is a mixed signal having a low-frequency component corresponding to a tuning message and a high frequency component corresponding to data communication being communicated over the optical network. A receiver optical sub assembly (ROSA) 512 of the receiver hardware components 500 includes an avalanche photodiode (APD) 516 and a transimpedance amplifier (TIA) 520 which act to convert the raw optical signal 504 to a corresponding electrical signal. This converted signal, which is further amplified by an amplifier 524 (ex: main amplifier, limiting amplifier or automatic gain control), contains the normally communicated data 528, which can be processed by other computing devices (ex: data servers) connected to the network. A photodiode bias control module 532 taps intermediate signals present within the avalanche photodiode (APD) 516 and transimpedance amplifier (TIA) 520. In particular, the APD bias control module 532 monitors the level of photocurrent passing through the APD to generate a received signal strength indicator (RSSI) 540 within the subassembly 512. The level of photocurrent is proportional to the intensity of the optical signal. This RSSI 540 is an electrical representation of the received optical signal 504. Accordingly, the RRSI 540 acts as the electrical signal 204 converted from the received optical signal 508. Sampling this electrical representation produces the sampled signal 216. This sampling may be carried out by an analog-to-digital conversion (ADC) 548 of the microcontroller unit 408, whereby the analog-to-digital conversion (ADC) 548 acts as the sampling module 208 (FIG. 3).

It will be appreciated that the sampling by the ADC 548 is applied to a signal that is present forward of any such decoding/demodulation or data recovery.

It was observed that that the typical optical to electrical conversion within the receiver optical sub assembly 512 causes clipping of the incoming signal such that the low frequency waveform representing the tuning message may be lost over the data path that includes the amplifier 524. It was further observed that with proper design of the bias control circuit, the low frequency monitoring signal of the bias control module 532 retained the low frequency waveform within the raw optical signal 504 such that the sampled tuning message as represented by the low frequency waveform is properly captured and can be properly identified through the dot product operation within the automatic tuning system 200.

Figure 10:
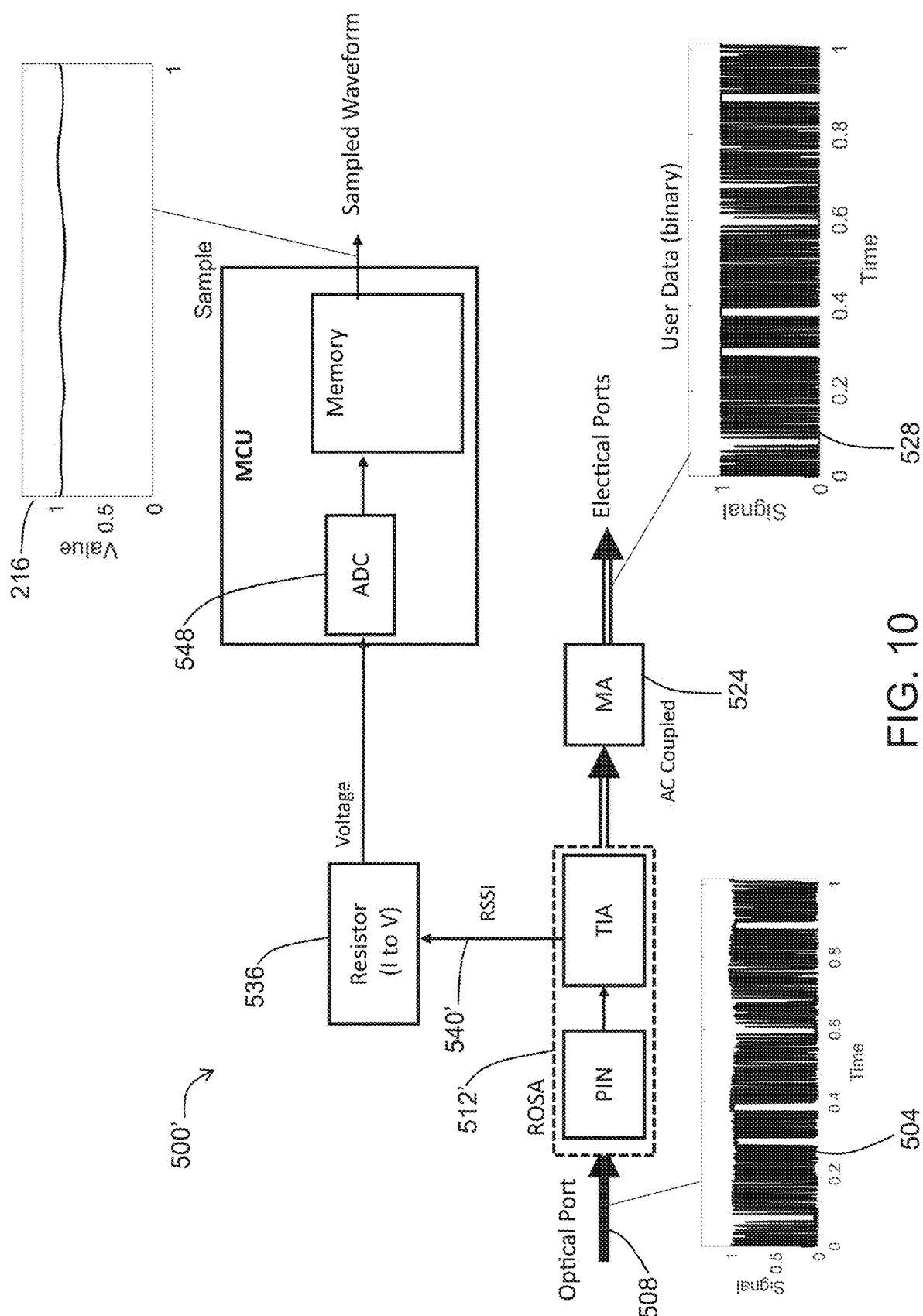
FIG. 10 illustrates a schematic diagram of the receiver hardware components for implementing a signal sampling module according to an alternative example embodiment.

Referring now to FIG. 10, therein illustrated is a schematic diagram of the receiver hardware components 500' of the network device according to an alternative example embodiment. A segment of the raw optical signal 504 present on the optical network is also received at a receiving optical port 508 of the receiver hardware components 500' of the network device 400. The receiver optical sub assembly (ROSA) 512' of the receiver hardware components 500' includes a PiN photodiode and a transimpedance amplifier (TIA) which act to convert the raw optical signal 504 to a corresponding electrical signal. This converted signal, which is further amplified by an amplifier 524, contains the normally communicated binary data 528, which can be processed by other computing devices (ex: data servers) connected to the network. The current (I) level within the receiver optical sub assembly 512' is measured, this current level being representative of the amplitude level of the received optical signal. An ammeter 536 can be used to measure the current level on the received signal strength indicator (RSSI) 540' within the subassembly 512', which is representative of the current level within the receiver optical sub assembly 512'. In the illustrated example, the ammeter 536 can simply be a resistor, whereby the voltage (V) value across the resistor is measured. The current level can also be amplified. This voltage signal acts as the electrical signal 204 converted from the received optical signal 508. Sampling the current values (or the voltage values across the resistor) over time, such as by the ADC 548 of the MCU 408, provides the sampled signal 216. It will be appreciated that the sampling is also carried out on a signal that is present prior to any decoding/demodulation or data recovery that is carried out by the amplifier 524.

According to various example embodiments, the tuning messages are transmitted as low bandwidth messages. More particularly, the bandwidth of the tuning messages is substantially lower than the bandwidth of the data communicated over the optical channel. Even more particularly, the bandwidth of the tuning messages can be in the kilohertz range or lower. It was observed that using tuning messages having a bandwidth in this low frequency range allows the waveforms corresponding to the tuning messages to be recovered by the ADC that is already available on the MCU of various commercially available programmable network devices, such as programmable transceivers.

Figure 11:
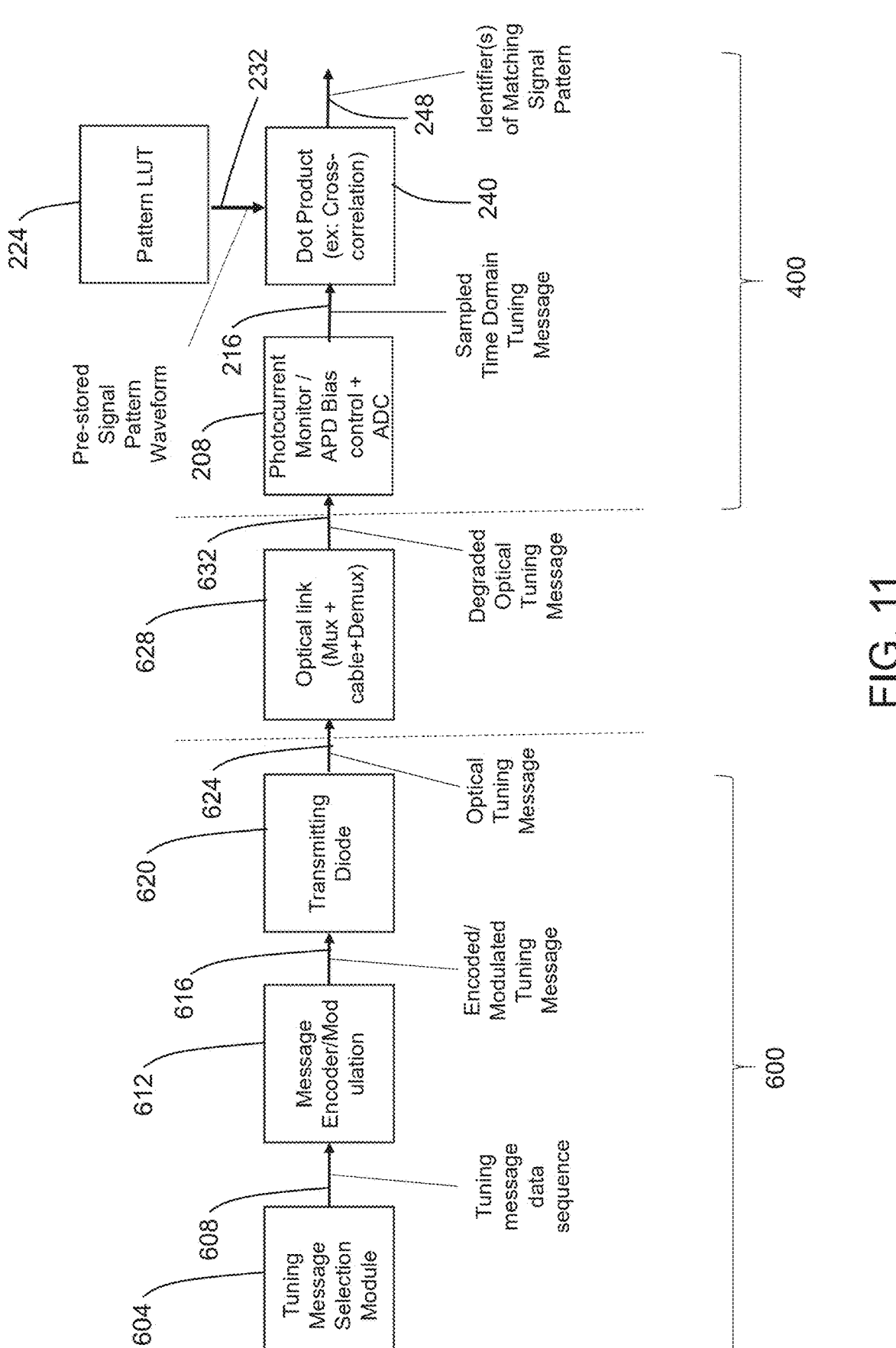
FIG. 11 illustrates a schematic diagram of the progression of signals between an automatic tuning enabled transceiver and a network device having an automatic tuning system according to an example embodiment.

Referring now to FIG. 11, therein illustrated is a schematic diagram of the progression of signals between an automatic tuning enabled transceiver 600 and a network device 400 having an automatic tuning system 200 according to an example embodiment. In the illustrated example, the automatic tuning enable transceiver 600 uses a digital encoding/modulation-based tuning protocol in which a tuning message initially defined as a data sequence is encoded and/or modulated prior to being transmitted in its optical form. A tuning message selection module 604 of the automatic tuning enabled transceiver 600 selects the parameters (ex: message type and wavelength(s)) of a tuning message to be transmitted and generates that tuning message in its data sequence form 608. An encoding module 612 encodes the tuning message from its data sequence form to an encoded/modulated form suited for transmission. A transmitting diode of the automatic tuning enabled transceiver 600 converts the encoded/modulated tuning message to an optical signal 624 which is then transmitted onto the optical network. The tuning message in optical form travels over an optical link 628 formed of the transmission side passive combiner/splitter, feeder cable and receiver side passive combiner/splitter. The tuning message in optical form 632 (having been degraded from traveling over the optical link 628) is received by the automatic tuning enabled network device 400 connected to the common wavelength/channel. The sampling module 208 of the automatic tuning system 200 of the automatic tuning enabled network device 400 samples the received optical signal 632 and outputs a sampled signal 216 having a waveform capturing the transmitted tuning message. In the illustrated example, a photocurrent monitor or an APD bias control module (as described herein with references to FIGS. 7 and 8) provides an optical-to-electrical conversion and the converted signal is further sampled by an ADC to generate the sampled signal 216. As described elsewhere herein, the sampling is carried out free of (i.e. without) a full data recovery (i.e. conversion to binary data sequence) of the initial data sequence used to generate the transmitted tuning message or any communication data present on the optical ink 628. That is, the sampling is carried out free of any decoding and/or demodulation of the received tuning message. The sampled signal 216 is received by the dot product module 240. The dot product module 240 then performs the dot product operation between the sampled signal 216 and each of a plurality of signal pattern waveforms 232 received from the pattern database and generator 224. The tuning message identifier(s) 248 of the matching signal pattern determined from the dot product operations is outputted from the dot product module 240, which is used to define the subsequent steps of the tuning scheme performed at the receiving automatic tuning enabled network device 400.

Figure 12:
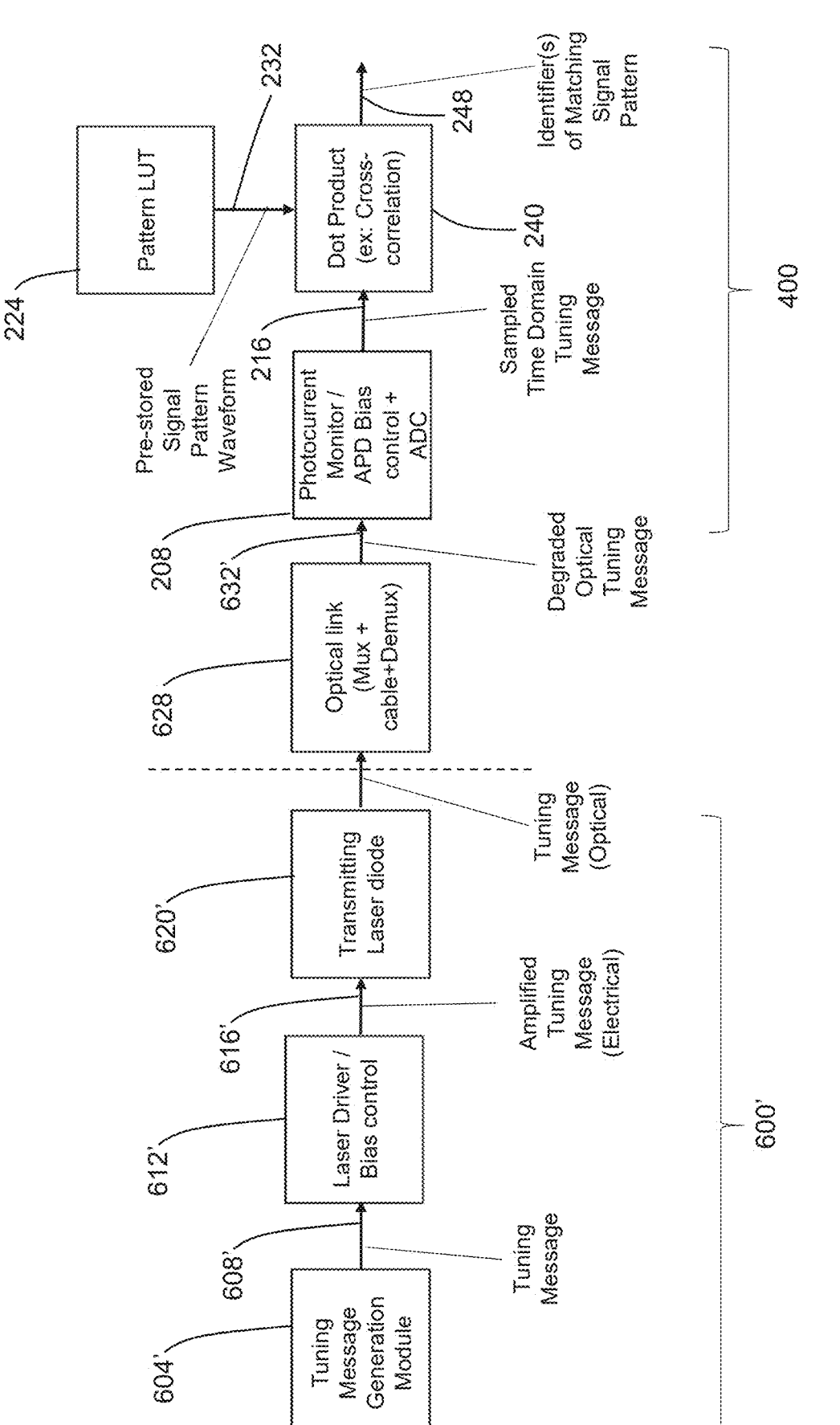
FIG. 12 illustrates a schematic diagram of a progression of signals between an automatic tuning enabled transceiver and a network device having an automatic tuning system according to another example embodiment.

Referring now to FIG. 12, therein illustrated is a schematic diagram of a progression of signals between an automatic tuning enabled transceiver 600' and a network device 400 having an automatic tuning system 200 according to another example embodiment. In the illustrated example, the automatic tuning enabled transceiver 600' uses waveform-based encoding/modulation tuning protocol to transmit a tuning message as an optical signal having a particular envelope that defines the informational fields of the tuning message. A tuning message generation module 604' of the automatic tuning enabled transceiver 600' selects the parameters (ex: message type and wavelength(s)) of a tuning message to be transmitted and generates the waveform corresponding to that tuning message. The tuning message selection module 604' includes a digital to analog converter that converts a series of discrete amplitude values corresponding to the generated waveform into a continuous analog waveform signal 608'. The analog waveform signal 608' is further amplified, such as by a laser driver or bias control module 612', to generate amplified tuning message 616'. The analog waveform signal 616' is converted to its corresponding optical form by a photodiode, which may be implemented as a transmitting laser diode 620'. The tuning message in this optical analog waveform travels over an optical link 628 formed of the transmission side passive combiner/splitter, the feeder cable and the receiver side passive combiner/splitter. The tuning message in its optical form 632' is received by the automatic tuning enabled network device 400 connected to the common wavelength/channel. The sampling module 208 of the automatic tuning system of the automatic tuning enabled network device samples the received optical signal and outputs a sampled signal 216 having a waveform capturing the transmitted tuning message. Since the informational fields of the tuning message is embedded in its waveform, the sampling is carried out on the raw optical signal (or on an electrical signal converted from the raw optical signal). In the illustrated example, a photocurrent monitor or an APD bias control module (as described herein with references to FIGS. 5 and 6) provides this optical-to-electrical conversion and the converted signal is further sampled by an ADC to generate the sampled signal 216. As described elsewhere herein, the sampling is carried out free of (i.e. without) a full data recovery (i.e. conversion to binary data sequence) of the initial data sequence used to generate the transmitted tuning message or any communication data present on the optical ink 628. That is, the sampling is carried out free of any decoding and/or demodulation of the received tuning message. The dot product module 240 then performs the dot product operation between the sampled signal 216 and each of a plurality of signal pattern waveforms received from the pattern database and generator 224. The identifier(s) (characteristics/parameters) of the matching signal pattern determined from the dot product operations is outputted from the dot product module 240, which is used to define the subsequent steps of the tuning scheme performed at the receiving automatic tuning enabled network device 400.

Figures 13A, 13B, 13C:
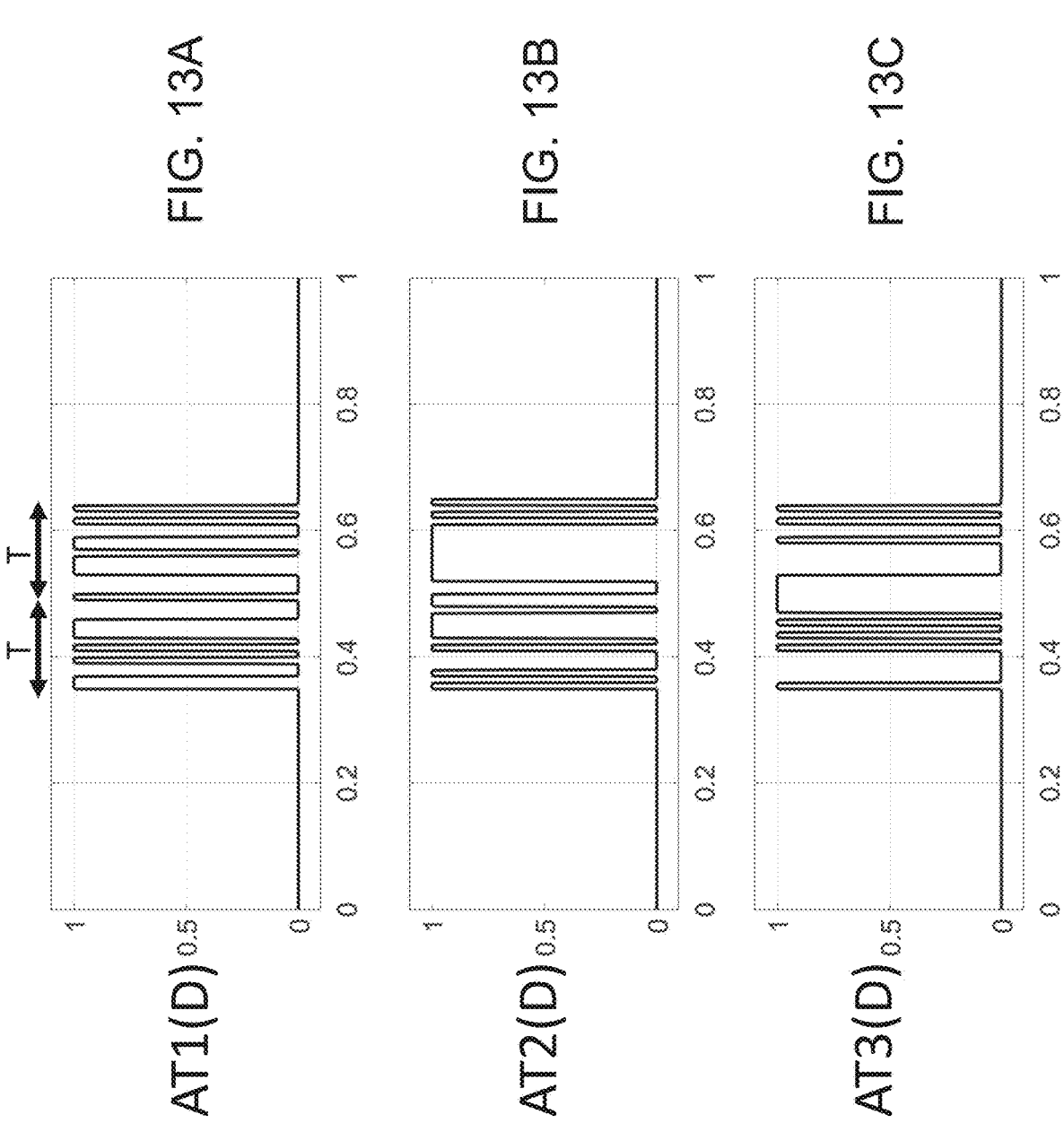
FIGS. 13A to 13C illustrate three exemplary tuning messages generated according to the digital encoding/modulation-based tuning protocol.

Referring now to FIGS. 13A to 13C, therein illustrated are three exemplary tuning messages generated according to the digital encoding/modulation-based tuning protocol. FIGS. 13A to 13C show the tuning messages after being encoded and as they are being transmitted from a transceiver. In the illustrated examples, the digital encoding/modulation of the data sequences produces three respective waveforms that each have a sequence of high and low values. These plots can also be representative of the corresponding signal pattern waveforms generated by the tuning signal pattern database and generator 224.

Figures 13D, 13E, 13F:
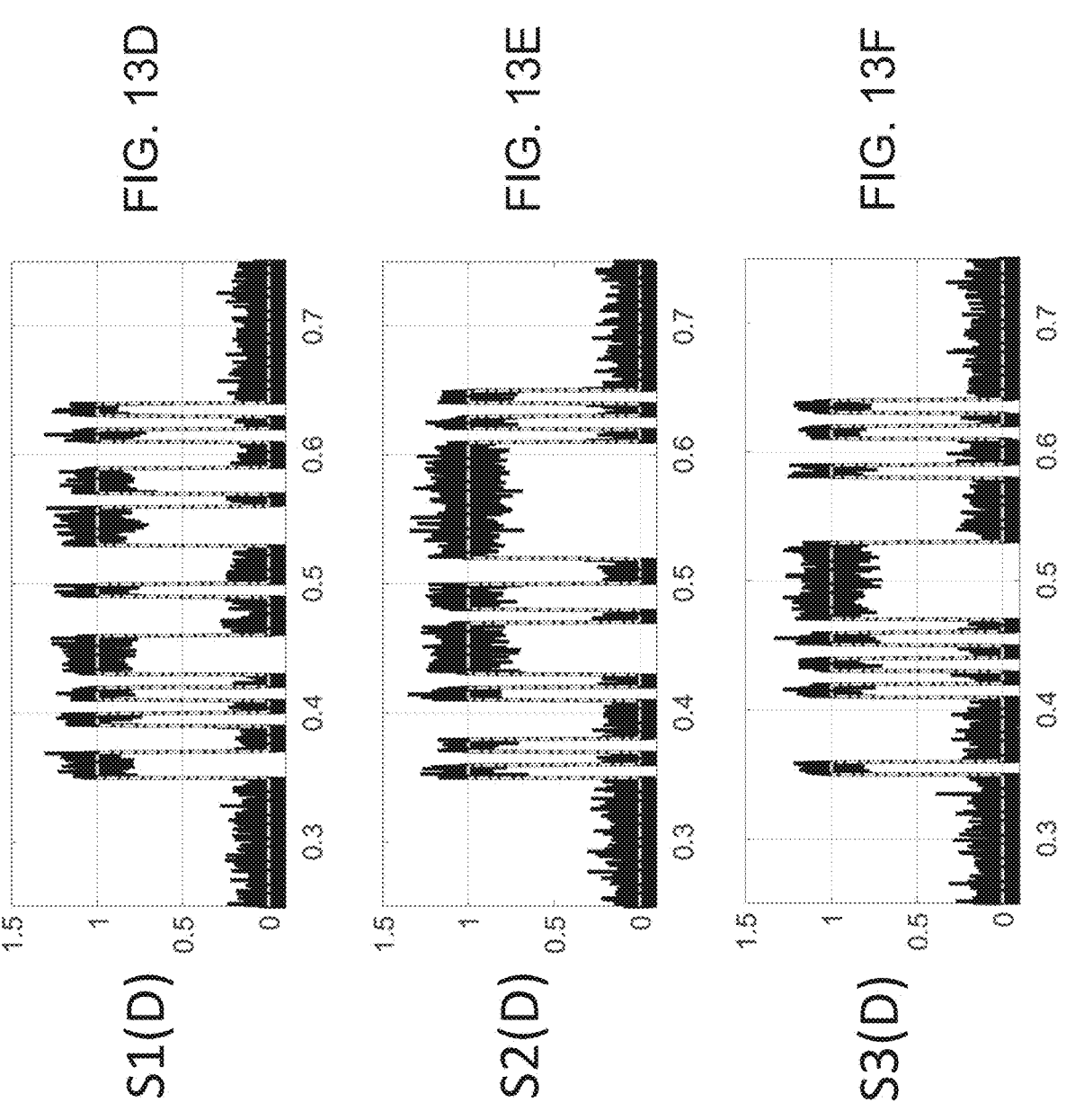
FIGS. 13D to 13F illustrate the three exemplary tuning messages of FIGS. 13A to 13C as they are received after having traveled over an optical link.

Referring now to FIGS. 13D to 13F, therein illustrated are the three exemplary tuning messages of FIGS. 13A to 13C as they are received at an automatic tuning network device after having traveled over an optical link. The optical link has fairly low noise such that the high and low values of the exemplary waveforms are readily perceptible and detectable in the received tuning messages of FIGS. 13D to 13F.

Figures 13G, 13H, 13I:
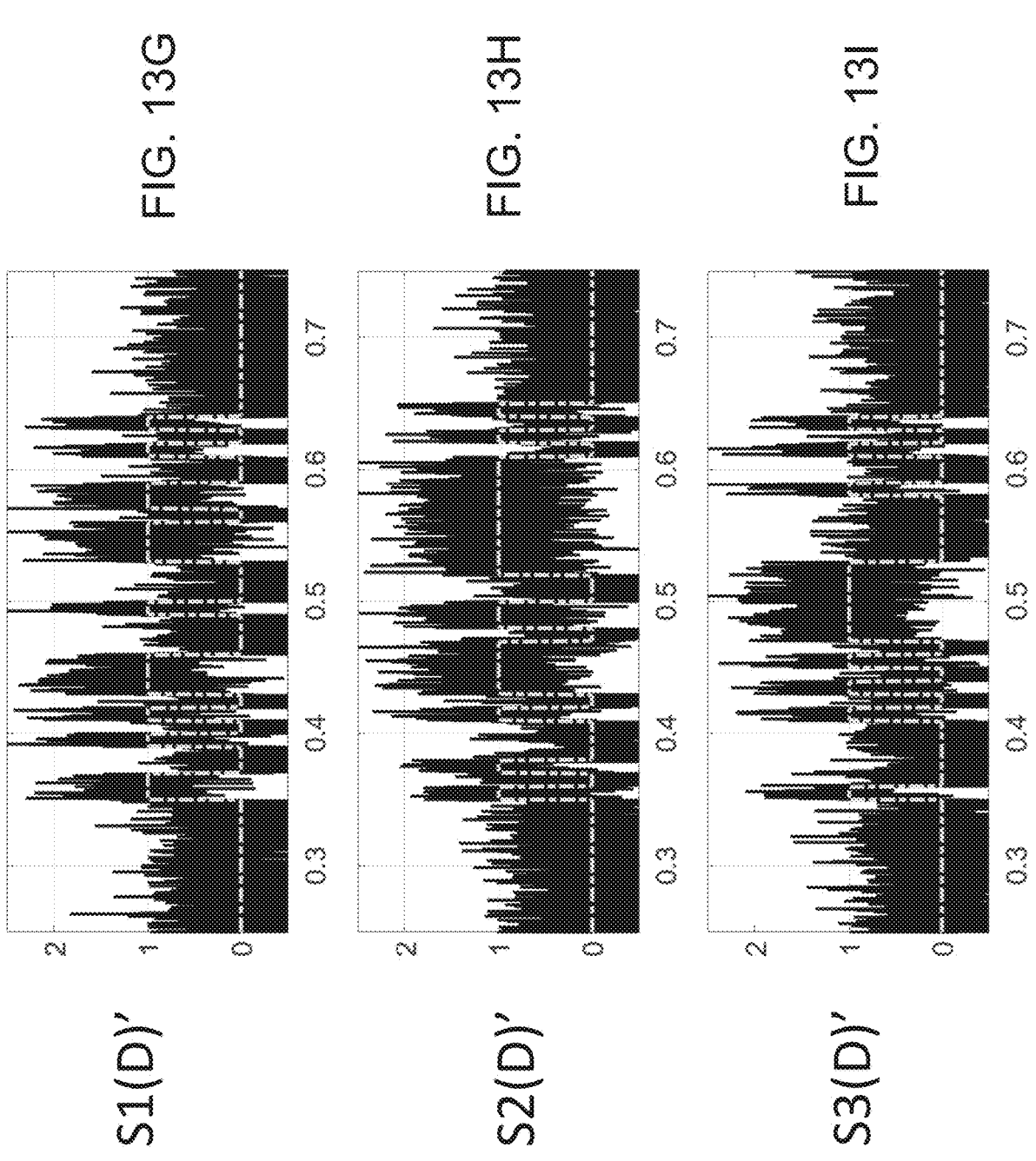
FIGS. 13G to 13I illustrate the three exemplary tuning messages of FIGS. 13A to 13C as they are received after having travel over an optical link having high noise.

Referring now to FIGS. 13G to 13I, therein illustrated are the three exemplary tuning messages of 13A to 13C as they are received at an automatic tuning network devices are having traveled over an optical link having high noise. It will be appreciated that the high noise causes the high and low values of the exemplary waveforms to no longer be easily perceptible or detectable.

Figure 13J:
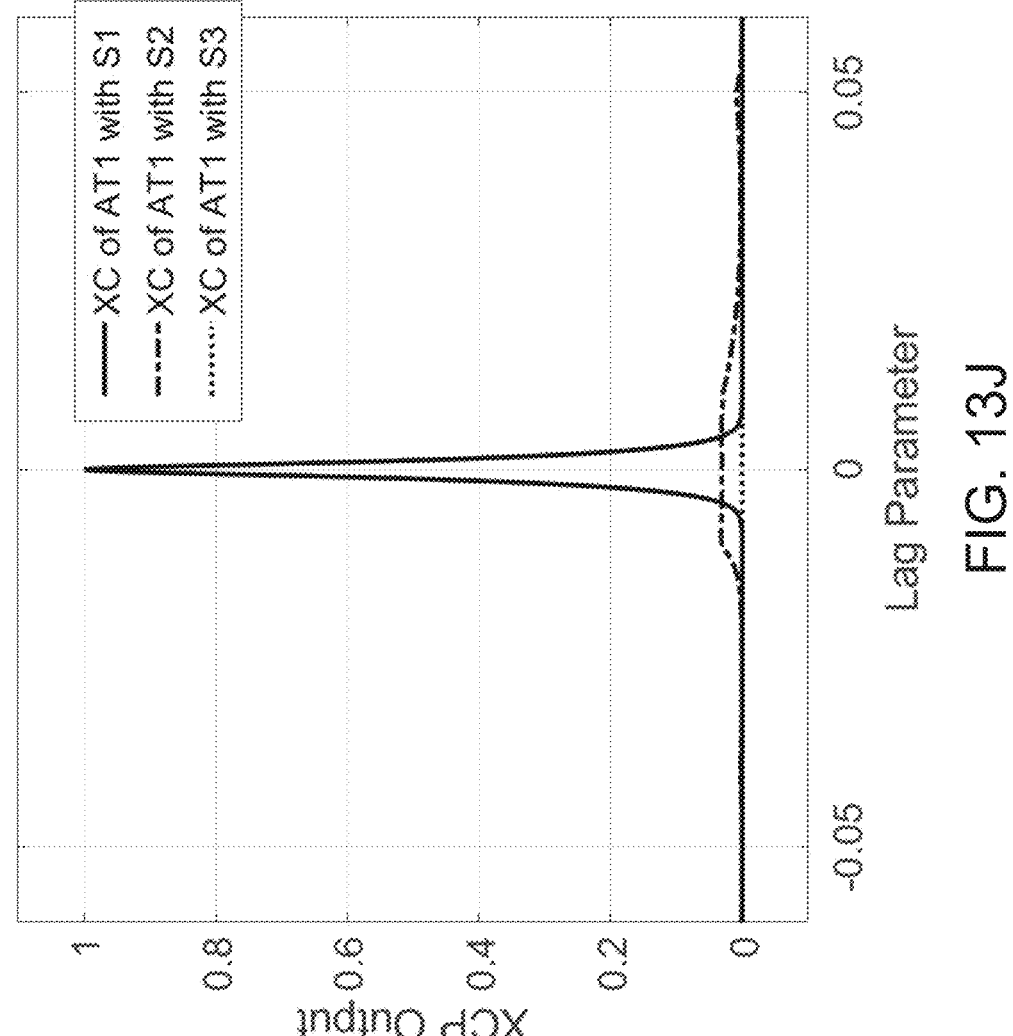
FIG. 13J illustrate a plot showing the result of cross correlations between the waveform of FIG. 13A with each of the received tuning messages of FIGS. 13D to 13F.

Referring now to FIG. 13J, therein illustrated is a plot showing the result of cross-correlations between the waveform of FIG. 13A (which may be a signal pattern waveform) with each of the received tuning messages shown in FIGS. 13D to 13F. It will be appreciated that the cross-correlations generated a peak for received signal S1(D) (FIG. 13D) only to denote that there is only a match between the received tuning message of FIG. 13D with the corresponding waveform AT1(D) of FIG. 13A.

Figure 13K:
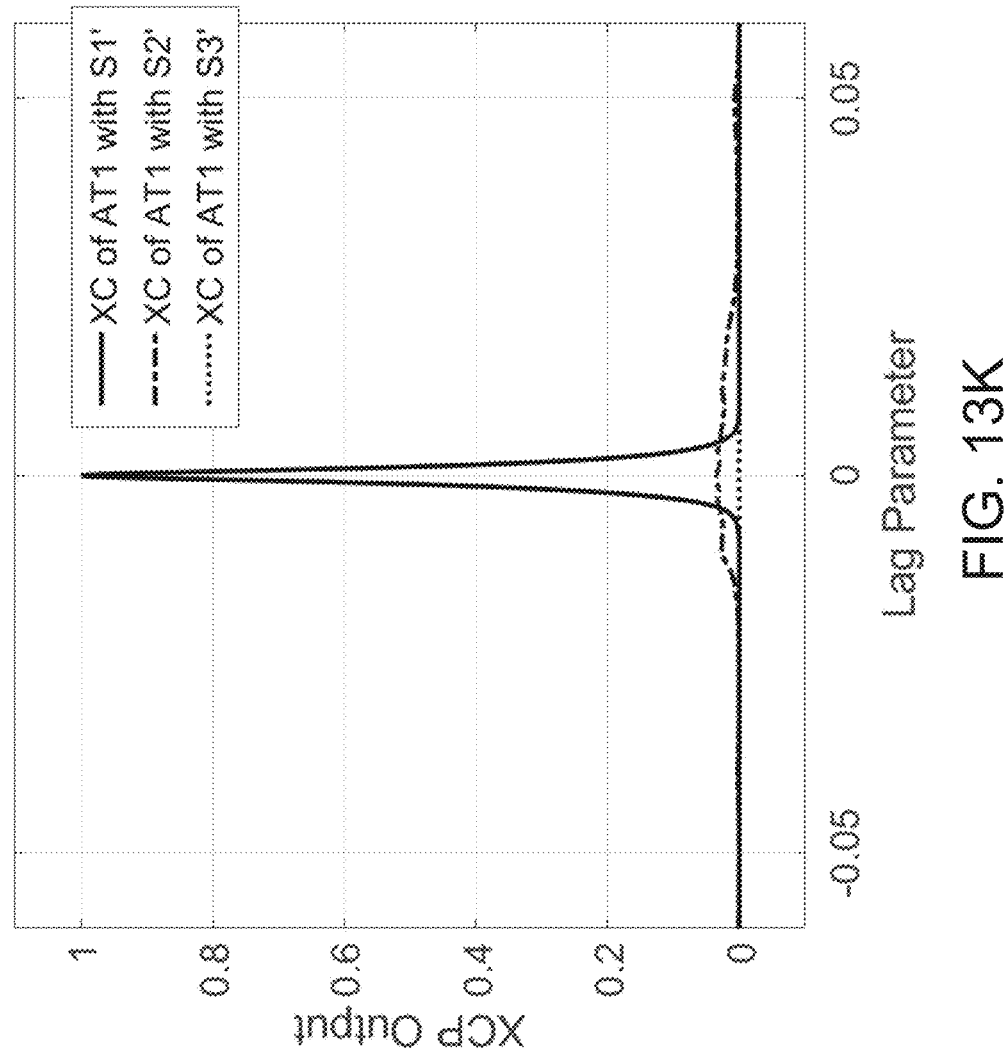
FIG. 13K illustrates a plot showing the result of cross-correlations between the waveform of FIG. 13A with each of the received noisy tuning messages of FIGS. 13G to 13I.

Referring now to FIG. 13K, therein illustrated is a plot showing the result of cross-correlations between the waveform of FIG. 13A (which may be a signal pattern waveform) with each of the received noisy tuning messages shown in FIGS. 13G to 13I. It will be appreciated that the cross-correlations generated a peak for received signal S1' (FIG. 13G) only to denote that there is only a match between the received tuning message 13G with the corresponding waveform AT1 of FIG. 13A. It will be appreciated that a high peak is generated from the cross-correlation even though the received signal has high noise.

Figures 14A, 14B, 14C:
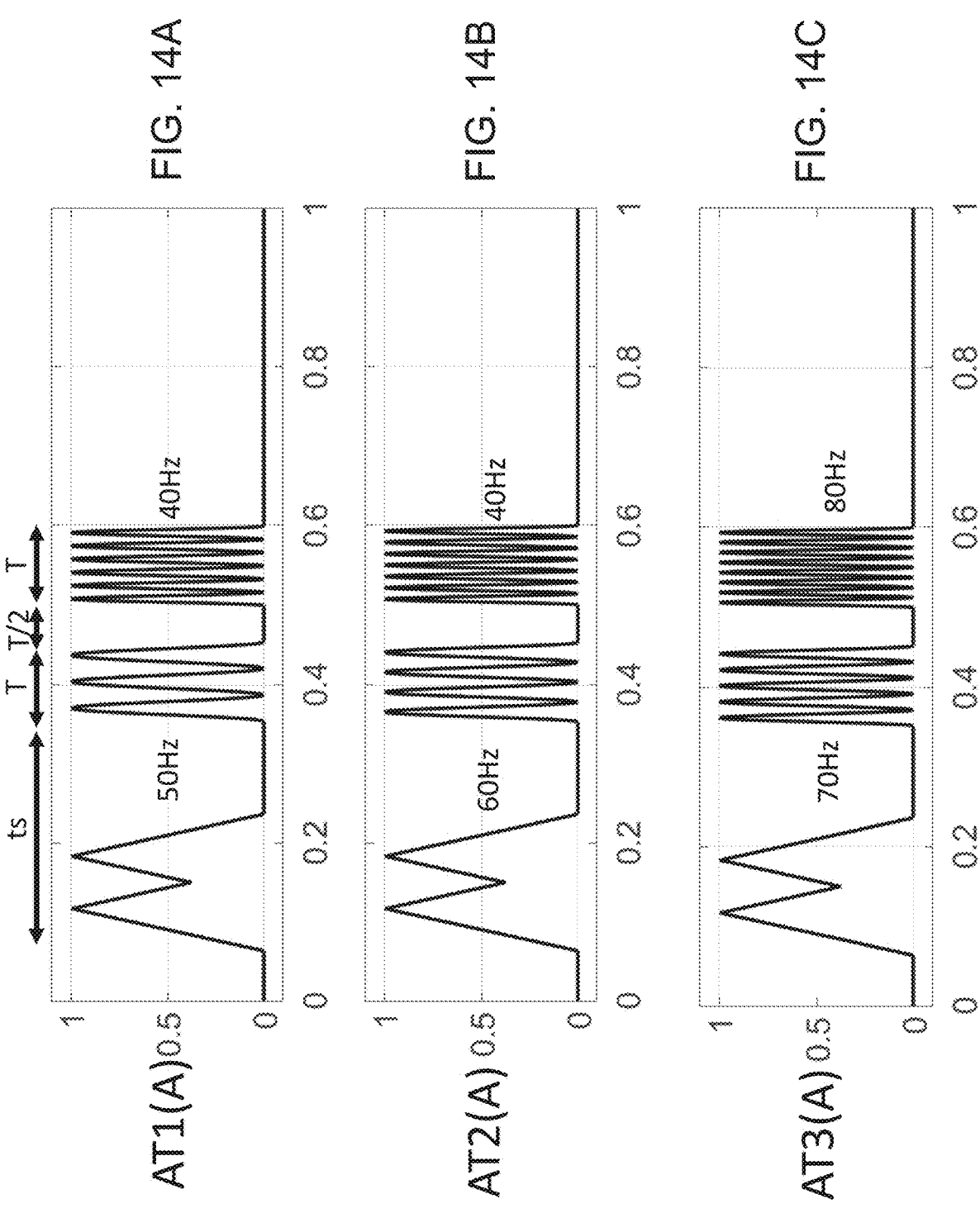
FIGS. 14A to 14C illustrate three exemplary tuning messages generated according to the waveform-based encoding/ modulation tuning protocol.

Referring now to FIGS. 14A to 14C, therein illustrated are three exemplary tuning messages generated according to the waveform-based encoding/modulation tuning protocol. FIGS. 14A to 14C show the tuning messages are being encoded or modulated as they are being from a transceiver. In the illustrated examples, the waveform-based encoded/modulated tuning messages produces three respective waveforms that have different waveform characteristics (ex: different frequencies in the sine waves). These plots can also be representative of the corresponding signal pattern waveforms generated by the tuning signal pattern database and generator 224.

Figures 14D, 14E, 14F:
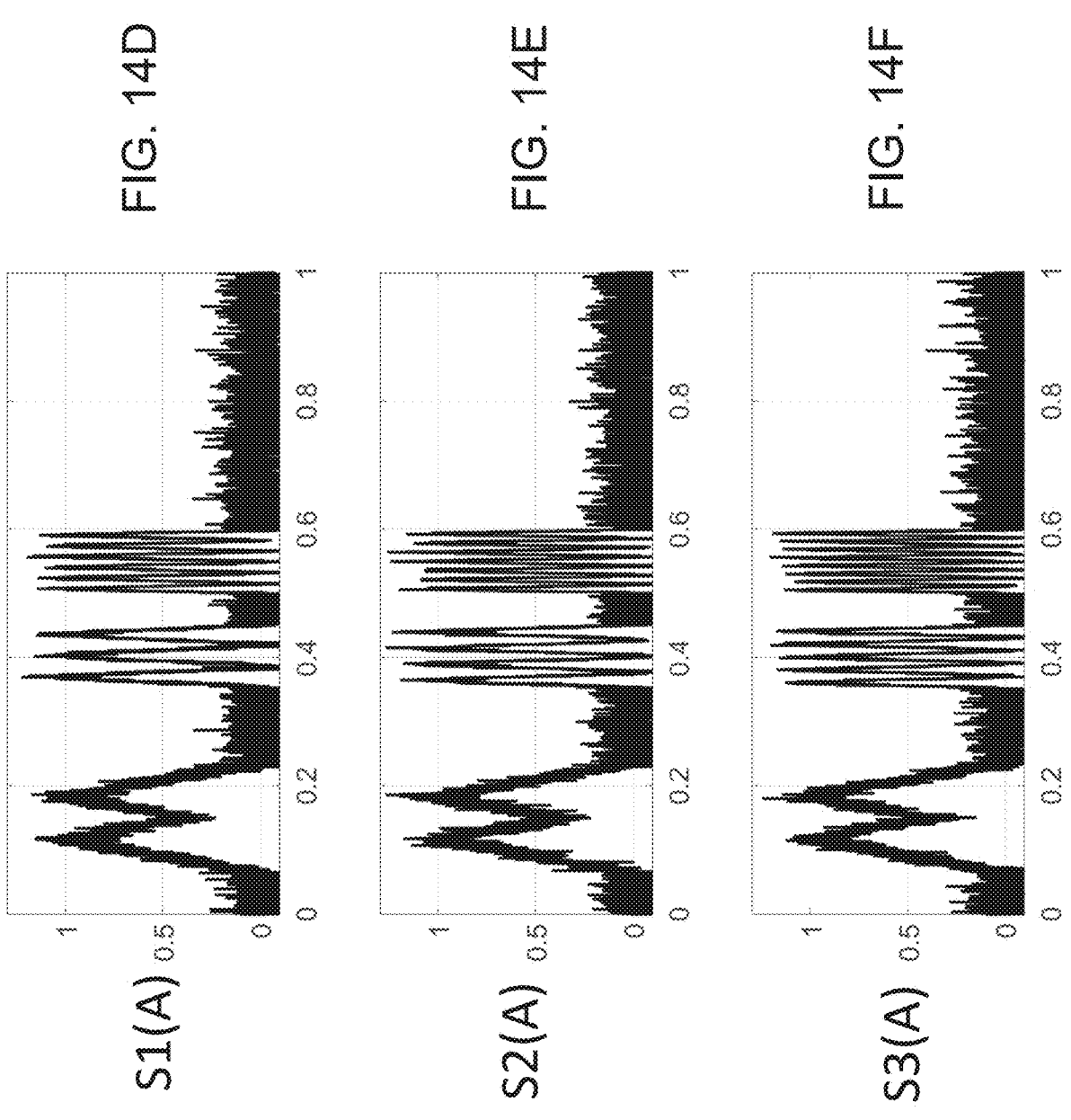
FIGS. 14D to 14F illustrate the three exemplary tuning messages of FIGS. 14A to 14C as they are received after having traveled over an optical link.

Referring now to FIGS. 14D to 14F, therein illustrated are the three exemplary tuning messages of FIGS. 14A to 14C as they are received at an automatic tuning network device after having traveled over an optical link. The optical link has fairly low noise such that the sine wave envelopes are readily perceptible and detectable in the received tuning messages of FIGS. 14D to 14F.

Figures 14G, 14H, 14I:
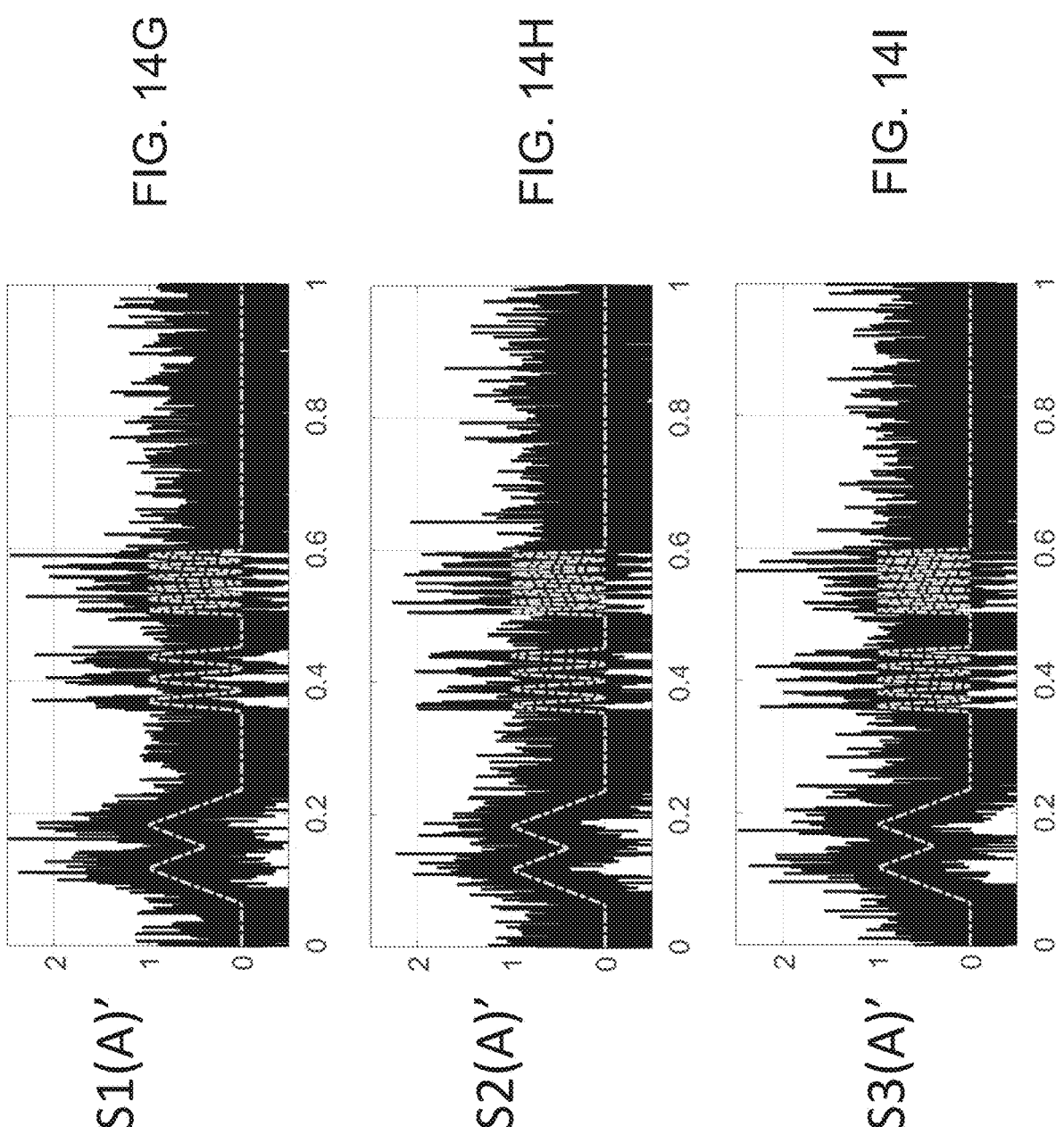
FIGS. 14G to 14I illustrate the three exemplary tuning messages of FIGS. 14A to 14C as they are received after having travel over an optical link having high noise.

Referring now to FIGS. 14G to 14I, therein illustrated the three exemplary tuning messages of 14A to 14C as they are received at an automatic tuning network devise are having traveled over an optical link having high noise. It will be appreciated that the high noise causes the sine wave envelopes to no longer be easily perceptible or detectable.

Figure 14J:
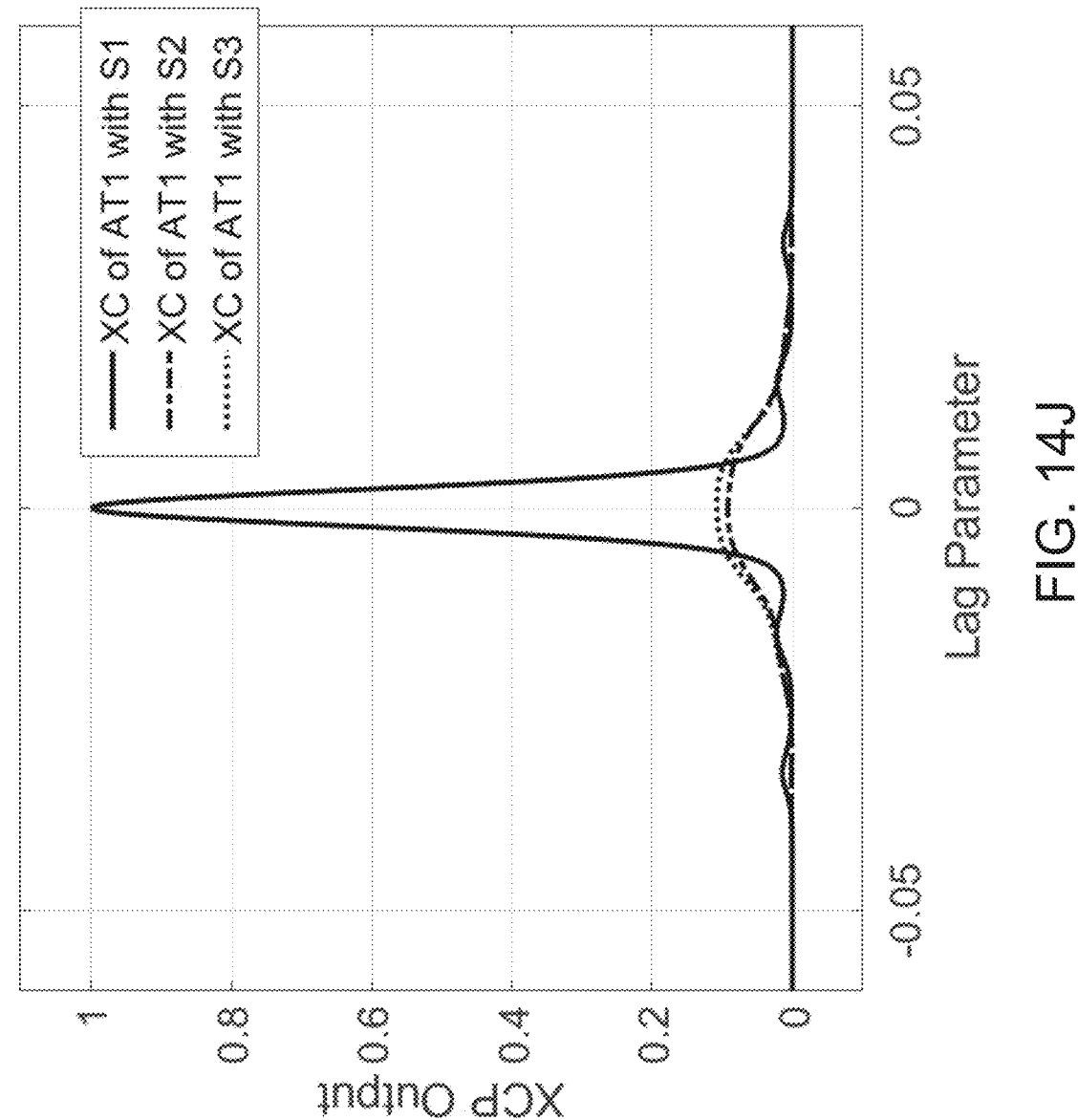
FIG. 14J illustrate a plot showing the result of cross correlations between the waveform of FIG. 13A with each of the received tuning messages of FIGS. 14D to 14F.

Referring now to FIG. 14J, therein illustrated is a plot showing the result of cross-correlations between the waveform of FIG. 14A (which may be a signal pattern waveform) with each of the received tuning messages shown in FIGS. 14D to 14F. It will be appreciated that the cross-correlations generated a peak for received signal S1(A) (FIG. 14D) that is significantly higher than the other correlation peaks to denote that there is only a match between received tuning message of FIG. 14D with the corresponding waveform AT1(A) of FIG. 14A.

Figure 14K:
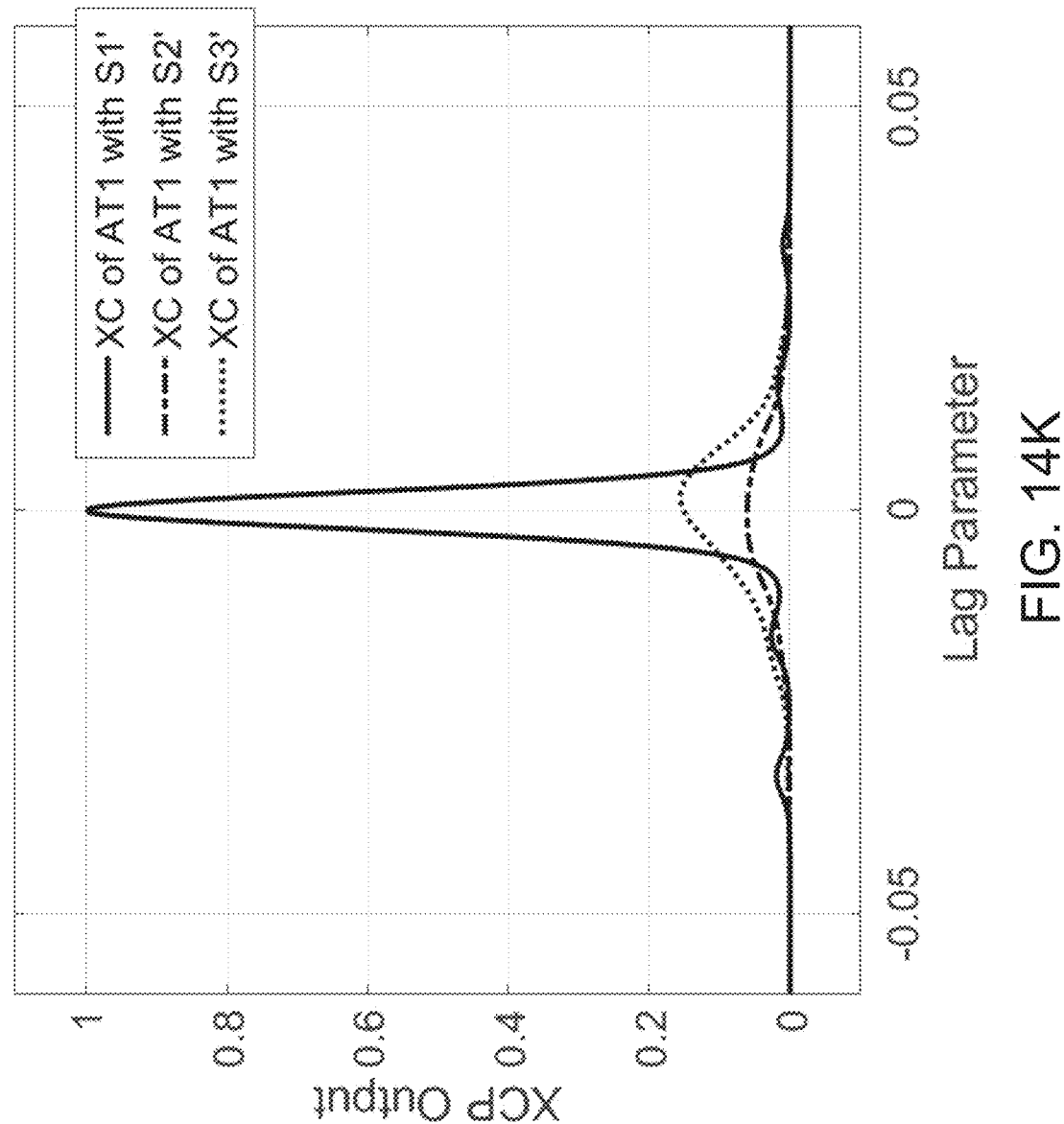
FIG. 14K illustrates a plot showing the result of cross-correlations between the waveform of FIG. 14A with each of the received noisy tuning messages of FIGS. 14G to 14I.

Referring now to FIG. 14K, therein illustrated is a plot showing the result of cross-correlations between the waveform of FIG. 14A (which may be a signal pattern waveform) with each of the received noising tuning messages shown in FIGS. 14G to 14I. It will be appreciated that the cross-correlations generated a peak for received signal S1(A)' (FIG. 14K) that is significantly higher than the other correlation peaks to denote that there is only a match between received tuning message of FIG. 14D with the corresponding waveform AT1(A) of FIG. 14. It will be appreciated that the significantly higher peak is generated from the cross-correlation even though the received signal has high noise.

Figure 15B:
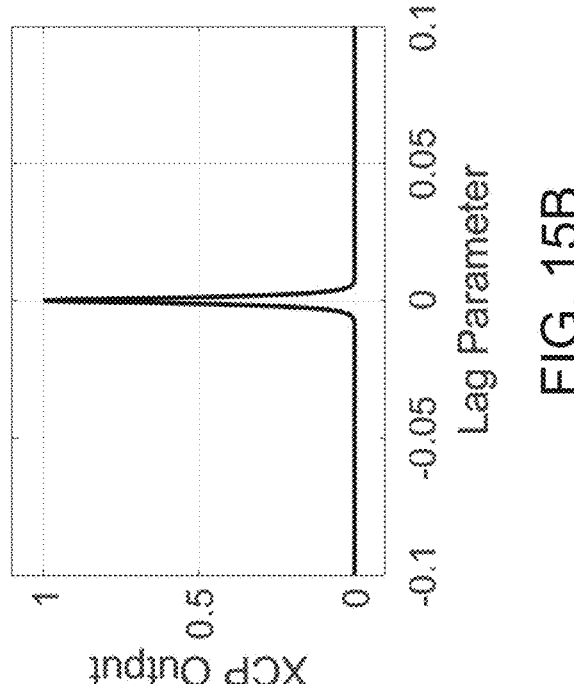
FIG. 15B shows the result of a dot product operation (ex: cross-correlation) between the received tuning message of FIG. 15A with a corresponding signal waveform pattern.
Figure 15A:
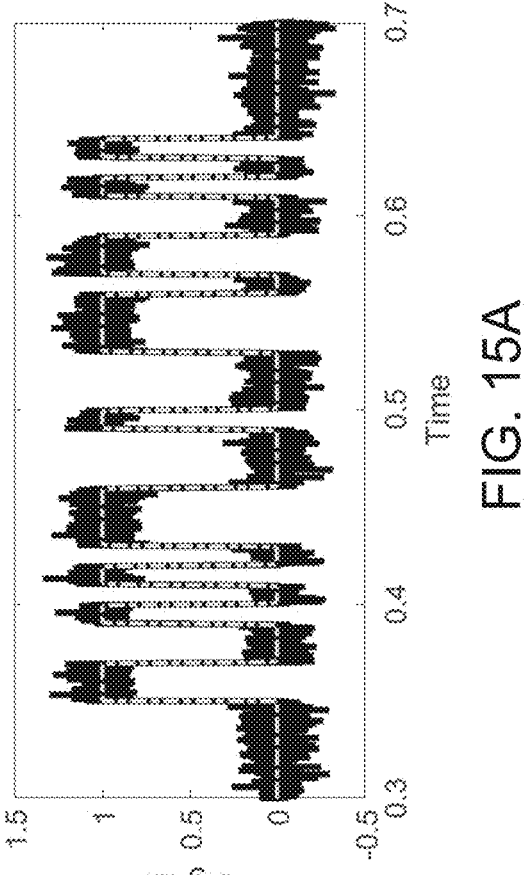
FIG. 15A illustrates plot showing a tuning message that was initially generated according to a digital encoding/ modulation-based tuning message and that has been received after traveling over a relatively low noise optical link.

Referring now to FIG. 15A, therein illustrated is a plot showing a tuning message that was initially generated according to a digital encoding/modulation-based tuning message and that has been received after traveling over a relatively low noise optical link. FIG. 15B shows the result of a dot product operation (ex: cross-correlation) between the received tuning message of FIG. 15A with a corresponding signal waveform pattern. The high peak generated from the dot product operation indicates a match, thereby also denoting that the tuning message can be identified.

Figure 15C:
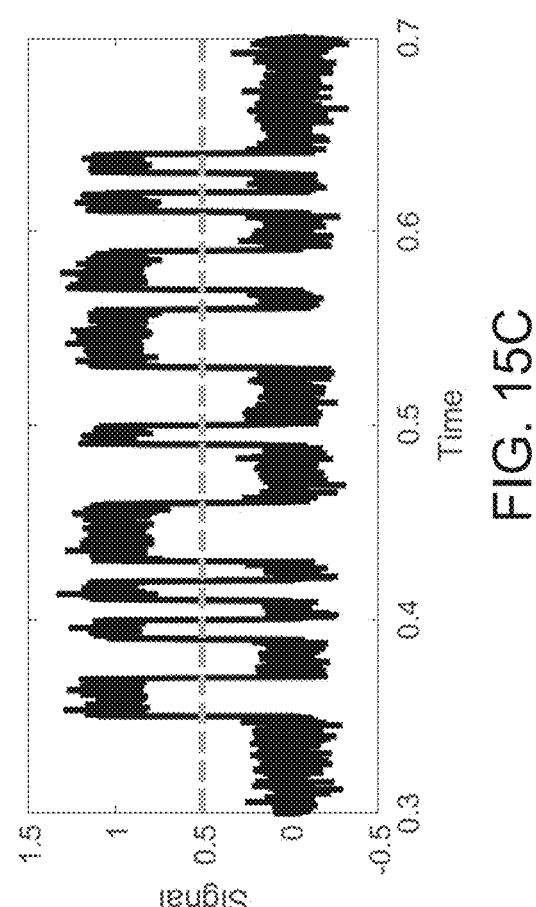
FIG. 15C shows the same tuning message of FIG. 15B and a threshold line used for detecting high and low values in the tuning message.

FIG. 15C shows the same tuning message of FIG. 15A and a threshold line (shown as a horizontal dashed lines). Comparisons of high and low values of the received tuning message against the threshold line is used to detect high and low values in the digitally decoded/demodulated tuning message, which further allows decoding of the initial data sequence used to generate the tuning message (at the transmitter side). It will be appreciated that the high and low values of the received tuning messages are either clearly greater than or less than the threshold line, which allows for the detecting of the high and low values in the tuning message.

Figure 15E:
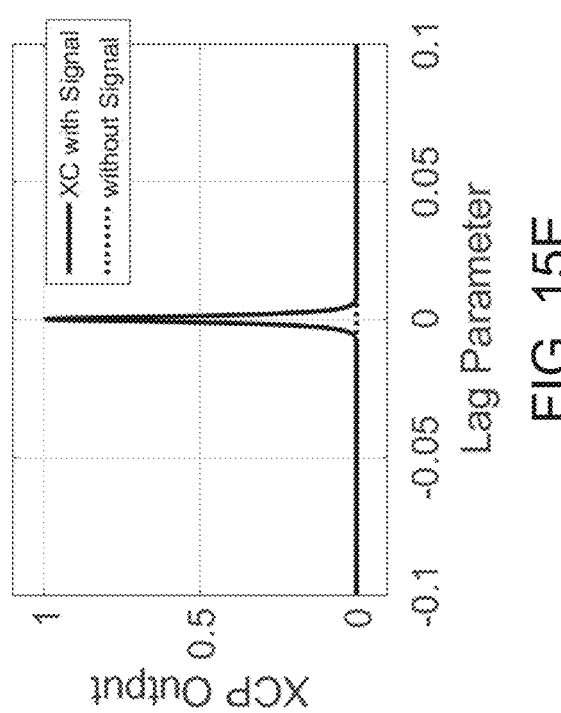
FIG. 15E shows the result of a dot product operation (ex: cross-correlation) between the received tuning message of FIG. 15D with a corresponding signal waveform pattern.
Figure 15D:
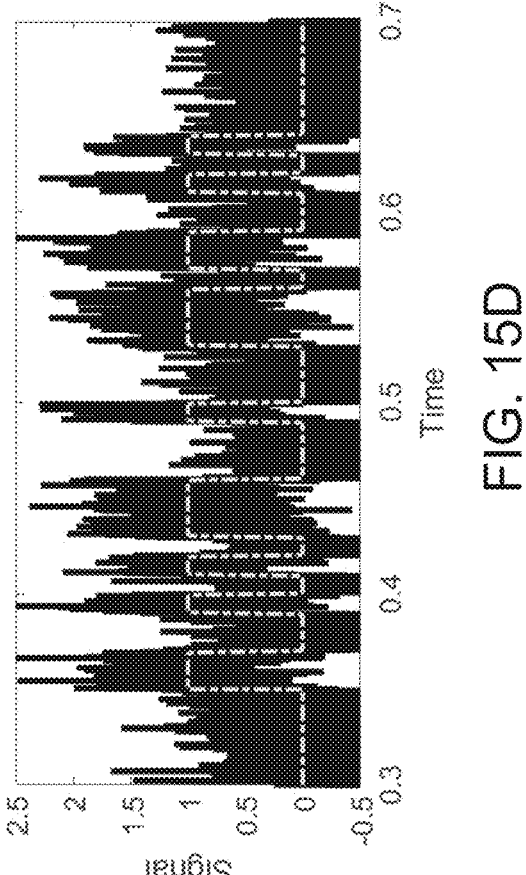
FIG. 15D illustrates a plot showing a tuning message that was initially generated according to the digital encoding/ modulation-based tuning message that has been received after traveling over a high noise optical link.

Referring now to FIG. 15D, therein illustrated is a plot showing a tuning message that was initially generated according to the digital encoding/modulation-based tuning message that has been received after traveling over a high noise optical link. FIG. 15E shows the result of a dot product operation (ex: cross-correlation) between the received tuning message of FIG. 15D with a corresponding signal waveform pattern. Despite the presence of high noise, the high peak generated from the dot product operation indicates a match, thereby also denoting that the tuning message can be identified.

Figure 15F:
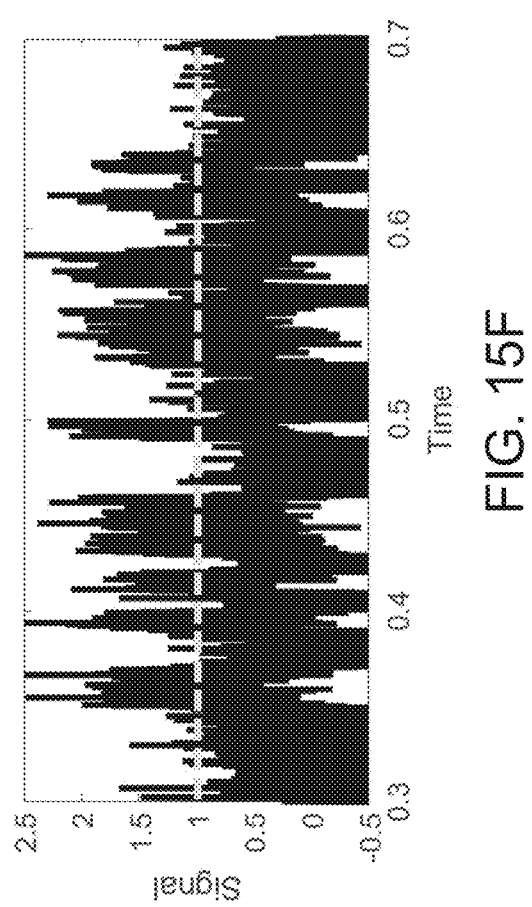
FIG. 15F shows the same tuning message of FIG. 15D and a threshold line used for detecting high and low values in the tuning message.

FIG. 15F shows the same tuning message of FIG. 15D and the threshold line (also shown as a horizontal dashed line). In this case, the tuning message is so noisy that the received will frequently cross over the threshold line. Accordingly, it is not possible to consistently detect high and low values by comparing the values of the signal in time against the threshold line. In other words, the high noise makes it that the high and low values can no longer be recovered.

Figures 16A, 16B, 16C:
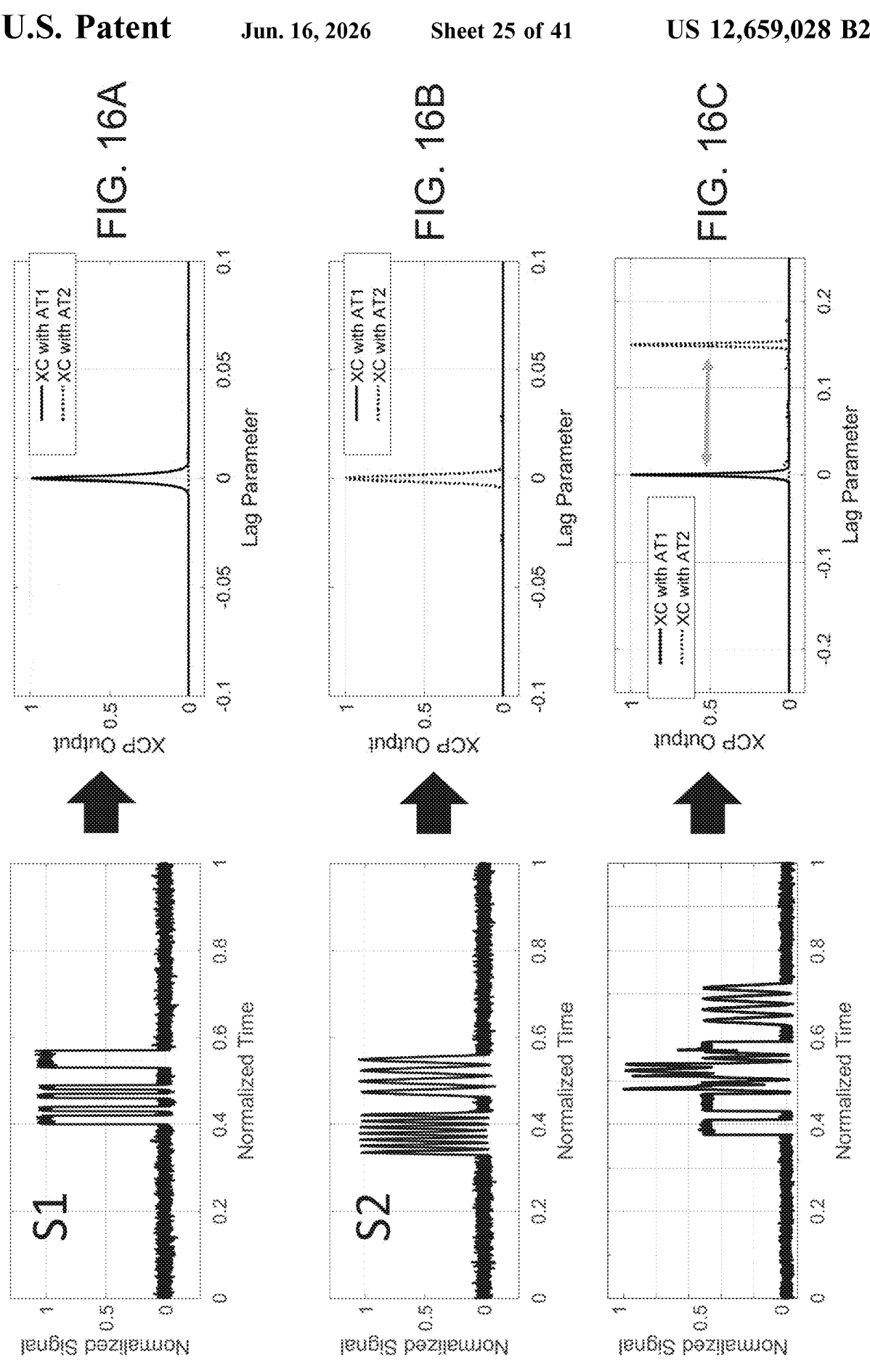
FIG. 16A shows an example received tuning message and the peak in the output of the cross-correlation with a corresponding signal waveform pattern.
FIG. 16B shows another example received tuning message and the peak in the output of the cross-correlation with a corresponding signal waveform pattern.
FIG. 16C shows a received signal that simultaneously contain the received tuning message of FIG. 16A and the received tuning message of FIG. 16B and further the output of two cross-correlations with corresponding signal waveform patterns such that two peaks are visible.

FIG. 16A shows a received tuning message (initially generated according to a digital encoding/modulation-based tuning protocol) and the peak in the output of the cross-correlation with a corresponding signal waveform pattern, denoting that the tuning message can be properly identified.

FIG. 16B shows another received tuning message (initially generated according to waveform-based encoding/ modulation tuning protocol) and the peak in the output of the cross-correlation with a corresponding signal waveform pattern, denoting that the tuning message can be properly identified.

FIG. 16C shows a received signal that simultaneously contains the received tuning message of FIG. 16A and the received tuning message of FIG. 16B. The right-hand plot shows the output of two dot product operations (ex: cross-correlations), the first being the cross-correlation between the tuning message of FIG. 16A with its corresponding signal waveform pattern and the second being the cross-correlation between the tuning message of FIG. 16B with is corresponding signal waveform pattern. It will be appreciated that although the simultaneously received tuning messages are now mixed together, both cross-correlations produced a distinct peak, indicating that both tuning messages can be identified. The example of FIG. 16C illustrates that multiple tuning messages can be received simultaneously, and further distinguished and identified. The treatment of multiple tuning messages can be useful in a scenario where the automatic tuning network device carries multiple tuning operations, such as over multiple channels/wavelengths, at the same time. For example, the automatic tuning network device in the form of a network monitor/controller, as described elsewhere herein, can have this functionality.

Figures 17A, 17B:
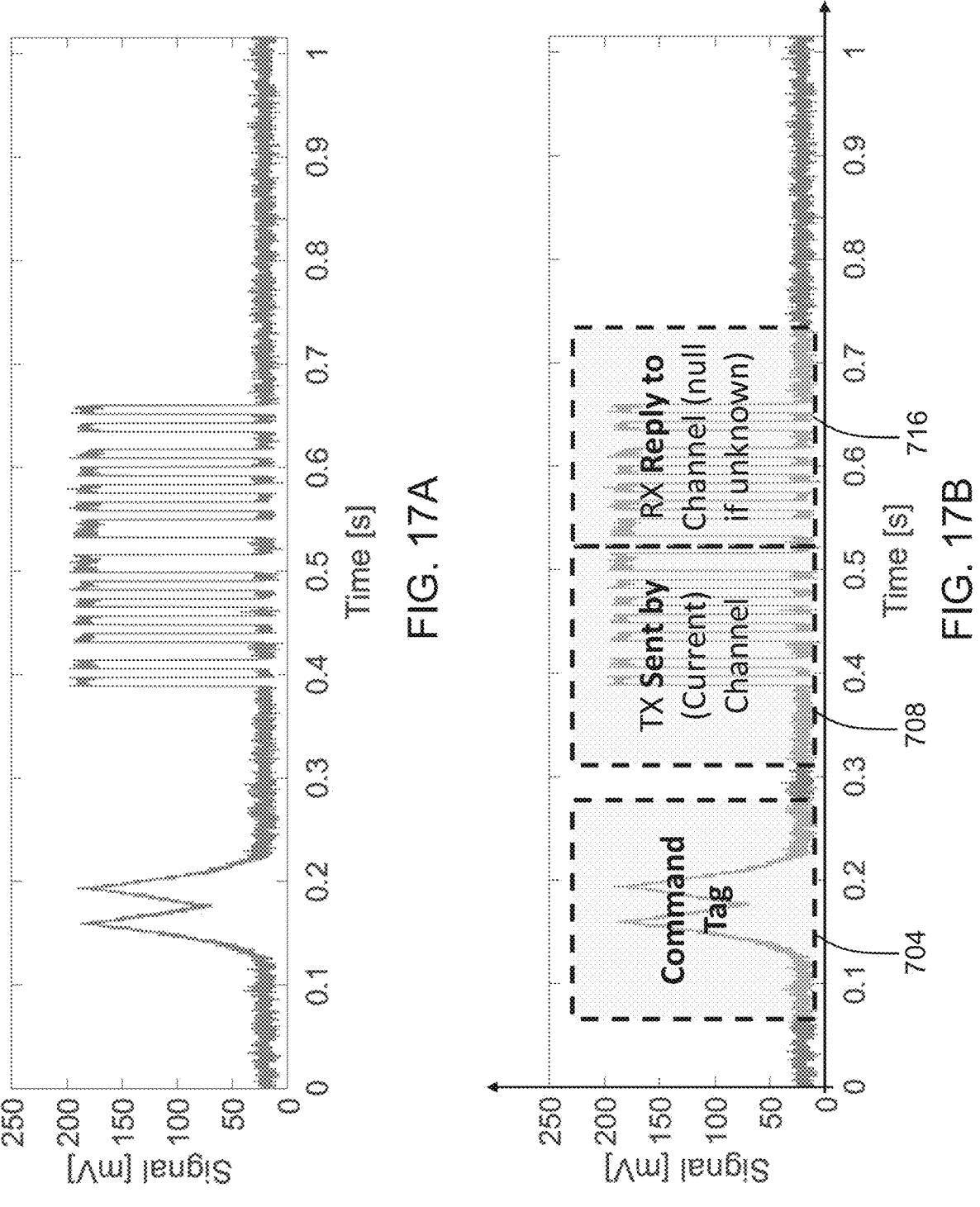
FIG. 17A illustrates a raw waveform of a waveform-based tuning message according to an example embodiment.
FIG. 17B shows the raw waveform of the tuning message of FIG. 17A having annotations showing the message components of the tuning message.

Referring now to FIG. 17A, therein illustrated is a raw waveform of a tuning message according to an exemplary embodiment, in which the informational fields of the tuning message are defined in the shape characteristics of the waveform. The tuning message is to be used according to the waveform-based encoding/modulation tuning protocol described herein.

FIG. 17B shows the raw waveform of the tuning message of FIG. 17A having annotations showing the message components of the tuning message as defined by segments of the waveform. A first segment 704 of the waveform, having a shape of two triangle waves, defines the message type (also called "Command Tag"). A second segment 708 of the waveform, having a shape of a first series of short square waves of a given pattern, defines the transmission channel used for the tuning message. A third segment 716 of the waveform, having a shape of a second series of short square waves of a given pattern, defines the reply to channel for the tuning message (i.e. the channel that an earlier tuning was received at and which the current tuning message is now replying to). If the reply to segment is not known, such as because the tuning message itself is a request-type message, then the reply to segment is left with a null symbol or a pattern indicating a null signal.

Figure 17C:
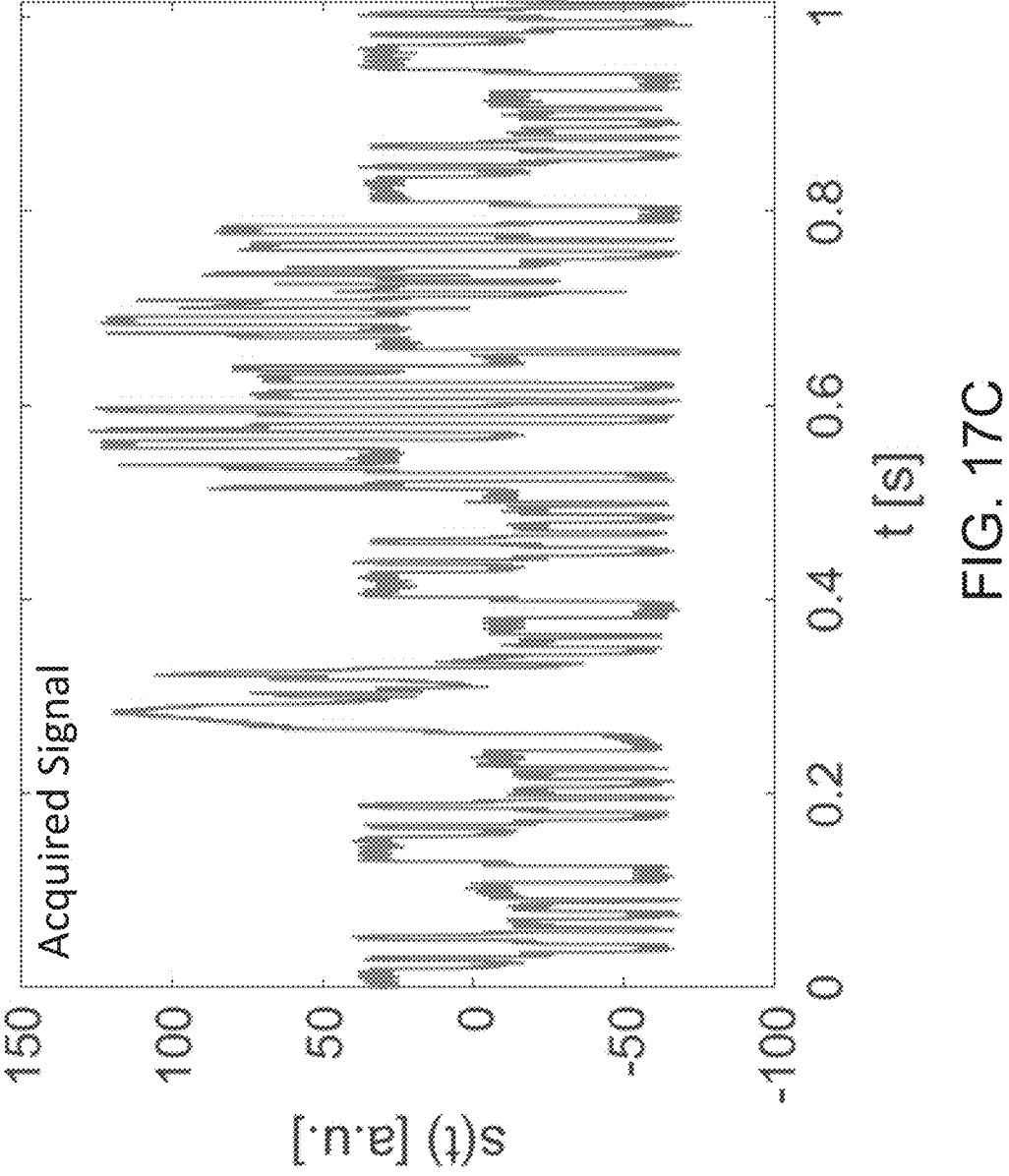
FIG. 17C shows the raw waveform of the tuning message of FIG. 17A as measured in an experimental setup after having been transmitted over a feeder cable.

FIG. 17C shows the raw waveform of the tuning message of FIG. 17A as measured by the sampling module 208 in an experimental setup and after having been transmitted over a feeder cable and mixed with other tuning messages.

Figure 17D:
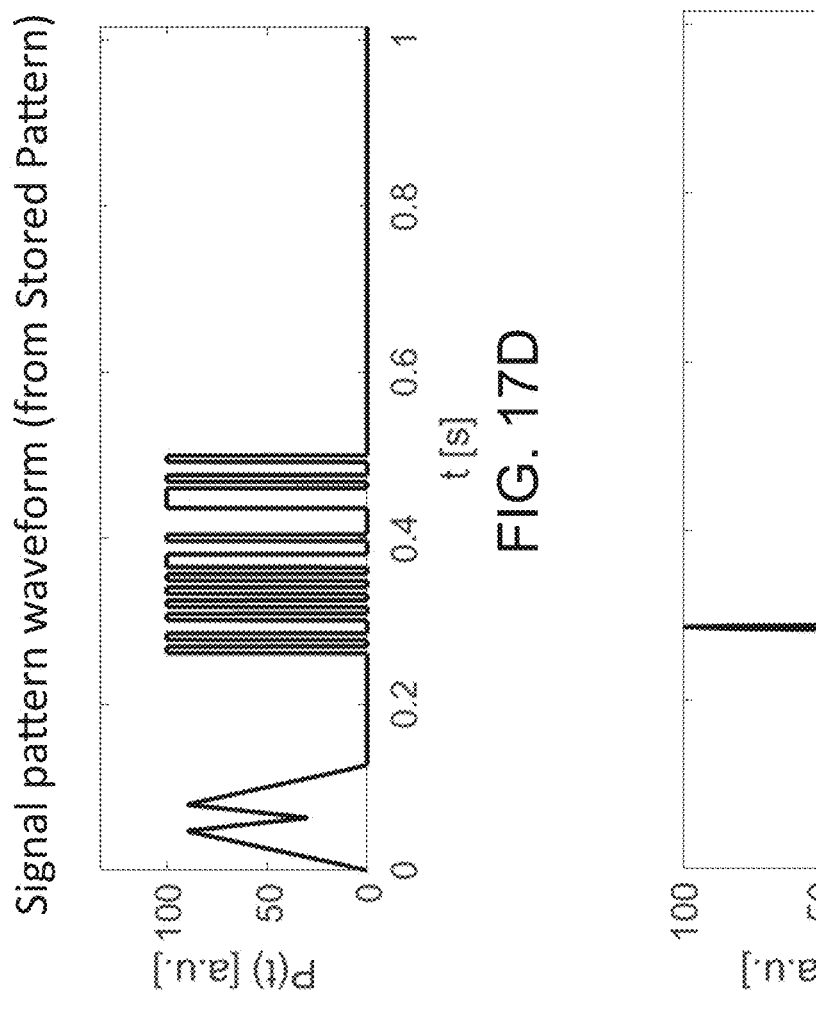
FIG. 17D shows the signal pattern waveform generated from a stored signal pattern that is a reproduction of the tuning message of FIG. 17A; 10

FIG. 17D shows the signal pattern waveform 232 generated from a stored signal pattern that is a reproduction to the tuning message of FIG. 17A.

Figure 17E:
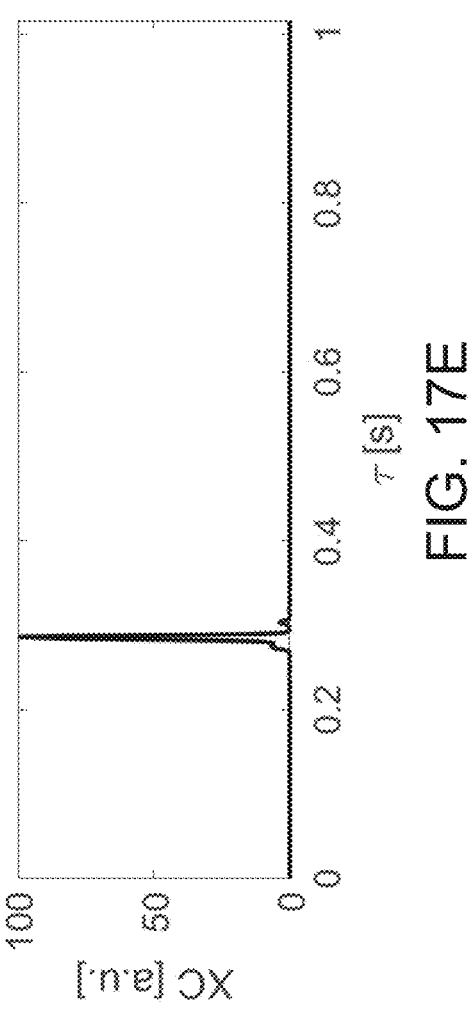
FIG. 17E shows the result of a dot product operation between the raw waveform of FIG. 17C and the signal pattern waveform of FIG. 17D.

FIG. 17E shows the result of the dot product operation (in this case a cross-correlation) between the raw waveform of FIG. 17C and the signal pattern waveform 232 of FIG. 17D. The result of the dot product operation is plotted and shows a readily apparent peak, thereby indicating a match between the raw waveform and the signal pattern waveform 232 and allowing identifying that the tuning message contained in the raw waveform has the information fields defined in the tuning message identifier(s) associated with that signal pattern.

Figure 18C:
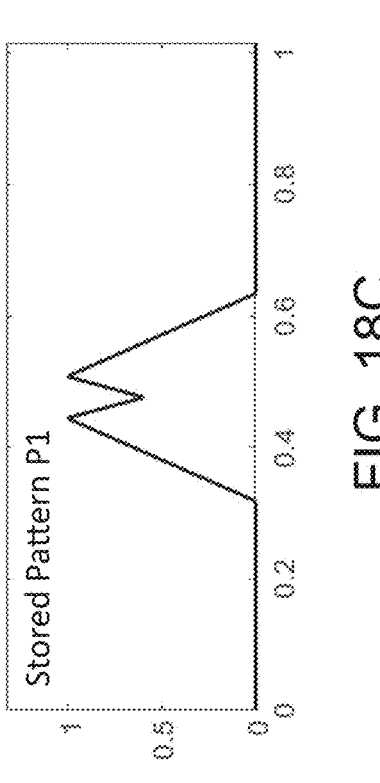
FIGS. 18A to 18D show two sampled signals, a signal pattern waveform generated for matching and the output of a dot product operation involving these signals according to one example.
Figure 18D:
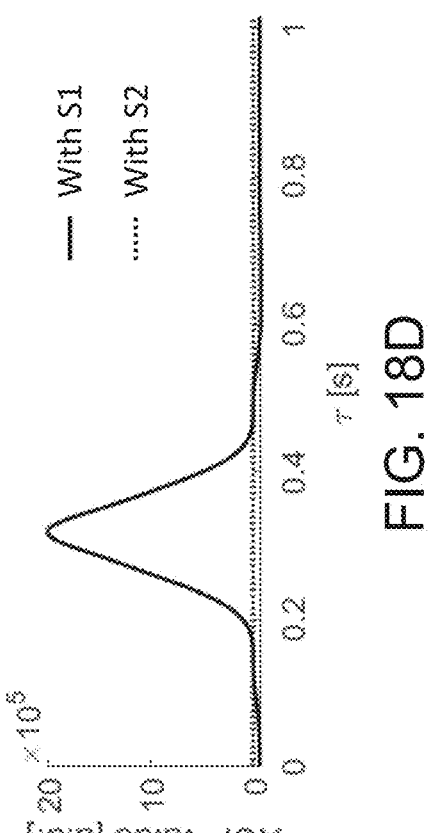
Figure 18A:
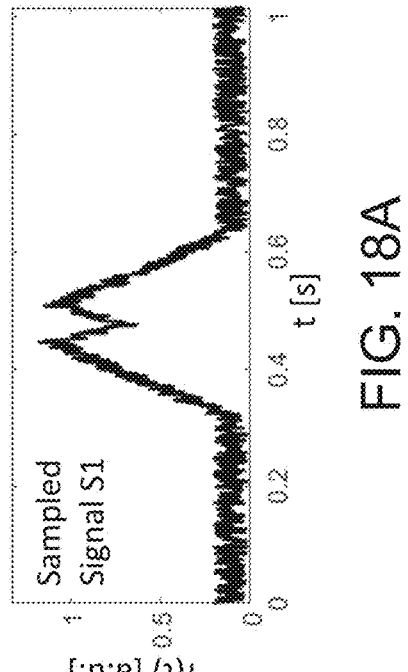
Figure 18B:

FIGS. 18A to 18D show two sampled signals, a signal pattern waveform generated for matching against the two sampled signals and the output of the dot product operations involving these signals and signal pattern waveform. FIG. 18A is a first sampled signal (ex: sampled and generated by sampling module 208) in which a waveform segment corresponding to a tuning message or message component is captured. The waveform can correspond to the first segment having the two triangle waves of the tuning message of FIG. 17A. FIG. 18B is a second sampled signal, in which no tuning message is captured. Accordingly, the sampled signal just appears as noise. FIG. 18C is an exemplary signal pattern waveform generated from one of the signal patterns stored in the signal pattern database and generator 224.

A first dot product operation, in this case a cross-correlation, is carried out between the first sampled signal and the signal pattern waveform. A second dot product operation, in this case also a cross-correlation, is also carried out between the second sampled signal and the signal pattern waveform. The outputs of both dot product operations are plotted in the chart of FIG. 18D. It will be appreciated that the cross-correlation between the first sampled signal (S1, FIG. 18A) and the signal pattern waveform generates a wave having a noticeable peak that indicates that there is a match between the first sampled signal (S1) and the signal pattern waveform. The cross-correlation between the second sampled signal (S2, FIG. 18B) and the signal pattern waveform shows a null signal, indicating a non-correspondence. Accordingly, it can be determined that the first sampled signal contains a tuning message of the type and characteristics associated with the matching signal pattern waveform of FIG. 18C.

Figures 19A, 19B, 19C, 19D:
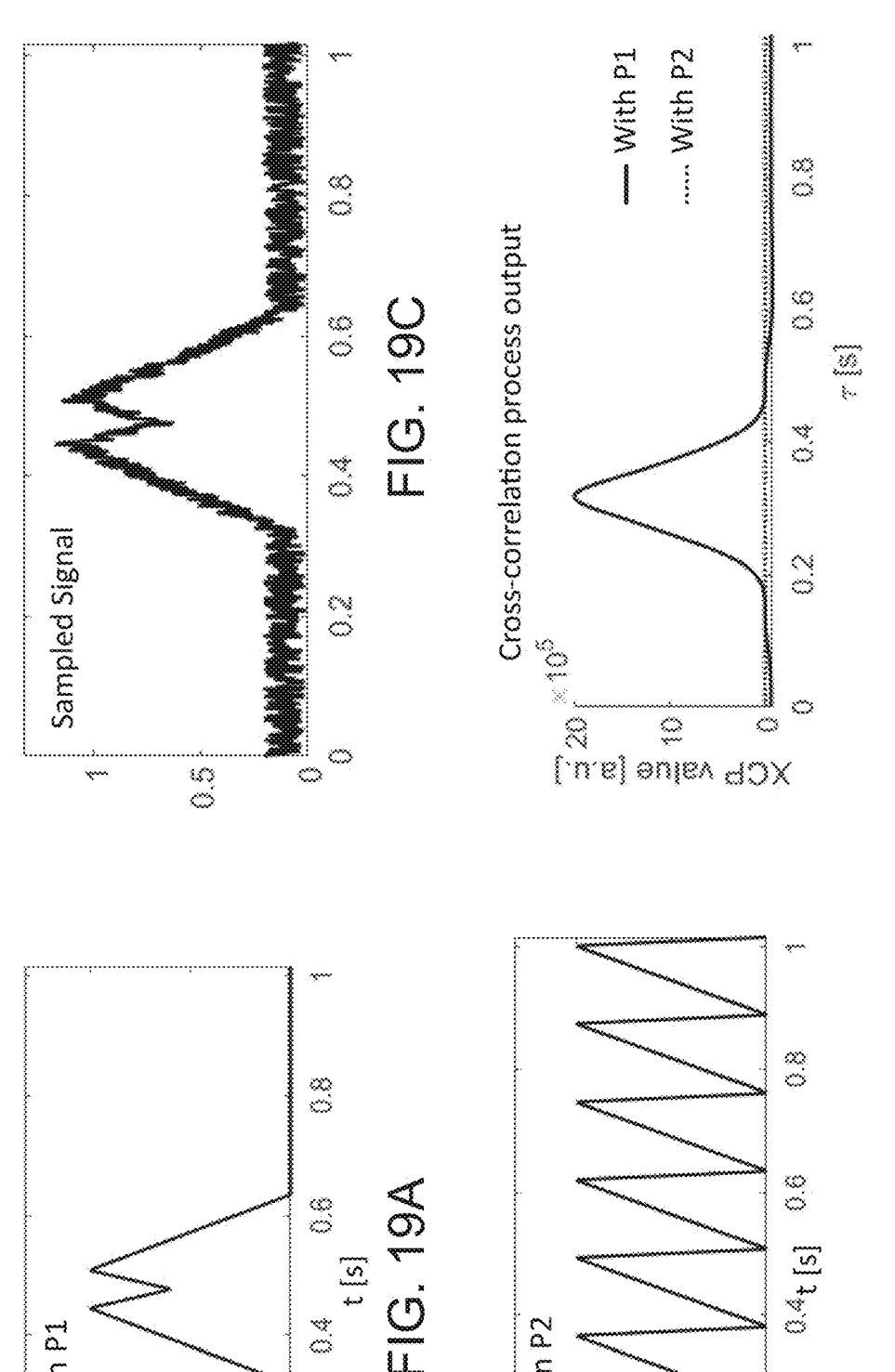
FIGS. 19A to 19D show a sampled signal, two signal pattern waveforms generated for matching against the sampled and the output of a dot product operation involving these signals according to another example.

FIGS. 19A to 19D show a sampled signal, two signal pattern waveforms generated for matching against the sampled signal and the output of the dot product operations involving the sampled signal and the two signal pattern waveforms. FIG. 19A shows an exemplary first signal pattern waveform generated from one of the signal patterns stored in the signal pattern database and generator 224 and FIG. 19B shows an exemplary second signal pattern waveform generated from one of the signal patterns stored in the signal pattern database and generator 224. FIG. 19C is a sampled signal in which a waveform segment (ex: sampled and generated by sampling module 208) in which a waveform segment corresponding to a tuning message or message component is captured. The waveform can correspond to the first segment having the two triangle waves of the tuning message of FIG. 19C.

A first dot product operation, in this case a cross-correlation, is carried out between the sampled signal and the first signal pattern waveform. A second dot production operation, in this case also a cross-correlation, is also carried out between the sampled signal and the second signal pattern waveform. The outputs of both dot product operations are plotted in the chart of FIG. 19D. It will be appreciated that the cross-correlation between the sampled signal and the first signal pattern waveform (P1) generates a wave having a noticeable peak that indicates that there is a correspondence between the sampled signal and the first signal pattern waveform (P1). The cross-correlation between the sampled signal and the second signal pattern waveform (P2) shows a null signal, indicating a non-correspondence. Accordingly, it can be determined that the first sampled signal contains a tuning message of the type and characteristics associated with the matching signal pattern waveform of 19A.

For the waveform-based encoding/modulation tuning protocol, the waveform (ex: shape, width, etc.) that a given tuning message will take is predefined within the tuning protocol. Accordingly, for each tuning message, the parameters of the corresponding signal pattern stored in the signal pattern database generator 224 are defined in accordance with the parameters of the waveform of the tuning message that the signal pattern is to reproduce.

For the digital encoding/modulation-based tuning protocol, for each given tuning message, the parameters of the corresponding signal pattern can be stored in the form of the data sequence used to generate that tuning message along with the encoding and/or modulation scheme applied to that the data sequence. Alternatively, a pluggable transceiver (ex: of a given vendor, make and/or model) that implements a given tuning scheme can be put into operation and the raw optical signals containing tuning messages are measured (ex: in a controlled setting). The parameters of the signal pattern stored in the signal pattern database generator 224 for each given tuning message are then defined according to the measured values for the raw optical signal of that tuning message.

Figure 20:
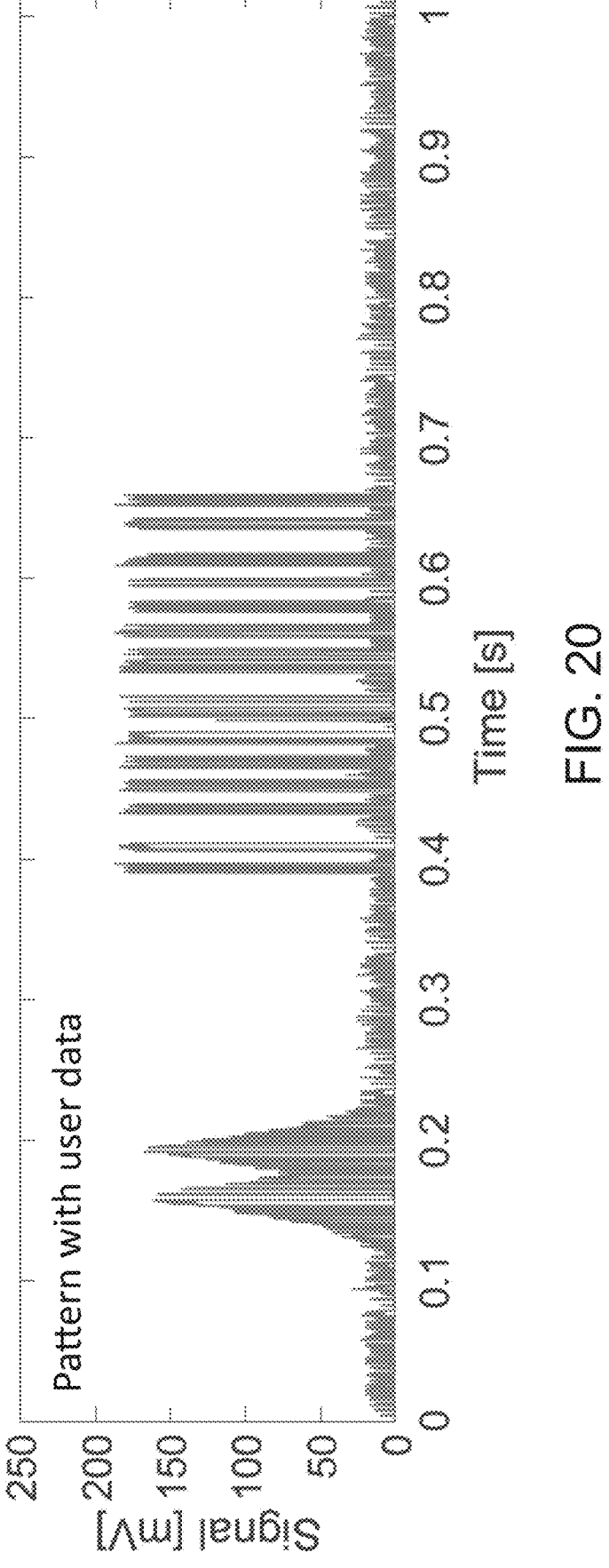
FIG. 20 illustrates a captured signal of a waveform-based tuning message being transmitted at the same time as typical communication data according to one example embodiment.

Referring to FIG. 20, therein shown is a captured signal (ex: a sampled signal 216) of a tuning message according to the waveform-based encoding/modulation tuning protocol being transmitted at the same time as typical communication data according to one example embodiment. The tuning message can have the waveform of the message shown in FIG. 17A. It will be appreciated that the waveform of the tuning message is still visually perceptible, but that the waveform is now filled out because of the simultaneous presence of the high-speed components of the communication data. It will be understood that the dot product of the captured signal and the correct signal pattern waveform 232 will still provide a dot product peak indicating a match.

Figure 21:
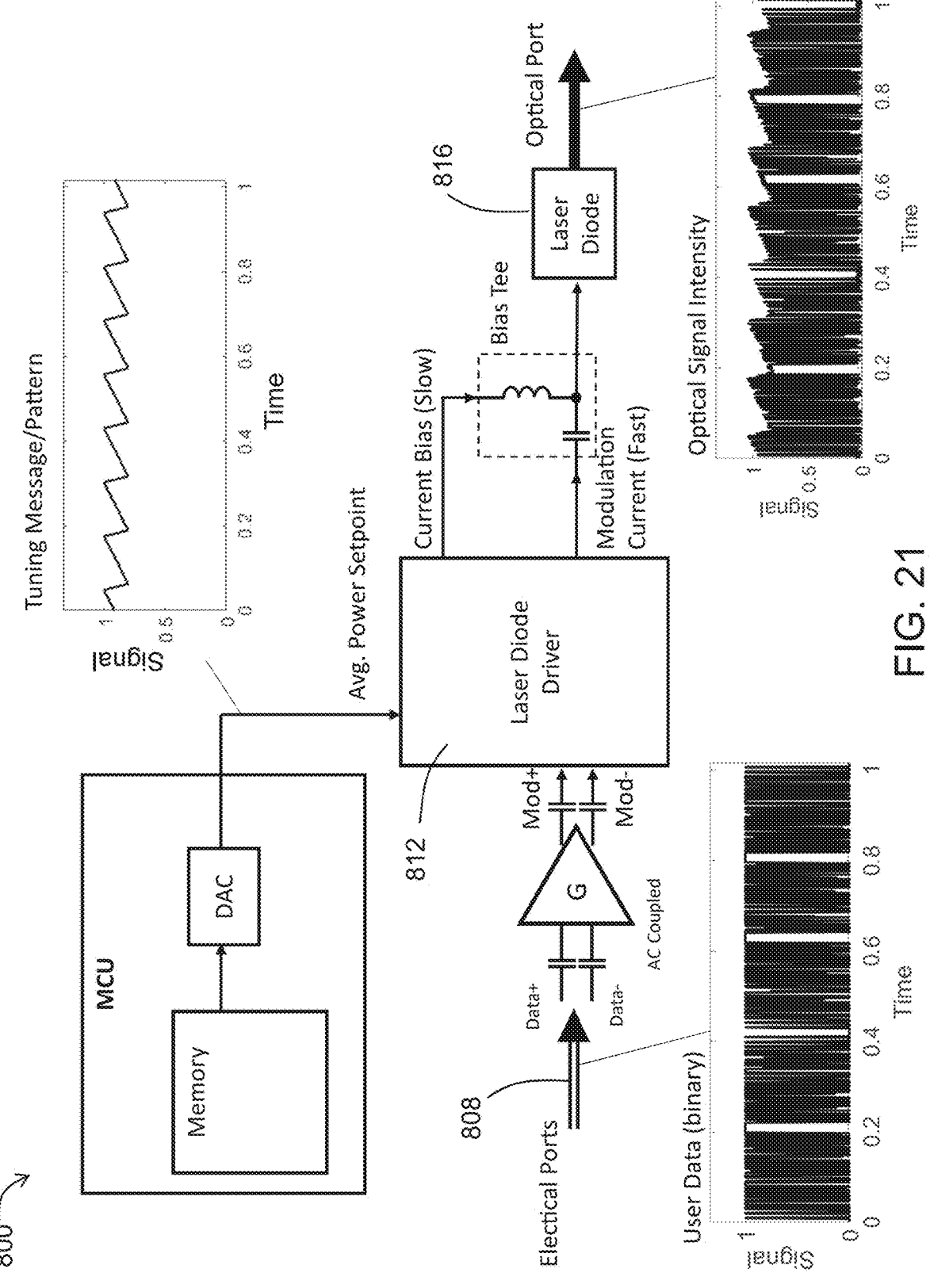
FIG. 21 illustrates a schematic diagram of a transmission subsystem for simultaneous transmission of a tuning message and communication data according to an exemplary embodiment.

Referring now to FIG. 21 therein illustrated is a schematic diagram of a transmission subsystem 800 for simultaneously transmitting a tuning message/pattern and typical communication data according to an exemplary embodiment. The tuning message, which is transmitted at a much slower speed (i.e. lower frequency, ex: in the kilohertz range), is inputted into a laser diode driver module 812, whereby the bias level outputted from the laser diode driver 812 is varied over time in accordance with the waveform of the tuning message. Accordingly, the variation of the bias level over time forms the waveform representing the tuning message. The communication data 808 is also inputted into the laser diode driver module 812, which modulates the communication data 808 according to a modulation scheme to output a modulated signal. The modulated signal is much faster than the bias level signal. Both the modulated signal and the bias level signal are combined and used to drive a laser diode 816, which outputs the optical signal corresponding to both signals and which is transmitted over the optical network. As can be appreciated, the exemplary embodiment of the transmission subsystem 800 relates to a directly modulated transmitter. It is appreciated, however, that a similar effect can be achieved with an externally modulated transmitter.

Figure 22:
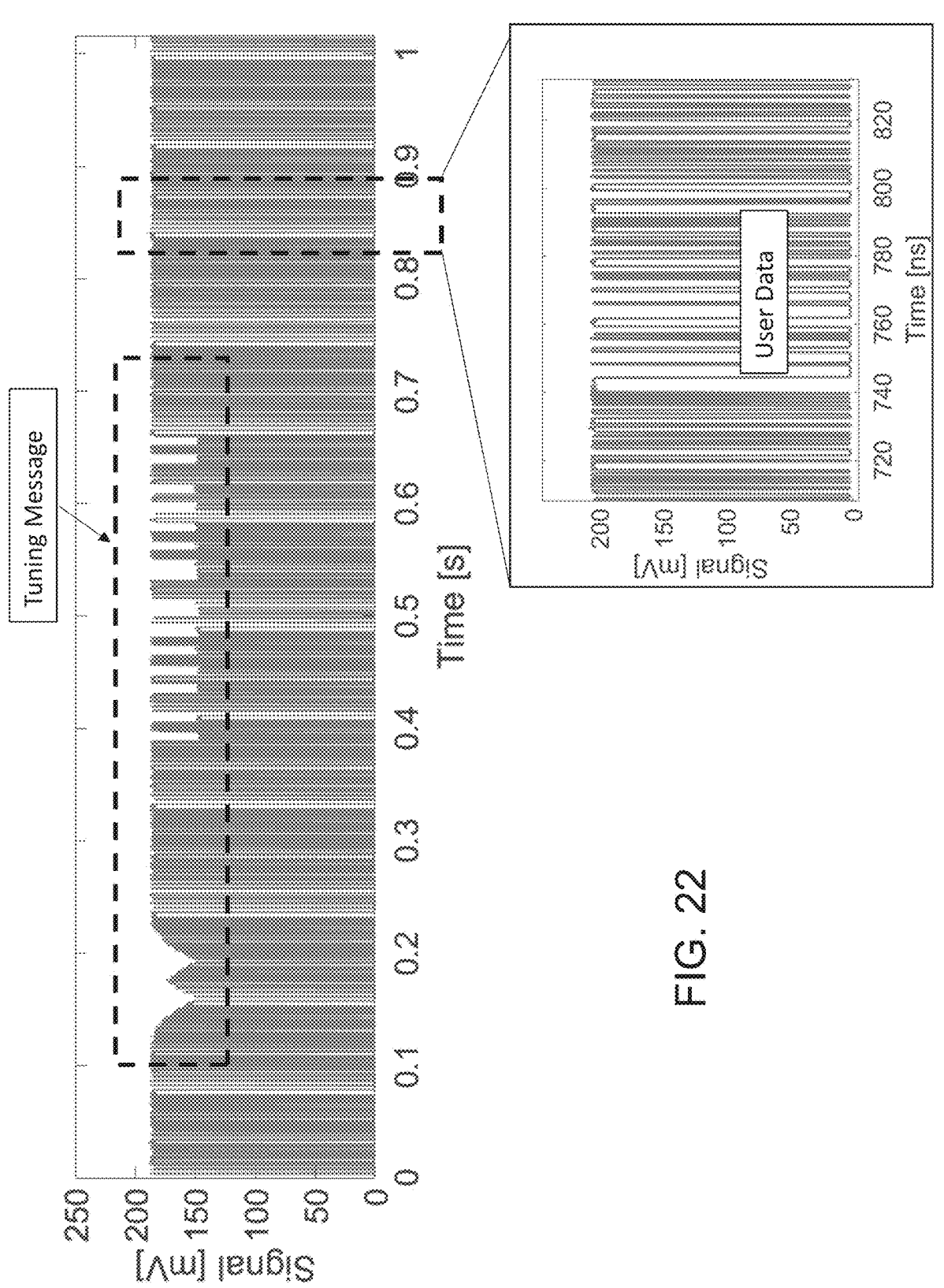
FIG. 22 illustrates a scheme for embedding a waveform-based tuning message by impinging it on communication data according to an exemplary embodiment.

Referring now to FIG. 22, therein illustrated is a scheme for embedding the waveform-based tuning message by impinging the communication data according to an exemplary embodiment. For example, this scheme can be implemented using the transmission subsystem 800' of FIG. 21B, where the multiplication values corresponding to the tuning message are used to apply the impinging of the communication data. It will be appreciated that this impinging causes the waveform of the tuning message to be inverted (ex: negative values of the waveform of FIG. 9A) and the dot product operation will generate a negative peak. Alternatively, the mathematical operators in the dot product operation can be adjusted so that the dot product operation still produces a positive peak. Accordingly, the detecting of the match between the sampled signal corresponding to this impinged tuning message and any signal pattern waveform 232 accounts for such inverting of amplitude values.

Since communication data is still present, but is only impinged by the tuning message, it is still possible to measure the power present within the optical link, such as for a performing a diagnostic. Whereas if the no communication data is present during the tuning process, the power measurement would otherwise not be available.

Figure 23:
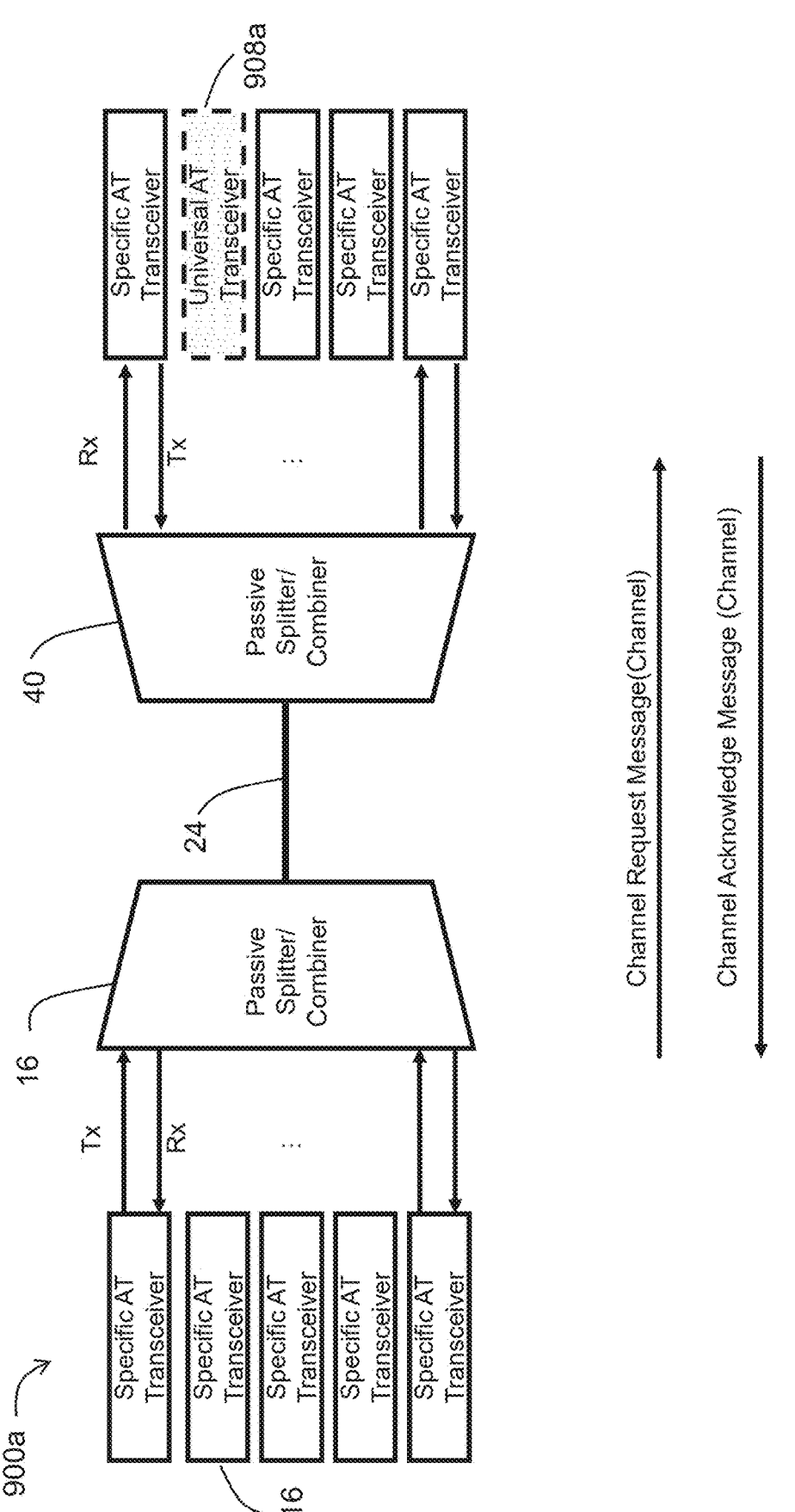
FIG. 23 illustrates a schematic diagram of an optical network with automatic tuning capabilities according to a first exemplary configuration.

The automatic tuning system 100 can be embodied in different types of network devices connectable to an optical network. Referring now to FIG. 23, therein illustrated is a schematic diagram of an optical network 900a according to a first configuration in which the automatic tuning system 200 is implemented within an automatic tuning-enabled pluggable transceiver 908a. This pluggable transceiver 908a is illustrated as being connected to a right side (ex: onu/subscriber/client side) of the optical network 900a illustrated in the example of FIG. 17. However, it will be understood that the pluggable transceiver 908a can be connected on any side of the optical network 200 as long as an appropriate auto-tuning enabled pluggable transceiver is connected in the port of the passive splitter/combiner device for the channel set on the opposite of the optical network 908a.

The pluggable transceiver 908a has an automatic tuning system 200 having capabilities for performing automatic tuning according to one or more digital encoding/modulation-based tuning protocols, such as ones used by different pluggable transceivers of different vendor, makes and/or models. The transceiver 908a is denoted as being "universal" because it can be configured to perform tuning according to a plurality of different tuning protocols. In the illustrated example, the automatic tuning-enabled pluggable transceiver 908a is connected to the second port (second from the top) of the client-side passive splitter/combiner 40 and an encoding/modulating tuning based transceiver 916 is connected to a corresponding second port (second from the top) of the provider-side passive combiner/splitter 16. The digital encoding/modulating tuning based transceiver 916 uses a digital encoding/modulation-based tuning protocol that is one of the protocol(s) supported by the automatic tuning-enabled pluggable transceiver 908a.

A plurality of other automatic tuning transceivers are also connected to the ports of the provider-side passive splitter/combiner 16 and the client-side passive splitter/combiner 40. Where each pairing of provider-side and client-side transceivers connected to a common channel set support the same tuning protocol, these other automatic tuning transceivers should eventually successfully tune themselves according to that specific tuning protocol.

The automatic tuning-enabled pluggable transceiver 908a connected to the second port on the client-side will also carry out normal tuning steps according to its specific tuning protocol. However, in this case, the automatic tuning-enabled pluggable transceiver 908a receives the tuning messages transmitted from the digital encoding/modulation-based pluggable transceiver 916 and the automatic tuning system 200 embedded in transceiver 908a carries out steps of the tuning procedure according to the functionalities of the system 200. Since the automatic tuning system 200 of the automatic tuning-enable pluggable transceiver 908a has stored therein signal patterns corresponding to the waveforms of the tuning messages transmitted according to the tuning protocol of the digital encoding/modulation-based pluggable transceiver 916, the transceiver 908a can identify (via the dot product operation) these messages and transmit appropriate response tuning messages (via the message transmission module and message transmission database 272) to the digital encoding/modulation-based pluggable transceiver 916.

Advantageously, where the automatic tuning-enabled pluggable transceiver 908a is configured to support multiple tuning protocols, it can be installed in the optical network without being restricted by the tuning protocol used by the automatic tuning-enable transceiver connected at the opposite end of its connected channel. It will be appreciated that this freedom contrasts with the requirement that each of the other protocol-specific transceivers must be connected to another transceiver supporting the same tuning protocol (ex: typically being of the same vendor, make and/or model) in order to properly carry out automatic tuning. The automatic tuning-enabled pluggable transceiver 908a having the automatic tuning system 200 supporting multiple tuning protocols can be especially useful in situations of retro-fitting or upgrading an existing network. In such retro-fitting or upgrades, existing protocol-specific pluggable transceivers 916 can continue to be used, while newly added transceivers can be of the automatic tuning-enable type having the automatic tuning system 200 supporting multiple tuning protocols. Use of these "universal" transceivers 908a avoids the need to ensure matching transceivers with matching protocols, or having to pre-tune the newly added transceivers. Accordingly, only the pluggable transceiver 908a is necessary, instead of having to carry multiple transceivers that are each suitable for a single wavelength/channel.

Figure 24:
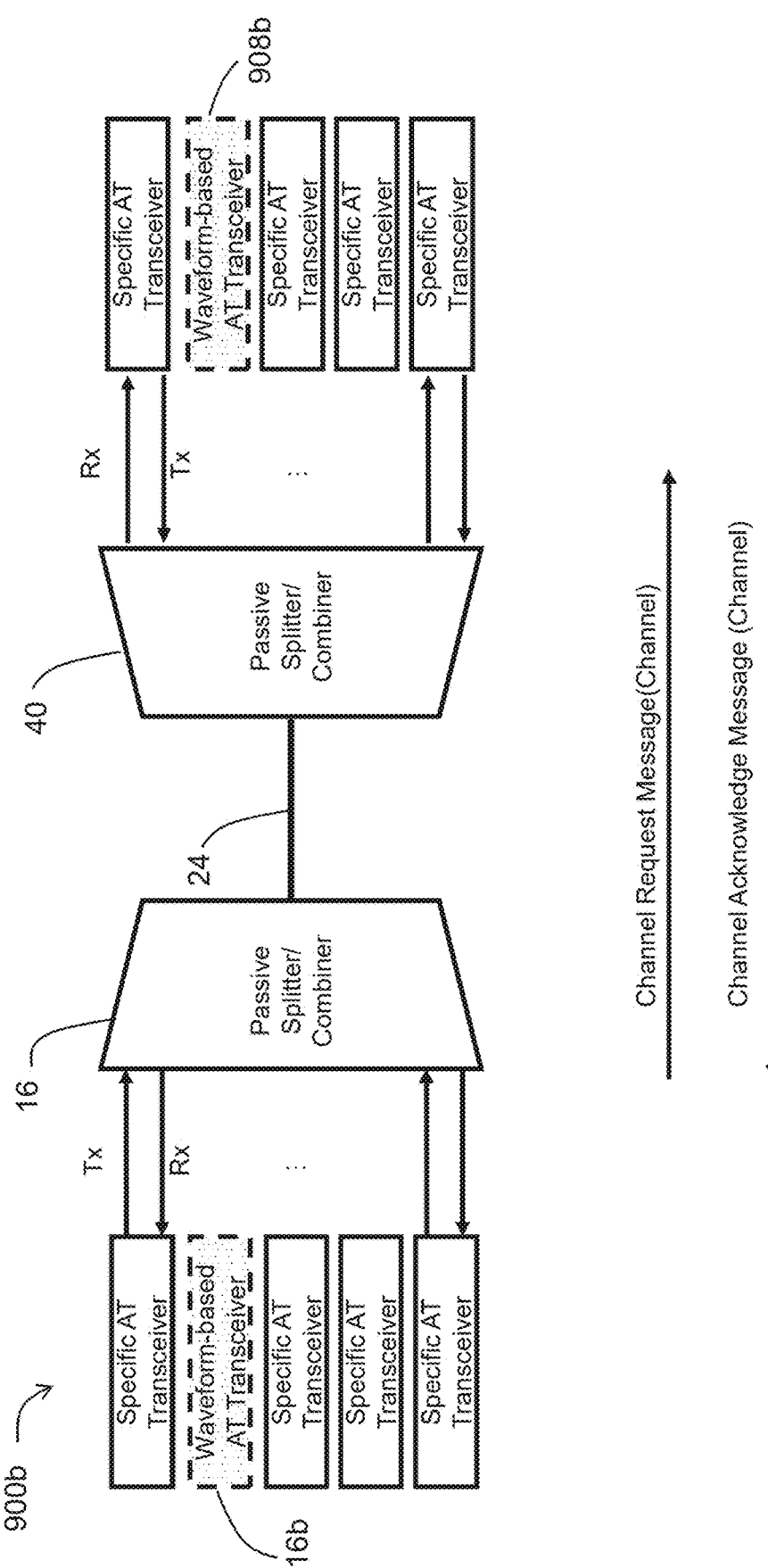
FIG. 24 illustrates a schematic diagram of an optical network with automatic tuning capabilities according to a second exemplary configuration.

Referring now to FIG. 24, therein illustrated is a schematic diagram of an optical network 900b according to a second exemplary configuration in which the automatic tuning system 200 is implemented within an automatic tuning pluggable transceiver 908b that is enabled for waveform-based encoding/modulation tuning protocols. This pluggable transceiver 908b includes an automatic tuning system 200 that is configured to transmit and receive tuning messages in which the informational fields of the tuning message is represented in the particular waveform/envelope of that tuning message. As described else herein, these waveform-based encoded/modulated tuning messages are to be distinguished from various currently available tuning protocols that exchange tuning messages that are encoded and/or modulated data sequences. In the waveform-based encoded/modulated tuning messages, the shape of the waveform itself is the informational field.

In the example of FIG. 24, a first waveform-based automatic tuning pluggable transceiver 908b is illustrated as being connected to a right side (ex: onu/subscriber/client side) of the optical network 900b. A second waveform-based automatic tuning pluggable transceiver 916b is illustrated as being connected to a left side (ex: OLT/server/access provider side) of the optical network 900b. The first and second pluggable transceivers 908b, 916b are each connected to a respective port (ex: second port being the second from the top) of their respective passive splitter/combiner 16, 40 so that the transceivers 908b, 916b are connected to a common channel set.

A plurality of other protocol-specific automatic tuning transceivers are also connected to the ports of the left-side passive splitter/combiner 16 and the right-side passive splitter/combiner 40. Where each pairing of left-side and right-side transceivers 16, 40 connected to a channel set support the same tuning protocol, these other protocol-specific automatic tuning transceivers should eventually successfully tune themselves according to that specific tuning protocol.

One, or both, of the waveform-based encoding/modulation automatic tuning pluggable transceiver 908b, 916b are initially sending tuning messages of the request type in which the information is embedded in the waveform of the tuning messages. One, or both, of the waveform-based encoding/modulation-automatic tuning pluggable transceiver 908b, 916b also carry out steps of the tuning procedures according to the functionalities of the system 200. It will be appreciated that one of the waveform-based encoding/modulation automatic tuning pluggable transceiver 908b, 916b will eventually sample, and identify (through determining a match from the dot product operation with generated pattern waveforms) a tuning message of the request type transmitted by the other transceiver 908b, 916b. The other of the transceivers 916b, 908b can then transmit an appropriate reply/acknowledge tuning message that also used waveform-based encoding/modulation. The exchange of tuning messages in this manner will cause both waveform-based encoding/modulation-automatic tuning pluggable transceiver 908b, 916b to be tuned to their common channel set.

It will be understood that according to various example embodiments, the waveform-based encoding/modulation-automatic tuning pluggable transceiver having the automatic tuning system 200 can also be configured to support multiple other tuning protocols (or different makes and/or models of transceivers) in addition to the waveform-based encoding/modulation-based tuning protocol. For example, the automatic tuning pluggable transceiver 908a illustrated in FIG. 23 can be such an automatic tuning pluggable transceiver that also supports waveform-based encoded/modulated-tuning messages, but is operating within the network 900a of FIG. 23 to exchange tuning messages of a digital encoding/modulation-based tuning protocol.

Figure 25:
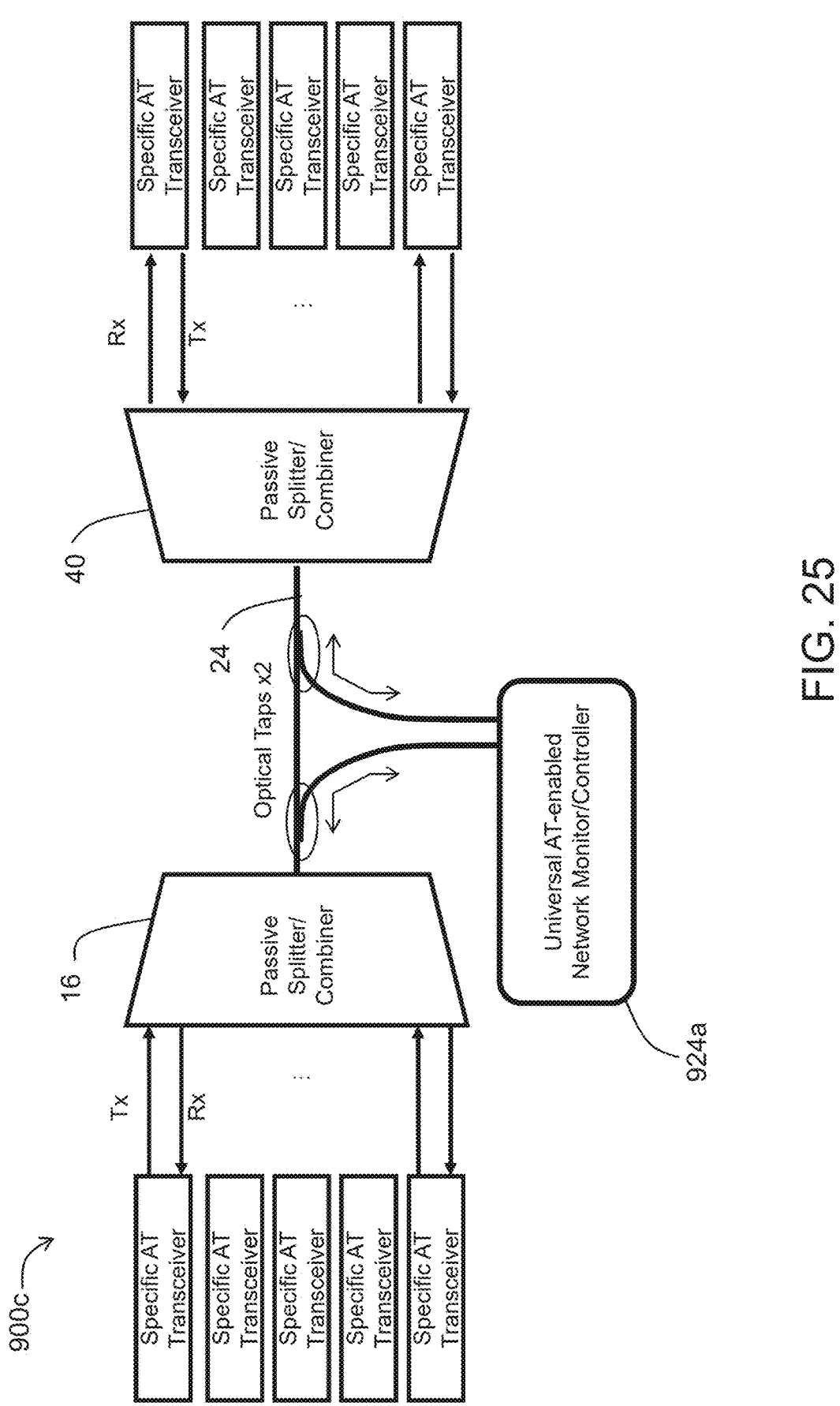
FIG. 25 illustrates a schematic diagram of an optical network with automatic tuning capabilities according to a third exemplary configuration.

Referring now to FIG. 25, therein illustrated is a schematic diagram of an optical network 900c according to a third configuration in which the automatic tuning system 200 is implemented within a network controller 924a, which may be a passive optical network (PON) monitor/controller. The network controller 924a is configured to passively tap into the optical network by tapping signals on the feeder cable 24. Since tuning messages transmitted between pluggable transceivers pass over the feeder cable 24, the signal tapped by the network controller 924a from the feeder cable 24 will contain such tuning messages. The automatic tuning system 200 implemented within the network controller 924a can carry out the automatic tuning functionalities as described with reference to FIG. 2 to participate in implementing the tuning protocol.

It will be appreciated that where a plurality of transceivers are connected to the passive splitter/combiners 16, 40, the tuning messages from these transceivers will all travel over the feeder cable 24. Accordingly, by tapping the feeder cable 24, the network controller 900c can receive the tuning messages from the plurality of transceivers and can participate in the tuning of the plurality of transceivers.

The network controller 924a can concurrently participate in the tuning procedure for two or more transceivers. For example, the network controller 924a can receive and identify (from sampling and matching via the dot product operation) a first request type message from a first pluggable transceiver, thereby initiating a first tuning procedure with that transceiver. As part of the first tuning procedure, the network controller 924a may transmit an appropriate acknowledgement-type message over the appropriate wavelength/channel. The tuning state module 256 of the automatic tuning system 200 can track the tuning state for the first pluggable transceiver, such as by identifying the tuning state by the wavelength/channel specified in the received request message.

While the first tuning procedure with the first pluggable transceiver is ongoing, the network controller 924a can also receive and identify (from sampling and matching via the dot product operation) a second request-type message from a second pluggable transceiver, thereby initiating a second tuning procedure with that transceiver. As part of the second tuning procedure, the network controller 924a may transmit a second appropriate acknowledgement type message to the second pluggable transceiver. The tuning state module 256 of the automatic tuning system 200 can also track the tuning state for the second pluggable transceiver. It will be appreciated that the network controller 924a can also be carried out concurrently for other transceivers in the same manner.

According to various exemplar embodiments, a provider-side transceiver (connected to passive splitter/combiner 16) and a client-side transceiver (connected to passive splitter/combiner 40) that are both connected on a common channel set can exchange tuning messages via the network controller 924a even where the two transceivers implement different tuning protocols (ex: because they are of different vendors, makes and/or models). In such a configuration, the automatic tuning system 200 of the network controller device 924a supports a plurality of different tuning protocols. When a tuning message according to a first tuning protocol from a first transceiver is received at the network device 924a, the automatic tuning system 200 can perform a translation of the tuning message to the second tuning protocol, and then repeat the translated tuning message on the network device so that it can be received by the second transceiver at the opposite end of the common link.

Figure 26:
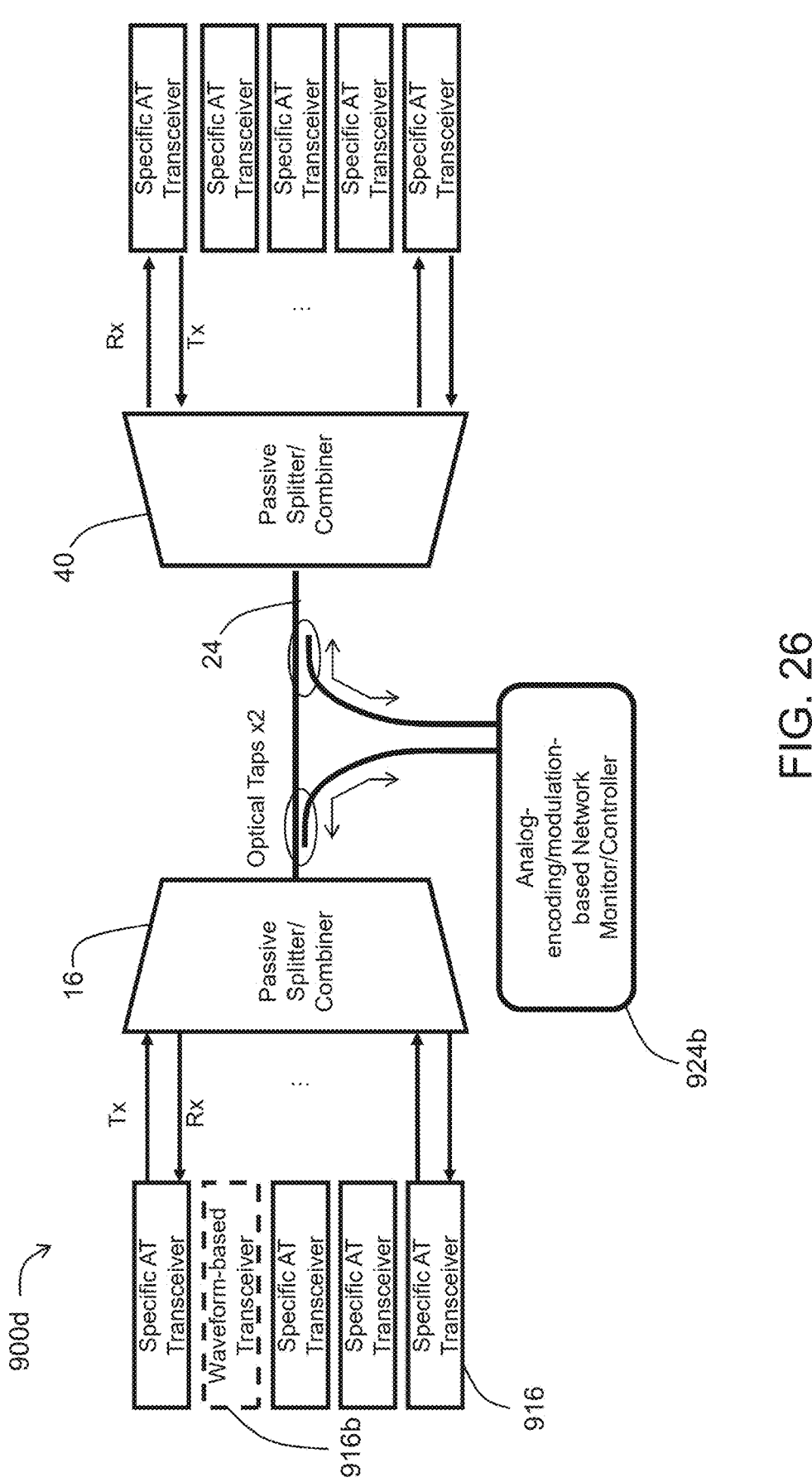
FIG. 26 illustrates a schematic diagram of an optical network with automatic tuning capabilities according to a fourth exemplary configuration.

Referring now to FIG. 26, therein illustrated is a schematic diagram of an optical network according to a fourth configuration in which the automatic tuning system 100 is also implemented in the form of a network controller 924b. In the optical network of FIG. 20, at least one of the pluggable transceivers connected to the network is a pluggable transceiver that implements a waveform-based encoding/modulation tuning protocol (i.e. the pluggable transceiver sends tuning messages in which the waveform of each message defines the informational field). Accordingly, the network controller 924b includes a configuration of the automatic tuning system 900d that is configured to also participate in the waveform-based encoding/modulation tuning protocol. The network controller 924b can support both waveform-based encoding/modulation tuning protocol and digital encoding/modulation-based tuning protocols so that within the optical network 900d, it can carry out a tuning scheme with both the pluggable transceiver 916b implementing the waveform-based encoding/modulation tuning protocol and other protocol-specific automatic tuning pluggable transceivers 916. The network controller 924b can also provide a translation of the tuning messages between two transceivers connected on a common channel, including a translation between tuning messages sent according to a digital encoding/modulation-based tuning protocol and tuning messages sent according to a waveform-based encoding/modulation tuning protocol.

Figure 27:
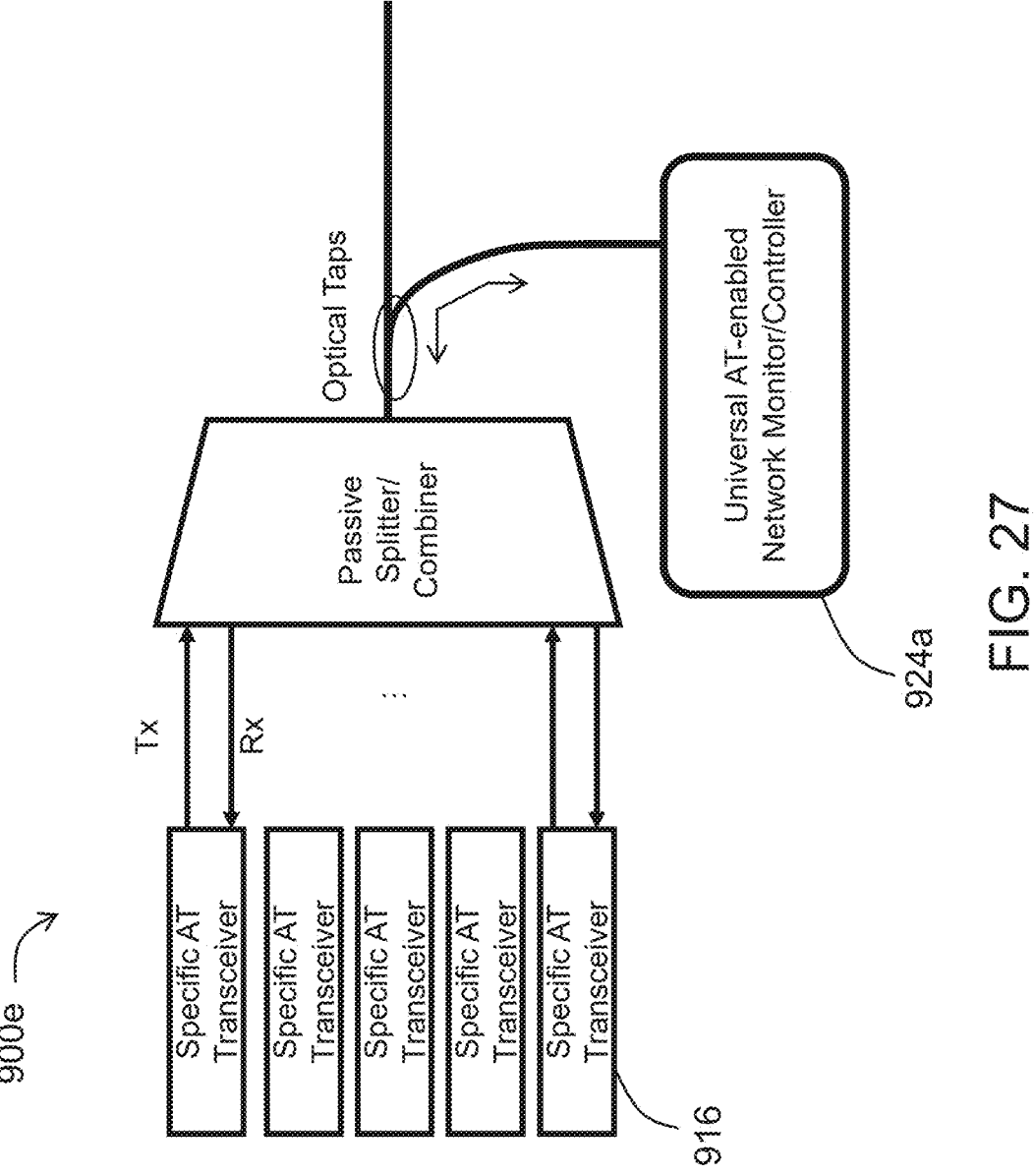
FIG. 27 illustrates a schematic diagram of an optical network with automatic tuning capabilities according to a fifth exemplary configuration.

Referring now to FIG. 27, therein illustrated is a schematic diagram of an optical network according to a fifth configuration 900e in which the automatic tuning system 200 is also implemented in the form of a network controller 924a. It will be appreciated that only one side (ex: OLT/server/access provider side) of the optical network is present. The network controller 924a acts like a virtual opposite side of the network (ex: ONU/subscriber/client side) to permit tuning of the automatic tuning-enabled transceivers connected to the single side of the optical network 900e. As described with reference to FIG. 25, the network controller 924a listens to tuning messages from the connected transceivers 916, identify (from sampling and matching via the dot-product operation) these tuning messages and transmit appropriate acknowledge-type messages to the transceivers 916 to enable automatic tuning of these transceivers 916. It will be appreciated that the use of the automatic tuning-enabled network controller 924a allows for automatic tuning of the pluggable transceivers even when only one side of the network is connected. This configuration may be useful for pre-installing components of the network and only putting that network into operation at a later date. Transceivers 916 can implement digital encoding/modulation-based tuning protocols, waveform-based encoding/modulation tuning protocols or a mixture thereof.

Figure 28:
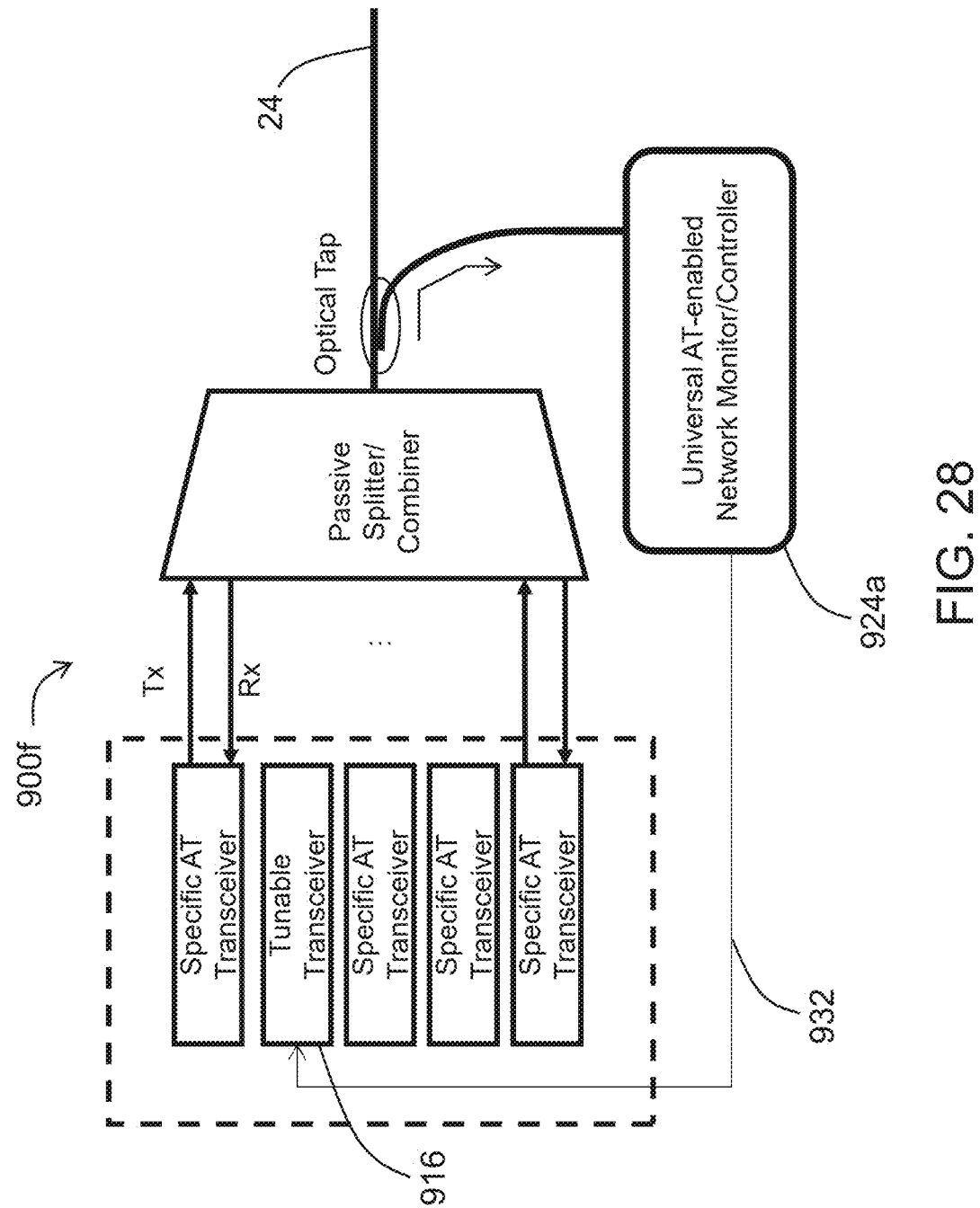
FIG. 28 illustrates a schematic diagram of an optical network with automatic tuning capabilities according to a sixth exemplary configuration.

Referring now to FIG. 28, therein illustrated is a schematic diagram of an optical network according to a sixth configuration 900f in which the automatic tuning system 200 is also implemented in the form of a network controller 924a and only one side of the optical network is present. In the sixth configuration 900g, a control link 932 connects the automatic tuning-enabled device 924a to one or more of the transceivers 916. The control link 932 can be a data link that is separate from the optical link 924. The control link 932 can be a backplane connection between the tuning-enable device 924a and the transceiver 916. The transceiver 916 can be tunable transceiver, but does not necessarily have auto-tuning functionalities. The tuning-enabled device 924a initially sends commands over the control link 932 to the transceiver 916 to cause the transceiver 916 to send tuning messages (i.e. carry out a tuning scheme, such as illustrated in FIG. 2). The network controller 924a listens to tuning messages from the transceivers 916 and identify these tuning messages. In response to receiving a tuning message defining an appropriate channel (ex: a request-type message having a "Sent by" field), the network control 924a further sends another command via the control link 932 to tune the transceivers 916 in place of responding with acknowledge-type tuning messages over the optical link 24. Accordingly, the network controller 924a acts like a hybrid of an automatic tuning network device and a peripheral control device for tuning.

As described herein above, when implemented within a network controller to tap into the feeder cable, the automatic tuning system 200 can receive tuning messages (in their optical signal form) from a plurality of automatic tuning-enabled transceivers. Various example embodiments herein describe a method of identifying a tuning message by sampling the optical signal and performing the dot product operation of the sampled signal against stored signal patter waveforms. It was observed that this method is also effective for distinguishing amongst individual tuning messages when two or more tuning messages are received at the same time and are contained in a single sampled signal 216.

Figure 29:
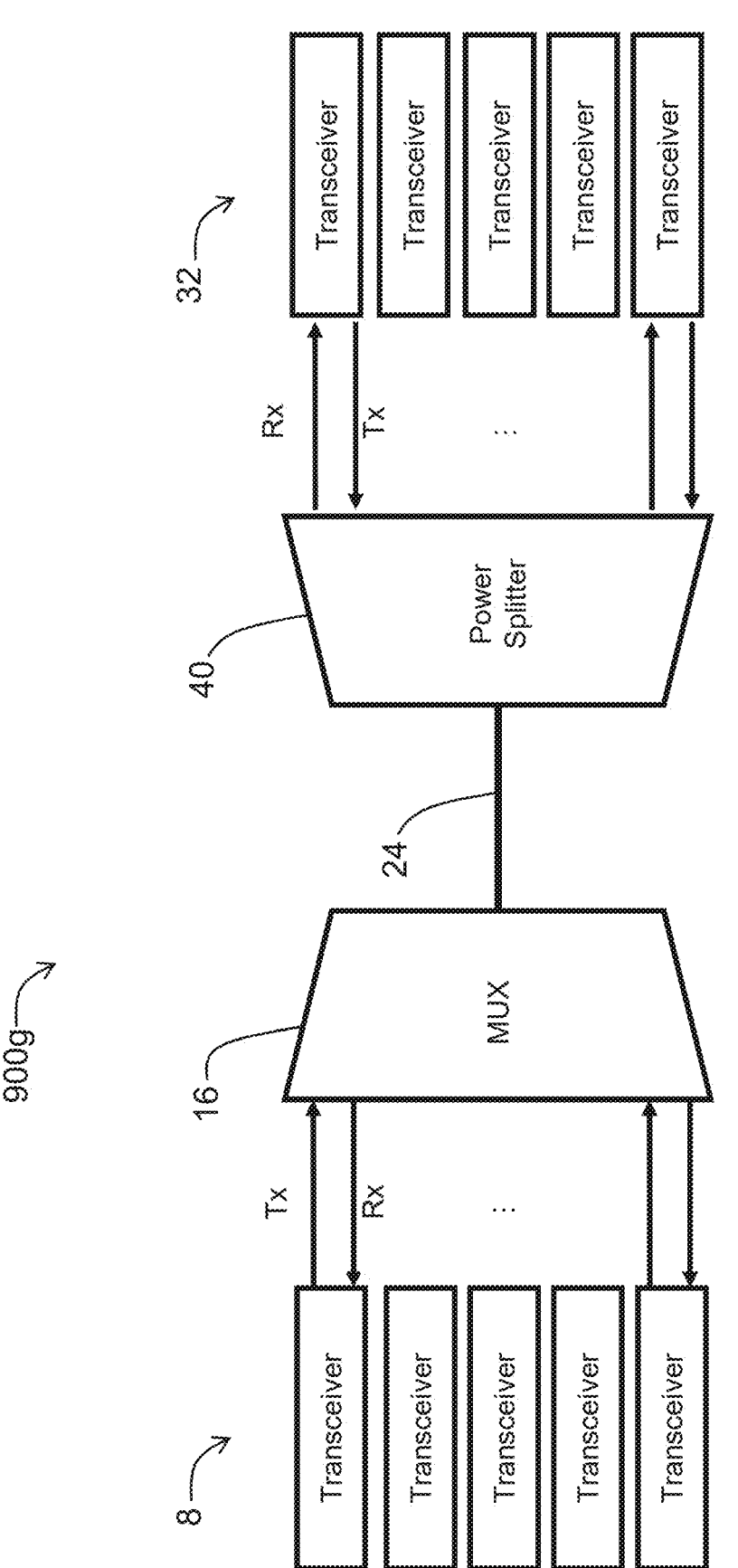
FIG. 29 illustrates a schematic diagram of an optical network with automatic tuning capabilities according to a seventh exemplary configuration.

Referring now to FIG. 29, therein illustrated is a schematic diagram of an optical network 900g according to a seventh configuration in which a first passive combiner/splitter 16 (e.g. a provider-side passive combiner/splitter) is a multiplexer (MUX) such as a WDM MUX, and a second passive combiner/splitter 40 (e.g. a client-side passive combiner/splitter) is a power splitter. In this configuration, the MUX 16 provides channel isolation such for each optical transceiver of the first set of optical transceivers 8, the MUX 16 removes all signals transmitted over feeder cable 24 except a wavelength pair (e.g. a pair of wavelengths respectively corresponding to the uplink Tx and downlink Rx wavelengths of the transceiver), effectively isolating each optical transceiver of the first set of optical transceivers 8 from one another. On the other side, no channel isolation is provided. In particular, the power splitter 40 broadcasts all signals transmitted over feeder cable 24 to each of its ports, such that each optical transceiver of the second set of optical transceivers 32 receives every signal (i.e. all wavelengths/channels) received over the feeder cable 24.

As can be appreciated, in the configuration of optical network 900g as shown, filtering is not provided by the optical network at the side of the power splitter 40. Instead, filtering can be carried out inside each individual transceiver of the second set 32, for example by heterodyning the signal received from splitter 40 using a local oscillator. Each transceiver of the second set 32 can be configured to scan through different channels/wavelengths on its downlink channel Rx to listen for eventual tuning messages and tune to an available channel according to the methods for automatic tuning as described above.

In accordance with methods for automatic tuning, the transceivers of the second set 32 (i.e. far-end transceivers) can listen for tuning messages of the request type (i.e. a "Link Request" message) sent by the transceivers of the first set 8 (i.e. near-end transceivers) and respond thereto. As can be appreciated, as the far-end transceivers 32 scan through different channels/wavelengths, it is possible that two or more of the far-end transceivers 32 can be tuned to the same channel and thus receive and respond to the same Link Request message. Accordingly, the near-end transceivers 8 may receive multiple responses to a single Link Request, and can be configured to select one of the far-end transceivers 32 in order to continue the tuning process.

In some embodiments, each transceiver can be associated with a unique identifier (referred to as a "device ID"), that can allow near-end 8 and far-end 32 transceivers to identify one another. In such embodiments, the tuning messages exchanged as part of the tuning process can include additional informational fields that specify device IDs as needed.

Figures 30A, 30B:
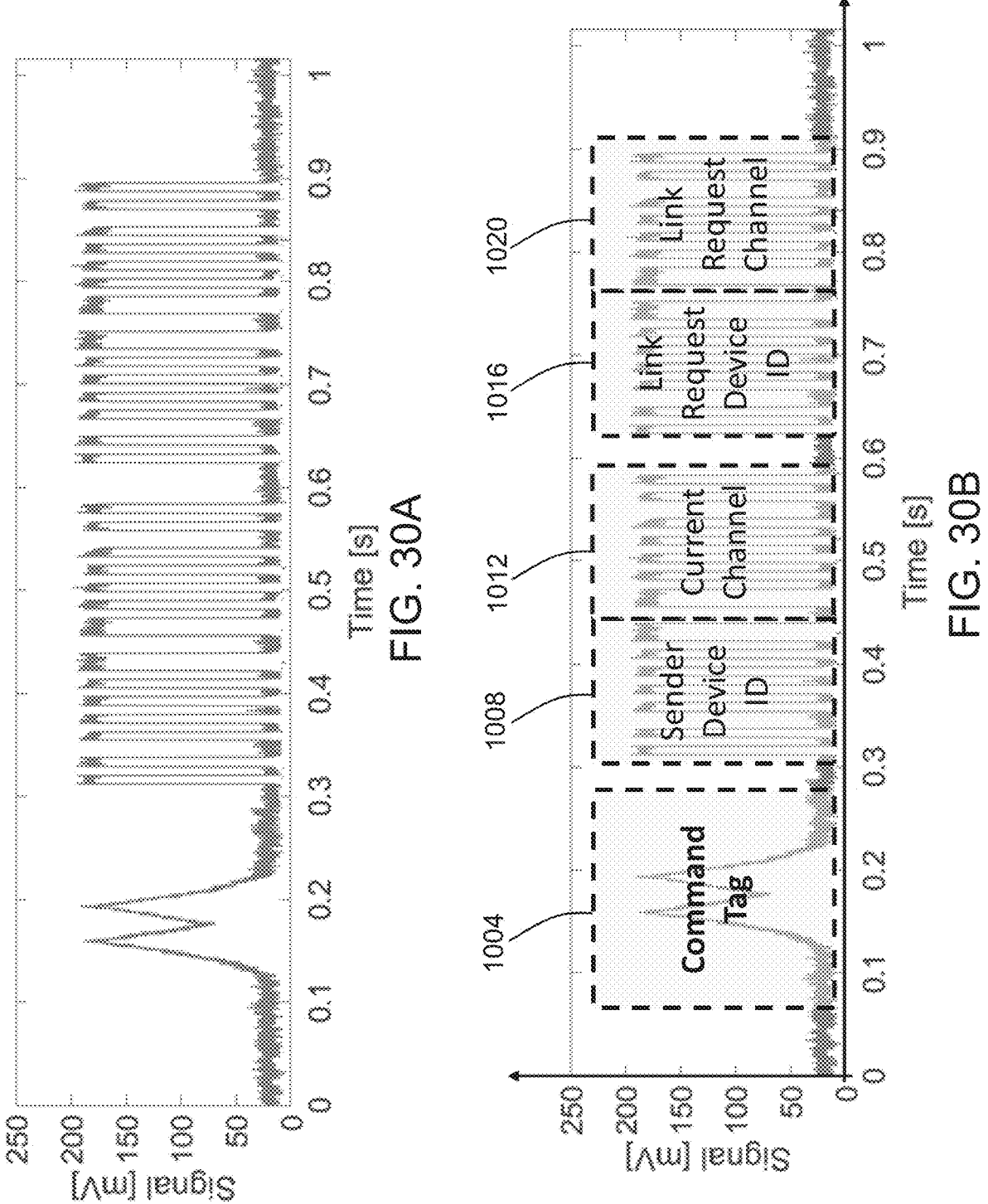
FIGS. 30A and 30B illustrate a raw waveform of a waveform-based tuning message according to an example embodiment in which the tuning message includes fields for specifying device IDs.

An exemplary raw waveform of a tuning message that includes additional fields for device IDs is shown in FIG. 30A. FIG. 30B shows the raw waveform of the tuning message of FIG. 30A having annotations showing the message components of the tuning message as defined by segments of the waveform. A first segment 1004 of the waveform, having a shape of two triangle waves, defines the message type (i.e. the "Command Tag"). A second segment 1008 of the waveform, having a shape of a first series of short square waves of a given pattern, defines the device ID of transceiver sending the tuning message. A third segment 1012 of the waveform, having a shape of a second series of short square waves of a given pattern, defines the transmission channel used for the tuning message. A fourth segment 1016 of the waveform, having a shape of a third series of short square waves of a given pattern, defines the reply to device ID of the tuning message (i.e. the device ID of the transceiver that an earlier tuning message was receiving from and the current tuning message is now replying to). A fifth segment 1020 of the waveform, having a shape of a fourth series of short square waves of a given pattern, defines the reply to channel for the tuning message (i.e. the channel that an earlier tuning was received at and which the current tuning message is now replying to). If the reply to device ID and channel segments are not known, such as because the tuning message itself is a request-type message, then the reply to device ID and channel segments can be left with a null symbol or a pattern indicating a null signal.

By utilizing tuning messages that includes fields for device IDs, such device IDs can be used during the tuning process to allow transceivers to ignore and/or selectively respond to messages received from a given transceiver. By way of example, the tuning process can include a near-end transceiver 8 sending a Link Request message that includes its device ID in the sender device ID field 1008. Upon receiving the Link Request message, one or more far-end transceivers 32 can respond via a Link Reply message that includes its device ID in the sender device ID field 1008 and the device ID of the far-end device in the link request device ID field 1016. If the near-end transceiver 8 receives multiple Link Reply messages from multiple far-end transceivers 32, the near-end transceiver 8 can select one of the far-end transceivers 32 based on the device IDs included in the Link Reply message, and respond by sending a Link Acceptance message to only the selected far-end transceiver while ignoring the Link Reply messages from the other far-end transceivers. The Link Acceptance message can include the device ID of the near-end transceiver 8 in the sender device ID field 1008, and the device ID of the selected far-end transceiver in the link request device ID field 1016. Upon receiving the Link Acceptance message at the far-end transceivers 32, each far-end transceiver can inspect the device ID field 1016 to determine whether the device ID specified therein corresponds to its own device ID. If the far-end transceiver recognizes the device ID, then the link with the near-end device can be accepted/established and the tuning process completed. If the far-end transceiver does not recognize the device ID, then that far-end transceiver can ignore the Link Acceptance message and continue the tuning process by searching for Link Requests messages on other channels/wavelengths.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A method for automatically tuning of a first optical transceiver, the method comprising:

sampling a received signal within an optical network to generate a sampled signal, the sampled signal containing a first tuning message transmitted from the first optical transceiver;

for each of a plurality of signal pattern waveforms, performing a dot product operation of the sampled signal with the signal pattern waveform;

determining, based on the results of the dot product operations, a matching signal pattern waveform being a given one of the signal pattern waveforms matching the sampled signal.

2. The method of claim 1, wherein the sampling is carried out on the received signal in its analog form free of any decoding and/or demodulation.

3. The method of claim 2, wherein the first tuning message transmitted from the first optical transceiver is a data sequence being encoded for transmission over the optical network; and wherein the sampling is carried out prior to decoding the first tuning message from the received signal.

4. The method of claim 2, wherein the first tuning message transmitted from the first optical transceiver is defined by an analog waveform and wherein informational fields of the tuning message is embedded in the envelop of the waveform; and wherein the matching signal pattern waveform sufficiently matches the waveform of the first tuning message.

5. The method of claim 1, wherein the first tuning message comprises a plurality of message components; and wherein the results of dot product operations indicate a plurality of matching signal pattern waveforms that match the plurality of message components.

6. The method of claim 5, wherein each signal pattern waveform is generated from a stored corresponding signal pattern;

wherein at least one signal pattern is stored as a data sequence; and wherein the signal pattern waveform for the signal pattern stored as the data sequence is generated by encoding and/or modulating its corresponding signal pattern according to an encoding and/or modulation protocol.

7. The method of claim 5, wherein each signal pattern waveform is generated from a stored corresponding signal pattern;

wherein at least one signal pattern is stored as a set of waveform parameters;

wherein the signal pattern waveform for the signal pattern stored as waveform parameters is generated such that the generated signal pattern waveform exhibits the waveform parameters.

8. The method of claim 1, wherein each signal pattern waveform is a reproduction of a waveform of a corresponding tuning message that can potentially be transmitted over the optical network;

wherein each signal pattern waveform is associated with a corresponding set of one or more tuning message identifiers defining one or more informational fields of the corresponding tuning message reproduced by the given signal pattern waveform.

9. The method of claim 1, further comprising:

determining, based on the matching signal pattern waveform, a channel set for communicating with the first optical transceiver.

10. The method of claim 9, further comprising transmitting a command over a command link to the first optical transceiver to cause the first optical transceiver to be tuned to the channel set.

11. The method of claim 1, further comprising:

transmitting, to the first optical transceiver, a second tuning message over the optical network based on the matching signal pattern waveform in response to receiving the first tuning message.

12. The method of claim 11, wherein the second tuning message is stored as a data sequence, and wherein the transmitting comprises:

encoding and/or modulating the second tuning message according to an encoding/modulation protocol; and wherein the second tuning message is transmitted in its encoded/modulated form.

13. The method of claim 11, wherein the second tuning message is stored as a set of waveform parameters, and the second tuning message is generated such that a waveform of the second tuning messages has the waveform parameters.

14. The method of claim 1, wherein the received signal is sampled prior to any recovery of bit values from the received signal.

15. The method of claim 1, wherein the received signal is detected from power-monitoring functionalities of a receiver optical sub-assembly of an optical network device.

16. An automatic tuning system implemented on an optical network device, the system comprising:

a signal sampler configured for sampling a received signal within the optical network to generate a sampled signal, the sampled signal containing a first tuning message transmitted from an optical transceiver of the optical network;

a storage device storing a plurality of signal patterns;

a signal generator configured for generating a corresponding signal pattern waveform for each of the stored signal patterns; and a dot product processor configured for:

for each of the plurality of signal pattern waveforms generated by the signal generator module, performing a dot product operation of the sampled signal with the corresponding signal pattern waveform;

determining, based on the results of the dot product operations, a matching signal pattern waveform being a given one of the signal pattern waveforms matching the sampled signal.

17. The system of claim 16, wherein the optical transceiver transmitting the tuning message represents a first optical transceiver and wherein the optical network device represents a second optical transceiver.

18. The system of claim 17, wherein the first optical transceiver transmitting the first tuning message is connected at a first end of an optical link and the second optical transceiver is connected at a second, opposite end of the optical link; and wherein, when tuned, the first and second optical transceivers are operable to communicate over a common channel set of the optical link.

19. The system of 16, wherein the optical network device is a controller device configured for tapping onto an optical link of the optical network over which the signal is transmitted by the optical transceiver.

20. A non-transitory computer-readable medium having instructions stored thereon which, when executed by a processor, cause the processor to perform a method for automatically tuning a first optical transceiver, the method comprising:

sampling a received signal within an optical network to generate a sampled signal, the sampled signal containing a first tuning message transmitted from the first optical transceiver;

for each of a plurality of signal pattern waveforms, performing a dot product operation of the sampled signal with the signal pattern waveform;

determining, based on the results of the dot product operations, a matching signal pattern waveform being a given one of the signal pattern waveforms matching the sampled signal.

* * * * *